United States Patent [19]

Akasaka

[11] Patent Number: 4,994,976

[45] Date of Patent: Feb. 19, 1991

[54] FILM THICKNESS CONTROLLER

[75] Inventor: Noriyuki Akasaka, Mitsubishi, Japan

[73] Assignee: Mitsubishi Jukogyo Kabushiki Kaisha, Tokyo, Japan

[21] Appl. No.: 311,223

[22] Filed: Feb. 15, 1989

[30] Foreign Application Priority Data

Feb. 17, 1988 [JP] Japan .................................. 63-32784
Feb. 19, 1988 [JP] Japan .................................. 63-35123
Nov. 30, 1988 [JP] Japan ................................ 63-300962
Nov. 30, 1988 [JP] Japan ................................ 63-300963

[51] Int. Cl.$^5$ ............................................ B29C 55/00
[52] U.S. Cl. ..................................... 364/473; 425/141
[58] Field of Search ................. 364/473; 425/141–145

[56] References Cited

U.S. PATENT DOCUMENTS

| | | | |
|---|---|---|---|
| 3,985,845 | 10/1976 | Akatsuka et al. | 425/141 |
| 4,124,342 | 11/1978 | Akatsuka et al. | 425/141 |
| 4,409,160 | 10/1983 | Kogo et al. | 425/141 |
| 4,804,556 | 2/1989 | Leffew et al. | 425/141 |
| 4,841,208 | 6/1989 | Itoh et al. | 364/148 |

FOREIGN PATENT DOCUMENTS

| | | |
|---|---|---|
| 14720 | 2/1981 | Japan . |
| 133135 | 10/1981 | Japan . |
| 39050 | 8/1983 | Japan . |
| 44463 | 10/1983 | Japan . |
| 132727 | 7/1985 | Japan . |

Primary Examiner—Allen R. MacDonald
Attorney, Agent, or Firm—Stanger, Michaelson, Spivak & Wallace

[57] ABSTRACT

There is disclosed a film thickness controller which contains a large dead time and in which, in order to solve a problem due to the dead time, past data is stored in a memory and a state variable is calculated on the basis of the stored data to control a system. The film thickness controller includes an adjusting mechanism including a plurality of die lips having interference effect. In order to solve a problem due to the interference effect, the film thickness controller combines a plurality of basic control systems to control the adjusting mechanism including the plurality of die lips.

10 Claims, 27 Drawing Sheets

```
HEATER 1        THICKNESS 1'
———⊖———————×———

HEATER 2        THICKNESS 2'
———⊖———————×———

HEATER 3        THICKNESS 3'
———⊖———————×———

HEATER 4        THICKNESS 4'
———⊖———————×———

HEATER 5        THICKNESS 5'
———⊖———————×———
```

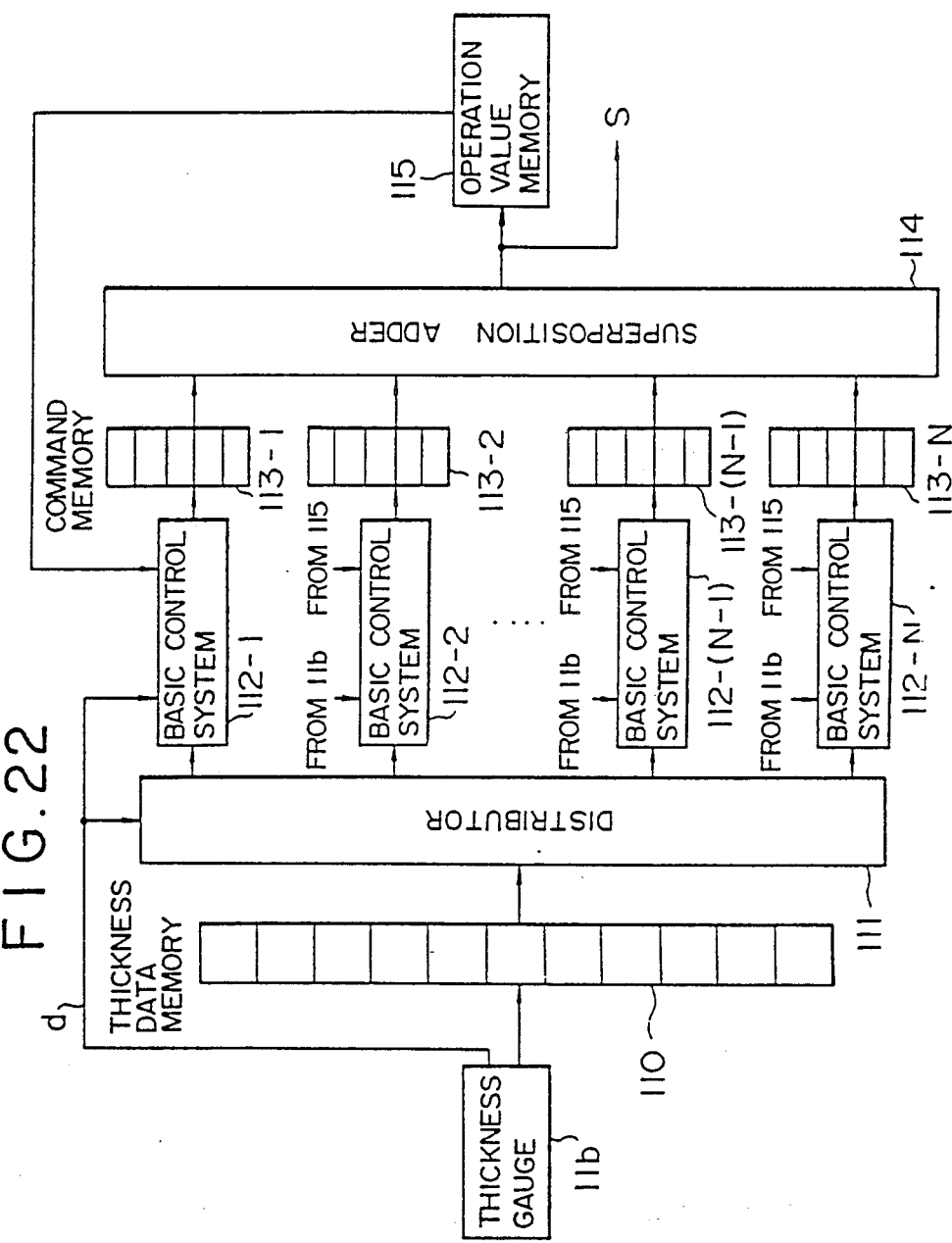

FILM THICKNESS CONTROLLER

FIELD OF THE INVENTION AND RELATED ART STATEMENT

The present invention relates to a film thickness controller for use in an extrusion molding apparatus and a flowing type molding apparatus such as a film or sheet manufacturing apparatus.

A conventional film thickness controller is now described briefly.

An extrusion molding apparatus for manufacturing film or sheet is required to maintain the thickness of a manufactured molded product such as film or sheet at a predetermined value. An example of a conventional apparatus having a die with an adjusting mechanism which can adjust thickness of film along its width appears in FIGS. 28 to 30. Molten plastic is fed from an extruder 1b (FIG. 28) to a die 2b. The molten plastic is expanded in a manifold 3b in the width direction perpendicular to paper of FIG. 28 showing the die 2b and flows down from a slit-shaped outlet 5b of die lips 4b. Then, the molten plastic flowing down from the outlet 5b is cooled by a cooling roller 6b and solidified to be film 7b so that the film is wound on a winder 10b.

A thickness gauge 11b measures thickness of the film 7b. The thickness gauge 11b utilizes radiation due to the natural disintegration of radioactive substance to measure thickness of the film 7b in accordance with degree of reduction of the radiation intensity when the radiation passes through the film 7b. The thickness gauge includes a single detection element which is moved in the reciprocating manner along the width of the film 7b to measure thickness of the film 7b along the width.

The thickness of the film 7b must be maintained at predetermined thickness along the width. However, since it is difficult that molten plastic passes through a narrow gap of the die 2b at the same speed along the width, the thickness of the film 7b is not necessarily identical along its width.

Accordingly, thickness adjusting mechanisms 12b which serve to change amount amount of molten plastic discharged along the length of the slot of the die lips 4b are disposed dispersedly along the length of the slot of the die lips 4b. Thickness adjusting mechanisms 12b, come in several types, for example:

(1) Heater type: A multiplicity of heaters are embedded in the die lips 4b along the length of the slot of the die lips 4b and are controlled to change a temperature generated therefrom so that the viscosity of the molten plastic therein is changed and the flowing speed of the molten plastic is changed to control the discharge amount of the molten plastic.

(2) Bolt type: A multiplicity of screws are disposed along the length of the slot of the die lips 4b to change a gap space of the discharge outlet 5b of the slot of the die lips 4b mechanically or thermally or electrically so that the discharge amount of the molten plastic is controlled.

Accordingly, the thickness of the film 7b can be automatically controlled by adjustment of the thickness adjusting mechanism 12b.

For example, as shown in FIGS. 2 and 3, a multiplicity of heaters 12a are embedded in a die 2a at both sides of a gap 3a and the heaters 12a are distributed along the width so that the speed of molten plastic flowing through the gap 3a is maintained to constant.

At this time, when a temperature of the heater 12a which is located in a place where thickness of film 6a is thick is reduced, the temperature of molten plastic in contact with the die 2a is reduced and the viscosity of the molten plastic is increased. Accordingly, the flowing speed of the molten plastic therein is reduced. Thus, the thickness of a portion of the film 6a corresponding to the place where the temperature of the heater 12a is reduced is reduced so that the thicker portion of the film 6a is corrected. Conversely, when the thickness of the film 6a is small, the temperature of the heater 12 which is disposed in a place where the thickness of film is small is increased so that the speed of the molten plastic flowing through the place is increased and the thickness of the film 6a therein is increased to correct the thickness of film.

FIG. 4 is a block diagram of a conventional thickness controller. When a difference between a film thickness measured by a thickness gauge 10 and a set value for the film thickness is applied to a controller 13, the controller 13 supplies a command to a heater 12a to change a temperature of heat generated by the heater 12a. When the temperature of the heater 12a is changed, the flowing speed of the molten plastic in the die 2a is changed so that thickness of a portion of the film corresponding to the place where the temperature of the heater is changed can be controlled.

FIG. 30 is a block diagram of a conventional thickness controller for one operating terminal device of the thickness adjusting mechanism 12b. A controller 13b is supplied with a difference between a thickness b of a portion of the film measured by the thickness gauge 11b and a set value a of thickness. The controller 13b calculates an amount of operation for the adjusting mechanism 12b corresponding to the portion of the film measured by the thickness gauge 11b and supplies it to the adjusting mechanism 12b. When the mechanism 12b is operated, a discharge amount of molten plastic in the die lips 4b is changed and thickness of the portion of the film controlled by the mechanism 12b is changed to effect the thickness control. The thickness control over the whole width of the film can be made by provision of the number of the control loop blocks of FIG. 30 corresponding to the number of places in which the thickness control is performed.

The conventional film thickness controller as described above has drawbacks as follows:

(1) There is a dead time $L_1$ due to the movement of the film from the outlet of the die to the thickness gauge 10 until variation of thickness of the film is detected by the thickness gauge 10 after the variation has been produced at the outlet of the die.

(2) When an operating terminal device of the die lip adjusting mechanism corresponding to a portion of the film is controlled, there occurs an interference phenomenon that thickness of an adjacent portion of the film to the operating terminal device of the adjusting mechanism is changed.

(3) In order to minimize the interference effect to the film thickness due to mutual interference of the operating terminal device of the lip adjusting mechanism described in (2), there is a control system which updates commands of the operation amount for a multiplicity of operating terminal devices simultaneously. The control system performs a calculation each time a thickness gauge which is reciprocated along the width of the film reaches an end of the film in which the thickness gauge completes reading of thickness data of the film along the width thereof. Consequently, an operation until the thickness gauge reaches the end of the film after the thickness gauge has measured thickness of a portion of the film takes a time, which is a dead time $L_2$ until the control system starts the calculation actually after the thickness data has been obtained. Accordingly, a dead time after the operation amount for the operating terminal device has been changed and its influence has been detected as a thickness data until the detected thickness data is employed to perform the calculation is a sum of the dead time $L_1$ described in (1) and the dead time $L_2$ described above.

As described above, the conventional film thickness controller has (A) a first drawback of producing a large dead time and (B) a second drawback of generating the interference effect. Description is now made to problems due to these drawbacks.

A. Problem due to large dead time:

FIG. 5(a) is a block diagram of a thickness control system in the case where the controller of FIG. 4 involves the dead times $L_1$ and $L_2$. FIG. 5(b) is a block diagram of a thickness control system in which the dead times are combined to one equivalent time. A general feedback control system does not contain such a dead time, while the thickness control system contains such a large dead time ($L_1$ and $L_2$) as shown in FIG. 5(b).

Consequently, since there is a large phase delay due to the dead time, a gain of a controller can not be increased even if phase compensation is effected in order to attain stability in the control system. Accordingly, the high-speed response and the steady-state accuracy of the control system are deteriorated. Further, the thickness of the film is always influenced by an external disturbance due to variation of an adjacent die lip adjusting mechanism.

B. Problem due to interference effect:

In FIG. 30, when an operating terminal device of a portion of the conventional adjusting mechanism 12b is operated, the thickness of a portion of the film corresponding to an adjacent operating terminal device is changed. Accordingly, the operating terminal device of the portion of the adjusting mechanism and the control loop for controlling thickness of a portion of film corresponding to the position of the operating terminal device interfere with each other. Consequently, the following problems occur:

(1) Even if the stability of the control loop shown in FIG. 30 is ensured, since operation of an operating terminal device of the adjusting mechanism 12b is influenced by the control loop which controls thickness of the film corresponding to an adjacent operating terminal device, the control loops interfere with each other and the stability of the whole control system is not ensured when the thickness of the film is controlled over the whole width of the film. Accordingly, in order to eliminate the influence of the mutual interference, the gain of the controller 13b is reduced so that the control system has a low-speed response.

(2) Conversely, when it is considered to design a stable control system constituting a multi-variable system in consideration of the mutual interference between the operating terminal devices of the adjusting mechanism 12b, the control system becomes a very large system since a hundred or more operating terminal devices are usually disposed in the longitudinal direction of the slot of the die lips 4b and there are detected values of the film thickness equal to the number of the operating terminal devices. Accordingly, it is difficult to design such a large system with ensured stability.

OBJECT AND SUMMARY OF THE INVENTION

It is a first object of the present invention to provide a film thickness controller having a control device which solves the problems due to the dead time in a film thickness controller having a large dead time.

It is a second object of the present invention to provide a film thickness controller which solves the problems due to the interference effect in a film thickness controller having a die lip adjusting mechanism with the interference effect by combining a plurality of basic control systems.

A. SUMMARY OF FIRST INVENTION

A film thickness controller for use in an extrusion molding apparatus and a flowing type molding apparatus of film including a die having a mechanism which controls a discharge amount of molten plastic along the width of the film and a thickness gauge for detecting a variation of thickness of the film after the elapse of a dead time $L_1$ corresponding to a time required for movement of the film between the die and the thickness gauge, comprises a subtracter for producing a difference between a thickness value detected by the thickness gauge in a predetermined position along the width of the film and a set value of thickness in the predetermined position, an integrator for time-integrating the difference of thickness produced by said subtracter, a memory for storing past time sequence data of operation amounts of an operating terminal device during a time equal to a sum of the dead time $L_1$ and a time $L_2$ until the thickness gauge reaches an end of the film after detection of thickness in the predetermined position, an operational calculator for producing the past time sequence data of operation amounts of the operating terminal device stored in said memory and an estimated value of a state variable at a time earlier than a time when the set value of the detected thickness value of film has been inputted by a dead time L, a state shifter for receiving an output of said integrator and an output of said operational calculator and multiplying a coefficient for shifting the state by the dead time L to produce a state estimated value at a predetermined time, a state prediction device for receiving the past time sequence data of operation amounts of the operating terminal device stored in said memory to produce variation of a state based on establishment of input from a certain time to a time after the lapse of the dead time L, an adder for adding an output of said state shifter and an output of said state prediction device to produce the state estimated value at the predetermined time, and an operation amount commander for multiplying a state estimated value at a certain time produced from said adder by a state feedback gain to produce an operation amount command value of said operating terminal device.

According to the first invention, a multiplicity of heaters are disposed along the width of the film to control a temperature of molten plastic which is material of the film, and the thickness gauge detects actual thickness of the film at a position downstream of the flowing film and corresponding to the position of the heater in the width direction of the film. A difference between the detected actual thickness and a set thickness is calculated by the subtracter and is time-integrated by the integrator while a correction command is fed back.

Thus, a temperature of the heater is controlled and a temperature of the molten plastic is controlled to adjust the fluidity thereof so that thickness of the film is always maintained within the set value. The phase delay due to the dead time is corrected by estimation of the past state corresponding to the dead time by the operational calculator and time-integration during the time corresponding the past state by the state shifter and the state prediction device.

B. SUMMARY OF SECOND INVENTION

A film thickness controller for use in an extrusion molding apparatus and a flowing type molding apparatus including a die having a slot along which a plurality of operating terminal devices of a discharge amount adjusting mechanism of molten plastic are disposed and a thickness gauge for detecting variation of thickness after the lapse of a dead time corresponding to a time required for movement of the film between the die and the thickness gauge, comprises a thickness data memory for storing thickness data produced by the thickness gauge, a distributor for receiving an output of said thickness data memory and an arrival end identification signal which is produced by the thickness gauge to identify whether the thickness gauge reaches either of both ends of the film, a plurality of basic control means for receiving an output of said distributor and the arrival end identification signal produced by the thickness gauge, a plurality of command value memories each receiving an output of each of said plurality of basic control means, a superposition adder for receiving an output of each of said command value memories, and an operation value memory for receiving an output of said superposition adder and for supplying an output of said operation value memory to said basic control means.

According to the second invention, the following operation is attained.

(1) The thickness gauge measures thickness of the film while moving in the reciprocating manner along the width of the film. Since the film is moved at a certain speed, the thickness gauge measures the film thickness along a locus as shown in FIG. 27. Accordingly, the thickness gauge produces thickness data of a portion of the film corresponding to each operating terminal device sequentially and also produces an arrival end identification signal indicating whether the thickness gauge reaches one end (A) or the other end (B) when the thickness gauge reaches an end of the film.

(2) The thickness data memory stores thickness data of the film which are measured by the thickness gauge over the whole width of the film and which are thickness data of each portion of the film corresponding to each of the operating terminal devices.

(3) The distributor receives the arrival end identification signal of the thickness gauge and further receives the thickness data over the whole width of the film from the thickness data memory at the same time as receiving of the arrival end identification signal. The distributor supplies a set of predetermined number of thickness data from the received thickness data to a predetermined basic control system to be described later.

(4) Each of basic control systems (control means) receives the set of thickness data supplied from the distributor and the arrival end identification signal from the thickness gauge and further receives data set from the operation amount memory described later to calculate operation amount command values for a plurality of adjacent operating terminal devices containing a predetermined operating terminal device so that the thickness of a portion of the film corresponding to the predetermined operating terminal device is controlled to a predetermined value stably.

(5) The command value memories store the operation amount command values of the plurality of operating terminal devices calculated by the corresponding basic control systems, respectively.

(6) The superposition adder receives contents of the command value memories storing the operation amount command values of the basic control systems corresponding to each of operating terminal devices and effects superposition, addition and average operation to the command values of each of the operating terminal devices to define final command values of each of the operating terminal devices.

(7) The operation amount memory stores the operation amount command values of each of the operating terminal devices defined by the superposition adder retroactively to the past by a time corresponding to a sum $L(=L_1+L_2)$ of the dead time $L_1$ of the thickness gauge and a time $L_2$ required for movement of the thickness gauge from the position corresponding to each of the operating terminal devices to an end of the film.

As described above, the basic control systems can control thickness of the film corresponding to each of the heaters (operating terminal devices) containing in the own systems to a predetermined value and can control thickness over the whole width of the film by combination of the basic control systems.

BRIEF DESCRIPTION OF THE DRAWINGS

FIGS. 5a and 5b are block diagrams of a conventional film thickness controller containing dead time, in which FIG. 5(a) is a block diagram having separate blocks expressing dead times $L_1$ and $L_2$, respectively, and FIG. 5(b) is a block diagram having a combined block expressing a sum of the dead times $L_1$ and $L_2$;

FIGS. 15 to 21b are diagrams concerning a second embodiment of the first invention, in which;

FIGS. 15, 16 and 17 are diagram illustrating time intervals of calculation and time-integration sections;

FIGS. 20a, 20b, 21a and 21b are graphs showing simulation results (when a set value of thickness is changed and when external heat is added to a heater, respectively);

FIG. 22 is a block diagram showing a configuration of a controller of a first embodiment of the second invention;

FIGS. 31(a) to 34(a) are graphs showing simulation results of the embodiment when a set value of thickness is changed and FIGS. 31(b) to 33(b) are graphs showing simulation results of the embodiment when external heat is added to a heater;

FIGS. 36(a) to 39(a) are graphs showing simulation results of the second embodiment when a set value of thickness is changed, and FIGS. 36(b) to 39(b) are graphs showing simulation results of the second embodiment when external heat is added to a heater.

DETAILED DESCRIPTION OF PREFERRED EMBODIMENTS

A1. First Embodiment of First Invention

(a) Transfer Function Matrix G(s)

Figures 6, 7:
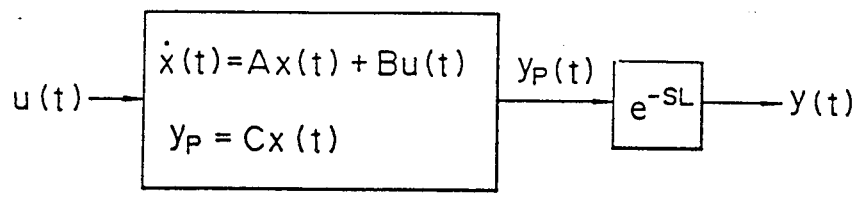
FIG. 6 illustrates a correspondence of positions of five heaters and five thickness detection positions.
FIG. 7 is a block diagram expressing a dynamic mathematical model of film thickness.

In order to explain the embodiment, referring to FIG. 6, control of thickness 3' of film to a predetermined value is considered by employing five heaters 1 to 5 and thickness values 1' to 5' of film measured by thickness gauges 10 located corresponding to the heaters 1 to 5. The reason that heaters 1, 2 and 3, 4 adjacent to the heater 3 are considered in order to control the thickness 3' is to set a control system taking interference of the heaters 1, 2 and 4, 5 to the thickness 3' in consideration. Although there are many heaters on both sides of the heaters 1 and 5, it is considered that influence to the thickness 3' by the heaters disposed outside of the heaters 1 and 5 is as small as negligible. Amounts of heat generated by the heaters 1 to 5 are $u_1(t)$, $u_2(t)$, $u_3(t)$, $u_4(t)$ and $u_5(t)$, respectively, and measured values of thickness 1' to 5' are $y_1(t)$, $y_2(t)$, $y_3(t)$, $y_4(t)$ and $y_5(t)$, respectively.

When Laplace transforms of $u_i(t)$ and $y_i(t)$ (i=1-5) are $U_i(s)$ and $Y_i(s)$ (i=1-5), respectively, $U_i(s)$ and $Y_i(s)$ are related to each other by the following transfer function matrix G(s):

$$\begin{pmatrix} Y_1(s) \\ Y_2(s) \\ Y_3(s) \\ Y_4(s) \\ Y_5(s) \end{pmatrix} = \underbrace{\begin{pmatrix} g_1(s)g_2(s)g_3(s) & 0 & 0 \\ g_2(s)g_1(s)g_2(s)g_3(s) & 0 \\ g_3(s)g_2(s)g_1(s)g_2(s)g_3(s) \\ 0 & g_3(s)g_2(s)g_1(s)g_2(s) \\ 0 & 0 & g_3(s)g_2(s)g_1(s) \end{pmatrix}}_{G(s)} \begin{pmatrix} U_1(s) \\ U_2(s) \\ U_3(s) \\ U_4(s) \\ U_5(s) \end{pmatrix} \quad (1)$$

$g_1(s)$ is a transfer function which introduces temporal variation of thickness 3' when only an amount of heat generated by the heater 3, for example, is changed. $g_2(s)$ is a transfer function which introduces temporal variation of thickness 3' when only an amount of heat generated by the heater 2 or 4 is changed. $g_3(s)$ is a transfer function which introduces temporal variation of thickness 3' when only an amount of heat generated by the heater 1 or 5 is changed. The equation (1) does not contain a dead time due to movement of the film from an outlet of the die to the thickness gauge. Accordingly, $g_1(s)$, $g_2(s)$ and $g_3(s)$ are expressed by a rational function of Laplacian operator s. Further, non-diagonal items of the transfer function matrix G(s) of the equation (1) express interference to thickness by the adjacent heaters.

(b) State Equation

When the relation between the input $U_i(s)$ and the output $Y_i(s)$ (i=1-5) of the equation (1) is expressed, the following state equation in the canonical form which is convenient for design of the control system is employed:

$$\dot{x}(t) = Ax(t) + Bu(t) \quad (2)$$

$$y(t) = Cx(t) \quad (3)$$

where x is a state vector, u is an input vector in which $u(t) = [u_1(t), u_2(t), u_3(t), u_4(t), u_5(t)]^T$ (where T expresses transposition), and y is an output vector in which $y(t) = [y_1(t), y_2(t), y_3(t), y_4(t), y_5(t)]^T$. The state equations (2) and (3) are controllable and observable.

The state vector means a vector consisting of a set of variables in which a state of the system is defined when the vector is obtained.

The input vector means a set of variables which is a boundary condition of the state equation for the state vector, and the system is controlled by controlling the input vector.

The output vector means a vector consisting of a set of measured amounts defined by the state vector, and the system is controlled by measuring the output vector.

The term "controllable" means that the state vector can be controlled by the input vector.

The term "observable" means that the state vector can be found by the output vector.

(c) Output Equation Taking Dead Time into Consideration

Figure 5A:
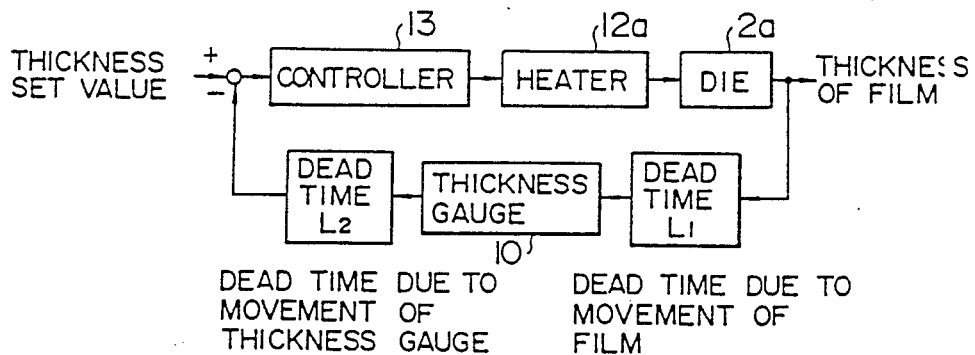
Figure 5B:
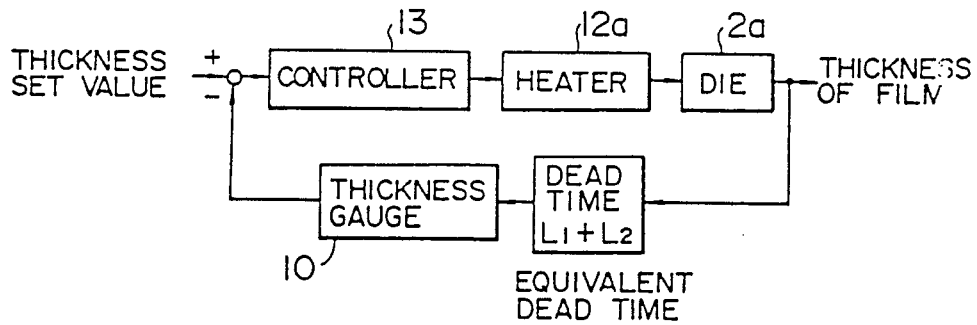

Assuming that a dead time due to movement of the film from an outlet of the die to the thickness gauge is $L_1$ and a time required for movement of the thickness gauge from the thickness measurement point 3' to an end of the film is $L_2$, the whole dead time L of the output vector y is given, as shown in FIG. 5(b), by:

$$L = L_1 + L_2 \tag{4}$$

Accordingly, the output equation (3) is expressed by:

$$y(t) = Cx(t - L) \tag{5}$$

The relation between the input u(t) (amount of heat generated by the heater) and the output y(t) (detected value of the thickness gauge) is shown in FIG. 7 on the basis of the equations (2) and (5).

(d) Arrival End Identification Signal

Figure 8:
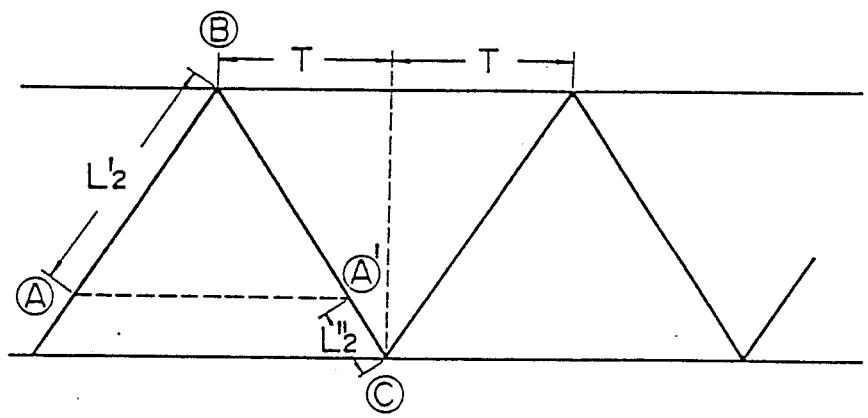
FIG. 8 shows a locus of a thickness gauge for detecting thickness of film.

The thickness gauge measures thickness of film while moving in reciprocating manner along the width of the film. Since the film is moved at a certain speed, the thickness gauge measures the film thickness along a locus as shown in FIG. 8. When the position of the thickness 3' is shown by Ⓐ in FIG. 8, the dead time $L_2$ due to movement of the thickness gauge is expressed by a time $L_2'$ corresponding to movement between Ⓐ and Ⓑ in FIG. 8.

On the other hand, when the control calculation is made at an end of the film shown by Ⓒ of FIG. 8, the dead time $L_2$ due to movement of the thickness gauge is expressed by a time $L_2''$ corresponding to movement between Ⓐ' and Ⓒ in FIG. 8. As seen from FIG. 8, since the times $L_2'$ and $L_2''$ are different, the control system which controls the thickness 3' to a predetermined value is characterized in that the dead time L of FIG. 7 in the case where the control calculation is made at the end of the film shown by (B) of FIG. 8 is different from that in the case where the control calculation is made at the end of the film shown by (C) of FIG. 8. Accordingly, the thickness gauge produces the arrival end identification signal d indicating an end at which the thickness gauge arrives.

(e) Integrator and Output $\overline{X}_I(t)$ Thereof

In order to avoid influence of external disturbance due to thermal conduction from an adjacent heaters to control the thickness 3' to a set value, an integrator is introduced to integrate deviation $\epsilon(t) = r_3(t) - y_3(t)$ between the detected value $y_3(t)$ of the thickness 3' and the set value $r_3(t)$. In the following description, the set value $r_3(t) = 0$.

The integrator integrates the deviation $\epsilon(t)$ until the current time t. However, the deviation can be actually integrated only until the time $(t - L)$ because of the dead time L. Accordingly, an output $\overline{X}_I(t)$ of the integrator is expressed by the following equation:

$$\begin{aligned}\overline{X}_I(t) &= \int_0^t \epsilon(\tau)d\tau = \int_0^{t-L} \epsilon(\tau)d\tau + \int_{t-L}^t \epsilon(\tau)d\tau \\ &= -\int_0^{t-L} y_3(\tau)d\tau - \int_{t-L}^t y_3(\tau)d\tau\end{aligned} \tag{6}$$

$$\overline{X}_I(t) = -\int_0^{t-L} C_3 X(\tau)d\tau - \int_{t-L}^t C_3 X(\tau)d\tau$$

where $C_3$ expresses the third line of C matrix of the equation (3).

(f) Augmented System State Vector $\overline{X}(t)$

The first term of the right side of the equation (6) is time-integration of a value capable of being obtained from the thickness gauge until time t and accordingly it can be calculated. However, the integrated value of the second term of the right side can not be obtained and the time integration can not be calculated as it is. Accordingly, in order to obtain prediction of $\overline{X}_I(t)$ at time t, an augmented system as follows in which $\overline{X}_I(t)$ is contained in the state variable is considered.

From the equation (6), the following equation is obtained:

$$\dot{\overline{X}}_I(t) = -C_3 X(t-L) - C_3 X(t) + C_3 X(t-L) = -C_3 X(t) \tag{7}$$

From the equations (2) and (7), $$\begin{pmatrix} \dot{X}_I(t) \\ \dot{X}(t) \end{pmatrix} = \begin{pmatrix} 0 & -C_3 \\ 0 & A \end{pmatrix} \begin{pmatrix} X_I(t) \\ X(t) \end{pmatrix} + \begin{pmatrix} 0 \\ B \end{pmatrix} u(t) \tag{8}$$

By using the state vector $\overline{X}(t) = [\overline{X}_I(t), X(t)]^T$ of the augmented system, the equation (8) is expressed as follows:

$$\dot{\overline{X}}(t) = \overline{A}\overline{X}(t) + \overline{B}u(t) \tag{9}$$

$$\overline{A} = \begin{pmatrix} 0 & -C_3 \\ 0 & A \end{pmatrix} \overline{B} = \begin{pmatrix} 0 \\ B \end{pmatrix} \tag{10}$$

(g) Feedback Gain Matrix

If the state feedback gain matrix for the equation (9) is $\overline{F} = [f_1, F_2]$, the input u(t) is given by $$u(t) = -\overline{F}\overline{X}(t) = -[f_1, F_2]\begin{pmatrix} \overline{X}_I(t) \\ X(t) \end{pmatrix} = -f_1 \overline{X}_I(t) - F_2 X(t) \tag{11}$$

where $f_1$ expresses the first column of F matrix. If the feedback gain matrix $\overline{F}$ is defined so that all characteristic values of matrix $(\overline{A} - \overline{B}\overline{F})$ are in the stable region if $\overline{X}_I(t)$ and $X(t)$ are obtained, the thickness $y_3(t)$ can be controlled to a predetermined value on the basis of the input u(t) stably. Further, since the matrices $\overline{A}$ and $\overline{B}$ are not influenced by the dead time, this design method can determine the feedback gain matrix $\overline{F}$ as if it is a system having no dead time L and can obtain the high-speed response and the steady-state accuracy of the control system.

(h) Calculation of $\overline{X}_I(t)$ and $X(t)$

The problem is whether $\overline{X}_I(t)$ and $X(t)$ can be calculated or not. If $\overline{X}_I(t)$ and $X(t)$ at the current time t can not be obtained, the stable control can not be obtained in the case of the above mentioned feedback gain matrix F, and the high-speed response and the steady-state accuracy of the control system are both deteriorated. The problem (2) in the prior art can not be solved.

$\overline{X}_I(t)$ and $X(t)$ are obtained as shown in the equation (12) by initializing the time $(t-L)$ and integrating the equation (9) from the time $(t-L)$ to the time t. Since the input u(t) is already known, the state values $\overline{X}_I(t)$ and $X(t)$ are estimated by performing the integration retroactively to the past by the time L.

$$\begin{pmatrix} X_I(t) \\ X(t) \end{pmatrix} = e^{\overline{A}(t-(t-L))} \begin{pmatrix} X_I(t-L) \\ X(t-L) \end{pmatrix} + \int_{t-L}^{t} e^{\overline{A}(t-\tau)} \overline{B}u(t)dt \quad (12)$$

$$= e^{\overline{A}L} \begin{pmatrix} X_I(t-L) \\ X(t-L) \end{pmatrix} + \int_{t-L}^{t} e^{\overline{A}(t-\tau)} \overline{B}u(\tau)d\tau$$

(i) Calculation of $\overline{X}_I(t-L)$ and $X(t-L)$ $\overline{X}_I(t-L)$ of the first term of the right side of the equation (12) is expressed on the basis of the equation (7) as follows:

$$\overline{X}_I(t-L) = -\int_0^{t-L} C_3 X(\tau)d\tau \quad (13)$$

Since the right side of the equation is calculable and is an integrated value of control deviation of the output $y_3(t)$ at the current time t, the equation (13) is expressed by:

$$\overline{X}_I(t-L) = X_I(t) \quad (14)$$

where $X_I(t)$ is an integrated value of control deviation of the detected value $y_3(t)$ of the thickness 3'.

$X(t-L)$ can be estimated as follows: From the equations (2) and (5), $$\dot{X}(t-L) = Ax(t-L) + Bu(t-L) \quad (15)$$

$$y(t) = Cx(t-L) \quad (16)$$

A variable $\omega(t)$ defined by the following equation is introduced.

$$\omega(t) = X(t-L) \quad (17)$$

From the equations (15) to (17), the following equations are obtained.

$$\dot{\omega}(t) = A\omega(t) + Bu(t-L) \quad (18)$$

$$y(t) = C\omega(t) \quad (19)$$

The operational calculator for the equations (18) and (19) is designed to obtain an estimated value $\hat{X}(t-L) = \omega(t)$ from the detected thickness signal $y(t)$.

(j) Dead Time L and Calculation Period

Since the calculation is performed each time the thickness gauge reaches the point Ⓑ or Ⓒ as shown in FIG. 8, that is, at regular intervals of time T.

The relation of the dead time L and the period T of performing the control calculation is described. It is assumed that the position Ⓐ of the thickness 37 exists near the end Ⓒ of the film as shown in FIG. 8. When the control calculation is made at the end Ⓑ of the film, the whole dead time L of the equation (4) is large since the dead time $L_2'$ is large. On the other hand, when the control calculation is made at the end Ⓒ of the film, the whole dead time L is small since the dead time $L_2''$ is small.

In the embodiment, the dead time L is classified into the following two cases. A case to which the dead time L belongs is determined by the arrival end identification signal produced when the thickness gauge reaches the end of the film.

Case 1: $2T \leq L < 3T$

Case 2: $T < L < 2T$ (k) Discrete Equation

It is necessary to change the equations (18) and (19) to discrete equations for each time interval T and design the operational calculator.

(1) Case 1 ($2T \leq L < 3T$)

Figure 9:
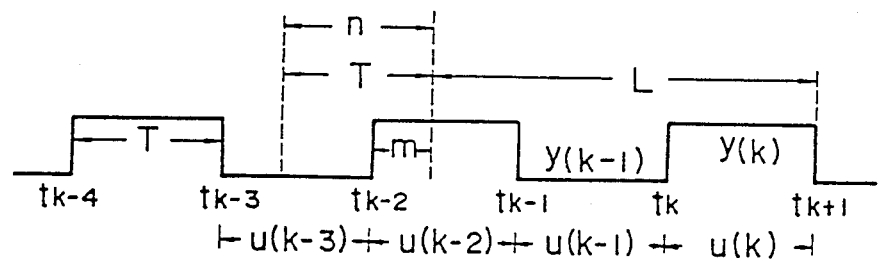
FIG. 9 is a diagram illustrating a time interval of calculation and time-integration section.

As shown in FIG. 9, it is assumed that the control calculation is performed at time $t_{k-3}$ to $t_{k-1}$. It is assumed that at the time $t_{k+1}$, the output vector $y(k+1)$ is obtained as a set of thickness data and the input vector $u(k)$ is maintained constant during time $t_k$ to $t_{k+1}$.

From the equation (18), the following equation is derived.

$$\omega(t_{k+1}) = e^A(t_{k+1} - t_k)\omega(t_k)) + \int_{t_k}^{t_{k+1}} e^A(t_{k+1} - \tau) \quad (20)$$

$$Bu(\tau - L)d\tau$$

If the following variable is introduced, the equation (20) is expressed by the equation (21).

$$\eta = t_{k+1} - \tau \quad (21)$$

$$\omega(t_{k+1}) = e^{AT}\omega(t_k) + \int_0^T e^{A\eta} Bu(t_{k+1} - \eta - L)d\eta$$

Figure 10:
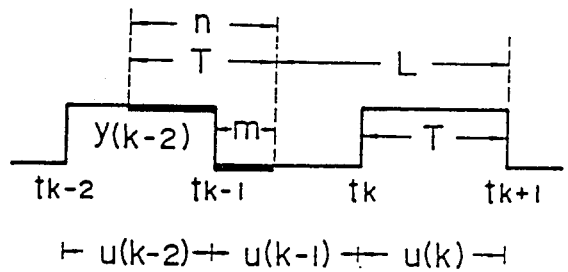
FIGS. 10, 11 and 12 are diagrams illustrating various time-integration sections.

The integration of the right side of the equation (21) means that the double-line portion of FIG. 10 is integrated. Accordingly, the equation (21) is expressed by $$\omega(t_{k+1}) = e^{AT}\omega(t_k) + \int_0^m e^{A\eta} Bd\eta u(k-2) + \quad (22)$$

$$\int_m^T e^{A\eta} Bd\eta u(k-3)$$

The following variables $\phi$, $\Gamma_1$, $\Gamma_2$ are introduced.

$$\phi = e^{AT} \quad (23)$$

$$\Gamma_1 = \int_m^T e^{A\eta} Bd\eta \quad (24)$$

$$\Gamma_2 = \int_0^m e^{A\eta} Bd\eta \quad (25)$$

If the discrete value $\omega(t_k)$ is expressed by $\omega(k)$, the equation (22) is expressed by $$\omega(k+1) = \phi \omega(k) + \Gamma_1 u(k-3) + \Gamma_2 u(k-2) \quad (27)$$

The discrete equation of the equation (19) is given by $$y(k+1) = C\omega(k+1) \quad (28)$$

By designing the operational calculator for the equations (27) and (28), the estimated value $\omega(k+1)$ at time $t = t_{k+1}$ is obtained from the following two equations.

$$\bar{\omega}(k+1) = \phi \hat{\omega}(k) + \Gamma_1 u(k-3) + \Gamma_2 u(k-2) \quad (29)$$

$$\hat{\omega}(k+1) = \bar{\omega}(k+1) + K[y(k+1) - C\bar{\omega}(k+1)] \quad (30)$$

where K is a feedback gain matrix of the operational calculator.

According to the equations (29) and (30), the state $\omega(k+19)$ at time $t = t_{k+1}$ can be estimated from the set of thickness data $y(k+1)$ at time $t = t_{k+1}$. The estimated error $\tilde{\omega}(k) = \omega(k) - \hat{\omega}(k)$ at this time is expressed by $$\tilde{\omega}(k+1) = (\phi - KC\phi)\tilde{\omega}(k) \quad (31)$$

Accordingly, if the gain matrix K of the operational calculator is defined so that all the eigen values of matrix $(\phi - KC\phi)$ exist in the stable region, the estimated error can be reduced with the lapse of time.

(2) Case 2 (T<L<2T)

As shown in FIG. 10, it is assumed that control calculation is performed at time $t_{k-2}$, $t_{k-1}$, $t_k$, and $t_{k+1}$. The integration of the right side of the equation (21) means that the double-line portion of FIG. 10 is integrated. The discrete equation at this time is expressed by $$\omega(k+i) = \phi \omega(k) + \Gamma_1 u(k-2) + \Gamma_2 u(k-1) \quad (31)$$

m of the equations (24) and (25) is given by $$m = 2T - L \quad (32)$$

The estimated value $\omega(k+1)$ at time $t = t_{k+1}$ is obtained from the following two equations.

$$\bar{\omega}(k+1) = \phi \hat{\omega}(k) + \Gamma_1 u(k-2) + \Gamma_2 u(k-1) \quad (33)$$

$$\hat{\omega}(k+1) = \bar{\omega}(k+1) + K[y(k+1) - C\bar{\omega}(k+1)] \quad (34)$$

The equation of the estimated error is the same as the equation (31) and the same thing as the case 1 is applicable in order to reduce the estimated error with the lapse of time.

From the foregoing, the estimated value of the state $X(t_{k+1} - L)$ at $t = t_{k+1}$ can be obtained in the following sequence.

(1) If time $t = t_{k+1}$ is a termination time of the calculation execution period T and it is understood from the arrival end identification signal produced from the thickness gauge that the thickness gauge reaches the end (B) of the film as shown in FIG. 8, $\hat{\omega}(k+1)$ is calculated from the equations (29) and (30) and the estimated value $\hat{x}(t_{k+1} - L) = \hat{\omega}(k+1)$ of $x(t_{k+1} - L)$ is obtained.

(2) If time $t = t_{k+1}$ is a termination time of the control calculation execution period T and it is understood from the arrival end identification signal produced from the thickness gauge that the thickness gauge reaches the end (C) of the film as shown in FIG. 8, $\hat{\omega}(k+1)$ is calculated from the equations (33) and (34) and the estimated value $\hat{x}(t_{k+1} - L) = \hat{\omega}(k+1)$ is obtained.

(1) Calculation of Second Term of Equation (12)

The final thing to do is to obtain the integration term of the right side of the equation (12), that is, $$I = \int_{t-L}^{t} e^{\bar{A}(t-\tau)} \bar{B} u(\tau) d\tau \text{ is}$$

The integration I is to predict variation of the state $$\begin{pmatrix} X_f(t) \\ X(t) \end{pmatrix}$$

by the input $u(t)$ from time $(t-L)$ to time $t$.

At this time, the dead time L is classified to the following two cases. A case to which the dead time L belongs is determined by the arrival end identification signal produced from the thickness gauge.

Case 1: $2T \leq L < 3T$

Case 2: $T < L < 2T$ (1) Case 1. ($2T \leq L < 3T$)

Figure 11:
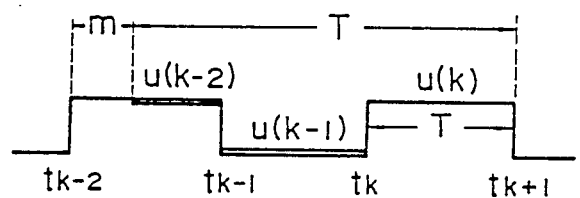

In the integration I, the double-line portion of FIG. 11 is integrated.

$$I(k+1) = \int_{t_{k+1} - L}^{t_{k+1} - L + T - m} e^{\bar{A}(t_{k+1} - \tau)} \bar{B} d\tau u(k-2) + \quad (35)$$

$$\int_{t_{k+1} - L + T - m}^{t_{k+1} - L + T - m + T} e^{\bar{A}(t_{k+1} - \tau)} \bar{B} d\tau u(k-1) +$$

$$\int_{t_{k+1} - L + T - m + T}^{t_{k+1} - L + T - m + 2T} e^{\bar{A}(t_{k+1} - \tau)} \bar{B} d\tau u(k)$$

$$m = 3T - L$$

If the following variable is introduced, the integration I is expressed by the equation (37).

$$\eta = t_{k+1} - \tau \quad (36)$$

$$I(k+1) = e^{\bar{A}(2T)} \int_{0}^{L - 2T} e^{\bar{A}\sigma} \bar{B} d\sigma u(k-2) + \quad (37)$$

$$e^{\bar{A}T} \int_{0}^{T} e^{\bar{A}\sigma} \bar{B} d\sigma u(k-1) + \int_{0}^{T} e^{\bar{A}\sigma} \bar{B} d\sigma u(k)$$

(2) Case 2 (T<L<2T)

Figure 12:
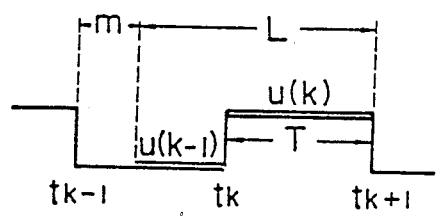

In the integration I, the double-line portion of FIG. 12 is integrated.

$$I(k+1) = \int_{t_{k+1} - L}^{t_{k+1} - L + T - m} e^{\bar{A}(t_{k+1} - \tau)} \bar{B} d\tau u(k-1) +$$

$$\int_{t_{k+1} - L + T - m}^{t_{k+1}} e^{\bar{A}(t_{k+1} - \tau)} \bar{B} d\tau u(k)$$

If the variable $\eta$ of the equation (36) is introduced, the integration I is expressed by $$I(k+1) = e^{\bar{A}T} \int_{0}^{L - T} e^{\bar{A}\sigma} \bar{B} d\sigma u(k-1) + \quad (38)$$

$$\int_{0}^{T} e^{\bar{A}\sigma} \bar{B} d\sigma u(k)$$

(m) Estimated Value of State Value $[\bar{X}_f(t), X(t)]^T$

From the equations (12), (14), (29), (30), (33), (34), (37) and (38), the estimated value $[\hat{X}_f(k+1), \hat{X}(k+1)]^T$ of the state value $[\overline{X}_f(t), X(t)]^T$ at current time $t = t_{k+1}$ is obtained from the following equation.

$$\begin{pmatrix} \hat{\overline{X}}_f(k+1) \\ \hat{X}(k+1) \end{pmatrix} = e^{\overline{A}L} \begin{pmatrix} X_f(k+1) \\ \hat{\omega}(k+1) \end{pmatrix} + I(k+1) \quad (39)$$

(n) Means for Executing Calculation

Figure 1:
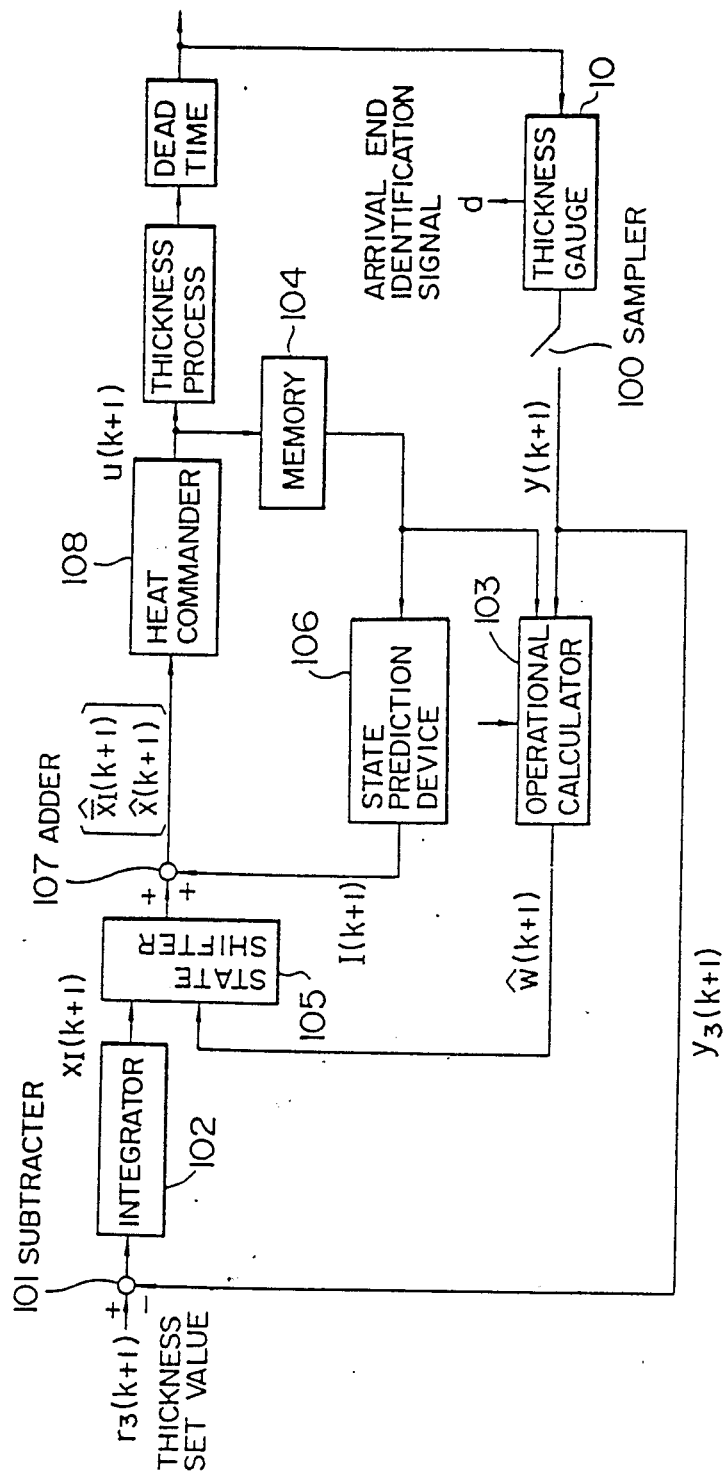
FIG. 1 is a block diagram of a controller according to a first embodiment of the first invention.
Figure 2:
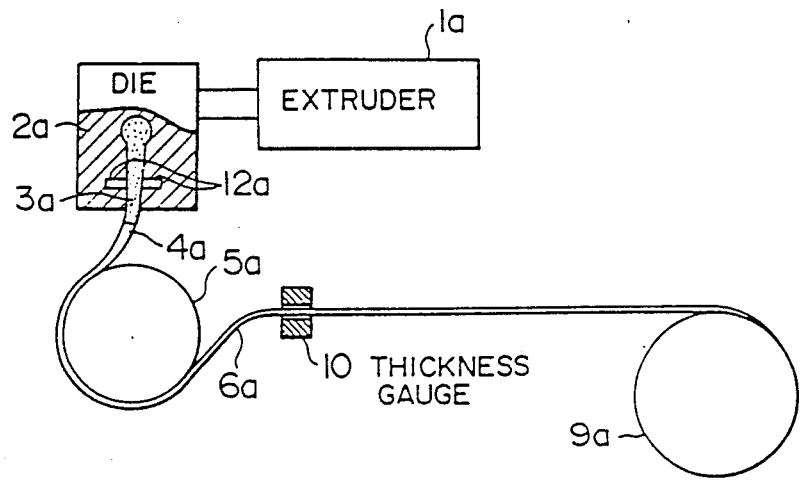
FIG. 2 schematically illustrates a configuration of a conventional film manufacturing plant.
Figure 3:
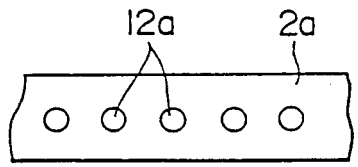
FIG. 3 is a front view showing an conventional arrangement of heaters embedded in a die.
Figure 4:
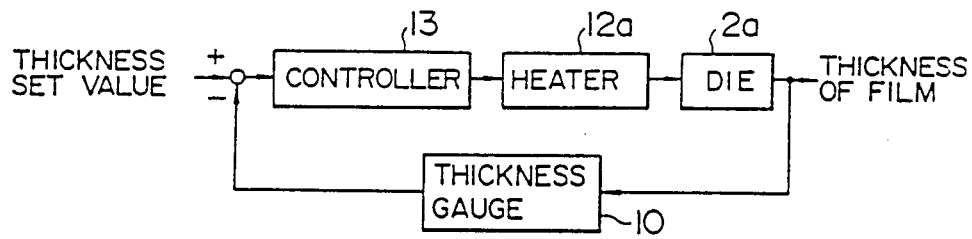
FIG. 4 is a block diagram of a conventional film thickness controller.

FIG. 1 is a block diagram of a controller implementing the first invention. In the first embodiment, each of blocks is operated as follows.

(1) The detected value $y(k+1)$ of film thickness (vector consisting of $y_1(k+1)$, $y_2(k+1)$, $y_3(k+1)$, $y_4(k+1)$ and $y_5(k+1)$ is obtained through a thickness gauge 10 and a sampler 100 at the control calculation execution time $t = t_{k+1}$ of the time interval T. The sampler 100 closes for each calculation execution time $t = t_{k+1}$, that is, the sampler 100 closes each time the thickness gauge 10 reaches the end Ⓑ or Ⓒ of the film shown in FIG. 8. Further, when the thickness gauge 10 reaches the end Ⓑ or Ⓒ of the film, the gauge 10 produces the arrival end identification signal d which indicates the end to which the gauge has reached.

(2) The detected value $y_3(k+1)$ of the detected film thickness value $y(k+1)$ is supplied to a subtracter 101 which produces thickness deviation $\epsilon(k+1) = r_3(k+1) - y_3(k+1)$ between the detected value $y_3(k+1)$ and a set value of thickness $r_3(k+1)$.

(3) The integrator 102 is supplied with the thickness deviation $\epsilon(k+1)$ from the subtracter 101 and produces a time-integrated value of the thickness deviation from the following equation.

$$X_I(k+1) = X_I(k) + 0.5(t_{k+1} - t_k)\{\epsilon(k) + \epsilon(k+1)\} \quad (40)$$

where $\epsilon(k)$ is a thickness deviation at the last thickness detection time $(t = t_k)$ and $X_I(k)$ is an output of the integrator 102 at $t = t_k$.

The integrator 102 includes a function of an external disturbance compensator and serves to compensate external heat varying the thickness $y_3$ with heat generated by the heater so that the thickness $y_3$ is always maintained to be a set value.

(4) When the thickness gauge reaches either end of the film, the thickness gauge produces the arrival end identification signal d. $\omega(k+1)$ is calculated from the equations (29) and (30) or (33) and (34) in response to the identification signal d. More particularly, in the equation (29) and (30) for the past time sequence data of heat generated by the heater stored a memory 104, $u(k-3)$ and $u(k-2)$ are supplied to the operational calculator, while in the equations (33) and (34), $u(k-2)$ and $u(k-1)$ together with the detected film thickness value $y(k+1)$ are supplied to the operational calculator, which produces an estimated value $\hat{X}(t_{k+1} - L) = \hat{\omega}(k+1)$ of the state variable at time $t(k+1-L)$ earlier than time $t_{k+1}$ by the dead time L determined by the arrival end identification signal d produced by the thickness gauge.

(5) In the calculation of the first term of the right side of the equation (39), the state estimated value $[X_1(k+1), \hat{\omega}(k+1)]^T$ at time $(t_{k+1} - L)$ is multiplied by a coefficient $e^{\overline{A}L}$ for shifting the state by the dead time L to obtain the state estimated value $e^{\overline{A}L}[X_f(k+1), \hat{\omega}(k+1)]^T$ at time $t_{k+1}$. That is, the output $X_f(k+1)$ of the integrator 102 and the output $\omega(k+1)$ of the operational calculator 103 are supplied to state shifter 105, which multiplies them by the coefficient for shifting the state by the dead time L determined by the arrival end identification signal d of the thickness gauge to obtain the state estimated value at time $t_{k+1}$. Since the magnitude of the dead time L is different depending on the end of the film which the thickness gauge reaches, the coefficient $e^{\overline{A}L}$ is different depending to the position of the thickness gauge upon control calculation execution, that is, the arrival end identification signal d of the thickness gauge.

The state shift by the input $u(k)$ applied in time domain for only the dead time L is expressed by the second term $I(k+1)$ of the right side of the equation (39) and correction therefor is made by a state prediction device 106.

(6) The second term $I(k+1)$ of the right side of the equation (39) expresses an amount of shift of states for time sequence input data $u(k-2)$, $u(k-1)$ and $u(k)$ applied to the time domain from time $(t_{k+1} - L)$ to time $t_{k+1}$. $I(k+1)$ is calculated from the equation (37) or (38) depending on the end of the film which the thickness gauge reaches, that is, depending on the arrival end identification signal produced by the thickness gauge. More particularly, the past time sequence data of the heat generated by the heater (in this case, three data of $u(k-2)$, $u(k-1)$ and $u(k)$) determined by the magnitude of the dead time L stored in the memory 104 are supplied to the state prediction device 106 and the state variation amount $I(k+1)$ by the input $u(k)$ from time $(t_{k+1} - L)$ to time $t_{k+1}$.

(7) Output $e^{\overline{A}L}[X_f(k+1), \hat{\omega}(k+1)]^T$ of the state shifter 105 and output $I(k+1)$ of the state prediction device are added in adder 107 which produces the state estimated value $[\hat{\overline{X}}_f(k+1), \hat{X}(k+1)]^T$ at time $t_{k+1}$. Thus, although the operational calculator 103 can obtain only the state estimated value at time $t_{k+1} - L$ due to the dead time L, the state estimated value at time $t_{k+1}$ can be obtained by integration in the state shifter 105 and the state prediction device 106 for the dead time L. Influence of phase delay due to the dead time L can be eliminated by this operation.

(8) An amount $u(k+1)$ of heat generated by the heater from time $t_{k+1}$ to next time $t_{k+2}$ for control calculation is defined by the following equation using state feedback gain $(f_1, F_2)$.

$$u(k+1) = -f_1\hat{\overline{X}}_f(k+1) - F_2\hat{X}(k+1) \quad (41)$$

The adder 107 supplies the state estimated value $[\hat{\overline{X}}(k+1), \hat{X}(k+1)]^T$ at time $t_{k+1}$ to a commander 108 for heat generated by the heater. The commander 108 multiplies the state estimated value $[\hat{\overline{X}}(k+1), \hat{X}(k+1)]^T$ by the state feedback gain to define a command value of heat generated by the heater.

(9) The above control calculation is executed after the next detected value $y(k+2)$ of film thickness is obtained from the sampler 100 at time $t = t_{k+2}$ of calculation execution when the thickness gauge is moved along the width of the film after the time period T and reaches the opposite film end.

(o) Example of Design

As a first actual example, an example of design is described in the case where transfer functions $g_1(s)$, $g_2(s)$ and $g_3(s)$ are given by the following equations:

$$g_1(s) = \frac{0.044}{S^3 + 2.1S^2 + 2.6S + 0.05} \quad (42)$$

-continued $$g_2(s) = \frac{0.0009}{S^4 + 2.4S^3 + 2.7S^2 + 0.25S + 0.0015} \quad (43)$$

$$g_3(s) = \frac{0.00002}{S^5 + 2.4S^4 + 2.8S^3 + 0.31S^2 + 0.0084S + 0.0004} \quad (44)$$

$u_i(t)$ (i=1-5) is variation (Kcal/s) of heat generated by the heater, and $y_i(t)$ (i=1-5) is variation (cm) of thickness of film at the position of the thickness gauge corresponding to the position of the heater. The dead time $L_1$ due to movement of the film and times $L_1'$ and $L_2''$ required for movement of the thickness gauge from the thickness control point 3' to the film end assume the following values.

$L_1 = 30$ seconds $L_2' = 15$ seconds $L_2'' = 1.5$ seconds

It is assumed that the thickness control point 3' exists at the end ⓒ of the film as shown in FIG. 8. The control calculation execution period T assumes the following value.

$$T = 16.5 \text{ seconds} \quad (45)$$

In order to design the control system, it is necessary to express the relation between the input u(t) and the output y(t) of the equation (1) and obtain the controllable and observable state equations (2) and (3). G(s) constituted of $g_1(s)$, $g_2(s)$ and $g_3(s)$ of the equations (42) to (44) can be expressed by an equation of the 77th degree, while the controllable and observable equation has been found to be an equation of the 39th degree. Accordingly, the equations (2) and (3) of the 39th degree are obtained from G(s).

(1) Decision of State Feedback Gain Matrix $\bar{F}$

The state feedback gain matrix $\bar{F}$ of the equation (11) is obtained as a solution of an optimum regulator problem for the state equation (8) extended to the equation of the 40th degree on the basis of the equation (2). Since the equation (8) is a state equation of a continuous time system, the equation is changed to a discrete state function with the sampling period T=16.5 seconds and a regulator solution is applied. A proper estimation function is employed to obtain the state feedback gain matrix $\bar{F}$ and as a result the following values are obtained as the eigen values of the matrix $(\bar{A} - \bar{B}\bar{F})$.

0.876±0.02i, 0.79, 0.50±0.07i, 0.60±0.09i, 0.60±0.06i, 0.51

Further, 30 eigen values other than above are not described since the absolute value thereof is less than 0.1 and attenuation is fast. Since all eigen values are within a circle having a radius of 1, stable control can be attained. Since the eigen value having the slowest attenuation is 0.88±0.02i, the stabilization time Ts can be predicted as about 10 minutes from $(0876)^{35} \approx 0.01$ with definition of control error 1% as follows.

$Ts = T \times 35 = 16.5 \times 35$ sec. $= 577.5$ sec. $= 9.6$ min.

(2) Decision of Feedback Gain K of Operational Calculator

The feedback gain matrix K of the operational calculator of the equation (30) or (34) is obtained for the state equation (27) or (31) of the 39th degree and the output equation (28) of the fifth degree. The gain matrix K is obtained as a solution of the optimum regulator problem so that the matrix $\{\phi^T - (C\phi)^T K^T\}$ has a stable eigen value. As a result of obtaining the gain matrix K using a proper estimation function, the following values are obtained as eigen values of the matrix $(\phi - KC\phi)$.

0.9077±0.0002i, 0.9076, 0.9075, 0.9075, 0.772±0.0001i, 0.722, 0.722, 0.722, 0.722, 0.576±1×10⁻⁵i, 0.576±1×10⁻⁵i, 0.232, 0.232, 0.232, 0.232, 0.232

30 eigen values other than above concentrate to the origin. Since all the values are within a circle having a radius of 1, the estimated error can be reduced with the lapse of time. Since the eigen value having the slowest attenuation is 0.9077, the time To required for attenuation of the estimated error to an initial 1% can be predicted from $(0.9077)^{45} \approx 0.01$ as follows.

$To = T \times 45 = 16.5 \times 45$ sec. $= 742.5$ sec. $= 12.4$ min.

(p) Simulation Example (1)

Figure 13A:
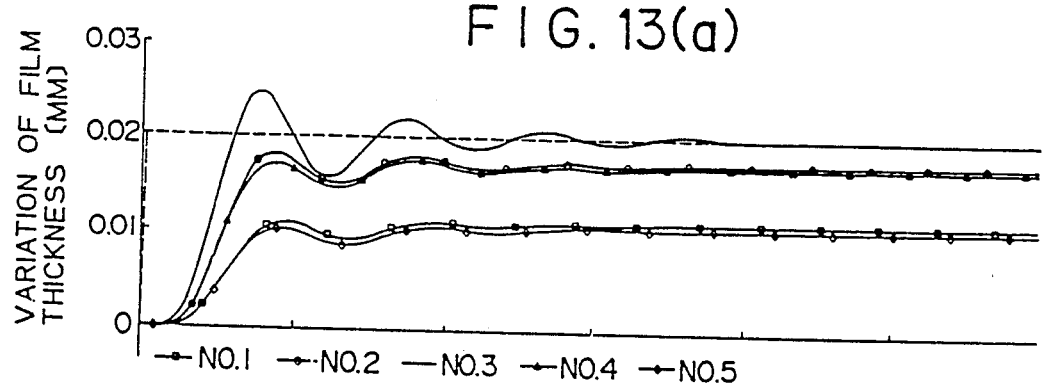
FIGS. 13a, 13b, 14a, and 14b are graphs showing simulation results using an apparatus of the first embodiment of the first invention (when a set value of thickness is changed and when external heat is added to a heater, respectively)
Figure 13B:
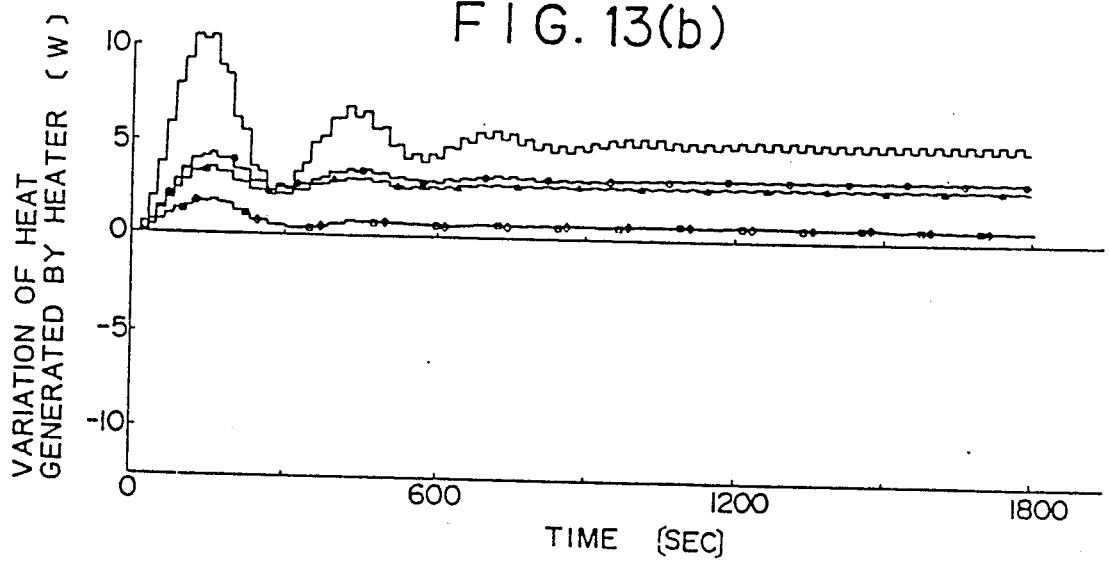

FIG. 13 shows an example of simulation result obtained by calculation using the gain matrices $\bar{F}$ and K obtained above. FIG. 13(a) shows variations (variations of detected values of the thickness gauge) of five thickness values $y_1$ to $y_5$ versus time when the set value of thickness $y_3$ is changed stepwise by 0.02 mm. FIG. 13(b) shows variations of amounts $u_1$ to $u_5$ of heat generated by the heaters in the same condition as FIG. 13(a).

Since calculation is made after the execution period of 16.5 seconds of calculation after the set value of thickness has been changed, variation of heat generated by the heater occurs after 16.5 seconds from change of the set value of thickness. An amount of heat generated by the heater is maintained to the same value until 16.5 seconds elapse and the next calculation is made. The calculation is made on the basis of a newly detected value of thickness after 16.5 seconds to change an amount of heat generated by the heater. Accordingly, an amount of heat generated by the heater changes stepwise as shown in FIG. 13(b).

On the other hand, variation of the detected thickness value is detected after the lapse of the dead time L of 31.5 seconds after the amount of heat generated by the heater has been changed after the lapse of 16.5 seconds from the change of the set value. That is, variation of thickness is detected after the lapse of 16.5+31.5=48 seconds after the set value of thickness has been changed. Thickness $y_3$ is exactly changed to a set value and the change is substantially symmetrical to the thickness $y_3$. Variation of heat generated by the heater $u_3$ is largest, variations by the heaters $u_2$ and $u_4$ are largest next to the heater $u_3$, and variations of the heaters $u_1$ and $u_5$ are smallest.

The stabilization time is about 18.5 minutes which is considerably large as compared with the stabilization time of 12.4 minutes calculated by the eigen value of the operational calculator (the stabilization time by the eigen value of the regulator is still shorter). This is based on the following reason.

In order to prevent the command value of heat generated by the heater from being changed largely for each calculation, the command value is defined with weight added as follows.

$$u_{d,k} = W u_{d,k-1} + (1-W)u_k \qquad (46)$$

where
- $u_{d,k}$: command value of heat defined by the calculation time $t=t_k$,
- $u_{d,k-1}$: command value of heat defined by the last calculation time $t=t_{k-1}$,
- $u_k$: command value of heat calculated at the calculation time $t=t_k$, and
- W: weight coefficient.

In this simulation, $W=0.8$. This means that when the calculation period $T=16.5$ seconds is considered, a time delay corresponding to a delay of first order having a time constant of 74.65 seconds is added to the heat commander. Accordingly, it is considered that the stabilization time of thickness control of FIG. 13 is larger than the stabilization time estimated by the eigen value of the operational calculator. Then, even if the thickness control is in the stabilization state, the command value of heat changes for each calculation. The reason is because the magnitude of the dead time L of the first term $e^{AL}$ of the right side of the equation (39) which is one of the calculation equations is different in one end Ⓑ and the other end Ⓒ of the film as shown in FIG. 8.

When the present control system is applied actually, the same calculation equation as that applied to the thickness $y_3$ is applied to each of thicknesses $y_1$, $y_2$, $y_4$, and $y_5$ and each command value of heat may be produced as a sum of results of the calculation equations. It will be understood that the control system considerably reduces influence of the dead time since the time required for stabilizing variation of thickness when heat generated by the heater is changed stepwise without control of heat is about 10 minutes.

(q) Simulation Example (2)

Figure 14A:
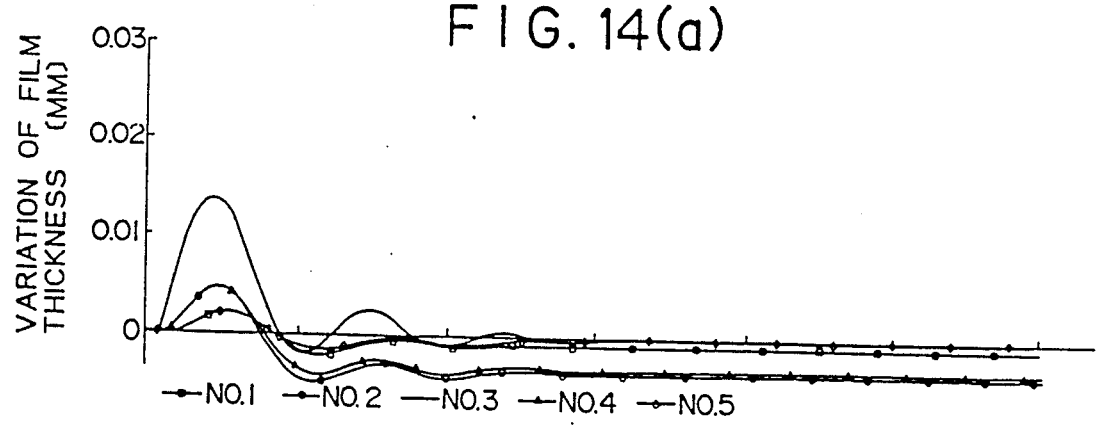
Figure 14B:
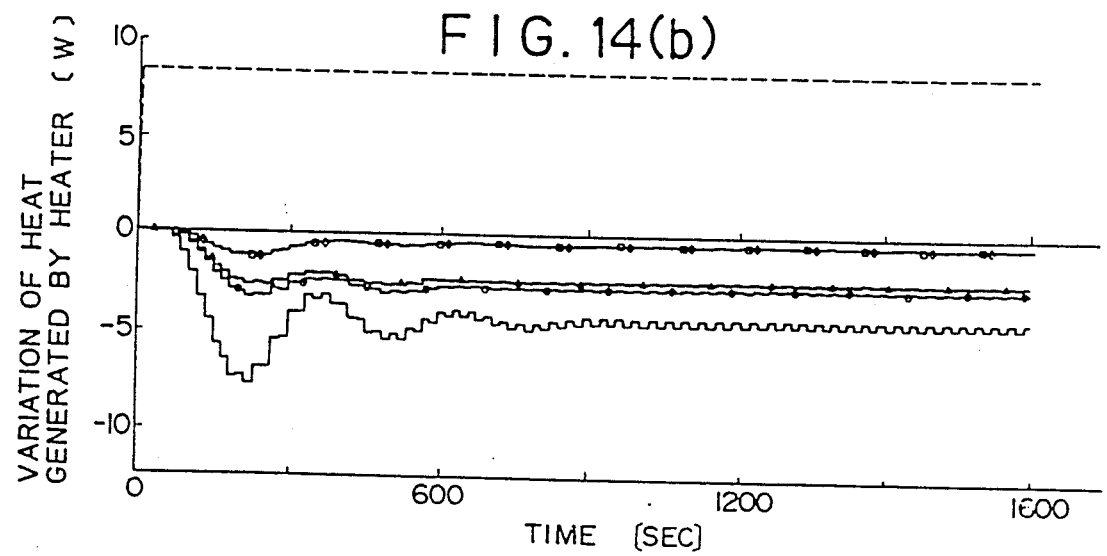

The second actual example is now described with reference to FIG. 14, which shows a control result when external heat of 8.4 wattage is applied to the heater $u_3$. FIG. 14(a) shows variations of thickness values $y_1$ to $y_5$ versus time, and FIG. 14(b) shows variations of heat $u_1$ to $u_5$ generated by the heaters versus time. As shown in FIG. 14(a), although the thickness $y_3$ is once increased by the external heat of the heater $u_3$, the thickness $y_3$ is returned to the original set value by changing the amounts of heat generated by the heaters $u_1$ to $u_5$ and the stabilization time is about 18.5 minutes in the same manner as FIG. 13. It is understood that variation due to the external disturbance is exactly compensated by introducing the integrator in the present control system.

The thickness values $y_2$ and $y_4$ are once increased by influence of external heat through thermal conduction along the width of the die. The thickness values $y_1$ and $y_5$ are also influenced similarly, although the influence is small as compared with $y_2$ and $y_4$. In order to cancel the influence of such external heat, reduction of heat generated by the heater $u_3$ is largest, reduction by the heaters $u_2$ and $u_4$ is largest next to the heater $u_3$, and reduction by the heaters $u_1$ and $u_5$ is smallest. When external heat is applied to the heater $u_3$, other thickness values $y_1$, $y_2$, $y_4$ and $y_5$ are also changed, although such interference effect can be canceled by applying the same calculation equation as that for the thickness value $y_3$ to each of the thickness values $y_1$, $y_2$, $y_4$ and $y_5$.

A2. Second Embodiment of First Invention

(a) Relation to First Embodiment of First Invention

In the second embodiment, the process that the same elements as in the first embodiment are utilized, the equations (1) to (19) are derived, the operational calculator for the equations (18) and (19) is designed and the estimated value $\hat{X}(t-L) = \hat{\omega}((t))$ of $X(t-L)$ is obtained from the detected value of thickness $y(t)$ is quite identical with that of the first embodiment.

In the second embodiment, a known $\hat{\omega}(t_k)$ obtained by the calculation performed in the step just before the current step is used to obtain $\hat{\omega}(t_{k+1})$.

(b) Dead Time

In the second embodiment, the calculation is also executed each time the thickness gauge reaches the end Ⓑ or Ⓒ of the film as shown in FIG. 8. That is, the calculation is executed at regular intervals of time T. The time T is a time required for movement of the thickness gauge along the width of the film.

On the other hand, the dead time L for the position Ⓐ of thickness 3 is different depending on the end Ⓑ and the end Ⓒ. That is, Dead time by calculation for the end Ⓑ : $L_B = L_1 + L_2''$ Dead time by calculation for the end Ⓒ : $L_C = L_1 + L_2''$ It is apparent that $L_B > L_C$ for the position Ⓐ. In the description below, it is assumed that $L_B$ and $L_C$ satisfy $T < L < 2T$.

(c) Known $\hat{\omega}(t_k)$

Figure 15:
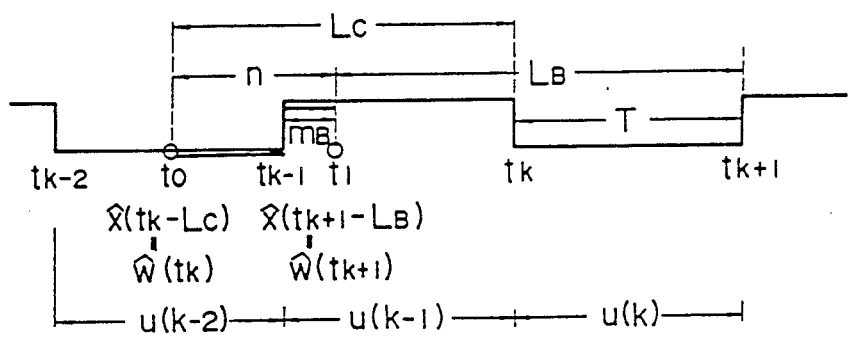

FIG. 15 is a diagram for explaining the calculation for the end Ⓑ for obtaining the estimated value $\hat{\omega}(t_{k+1} - L_B)$. It is assumed that the calculation is made at time $t_{k-2}$ to $t_{k+1}$. Further, it is assumed that the input $u(k)$ of the heater is maintained to constant from $t_k$ to $t_{k+1}$.

It is assumed that the thickness gauge reaches the end Ⓑ at time $t_{k+1}$. Accordingly, it is considered that the thickness gauge has reached the end Ⓒ at the past time $t_k$ before time $t_{k+1}$ by time T. Thus, it is assumed that the estimated value $\hat{\omega}(t_k) = \hat{X}(t_k - L_c)$ has been obtained in the calculation for the end Ⓒ executed at time $t_k$. In the calculation for the end Ⓑ executed at time $t_{k+1}$, the known $\hat{\omega}(t_k)$ is employed to obtain the estimated value $\hat{\omega}(t_{k+1}) = \hat{X}(t_{k+1} - L_B)$.

Figure 16:
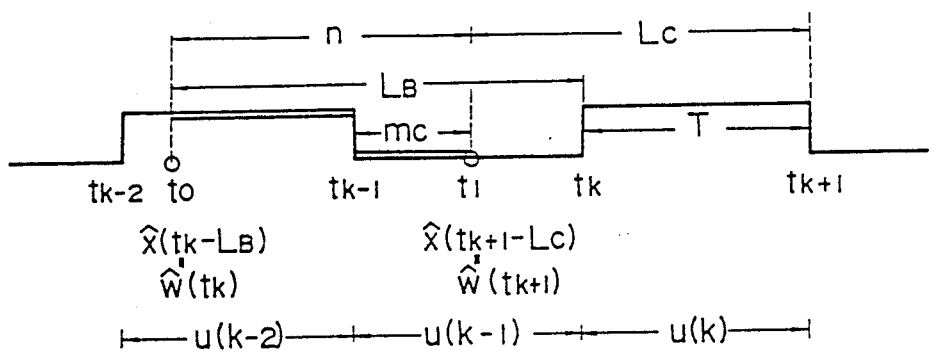

FIG. 16 is a diagram for explaining the calculation for the end Ⓒ for obtaining the estimated value $\hat{X}(t_{k+1} - L_C)$. It is assumed that the thickness gauge reaches the end Ⓒ at time $t_{k+1}$ and the thickness gauge has reached the end Ⓑ at the past time $t_k$ earlier than time $t_{k+1}$ by time T. In the calculation for the end Ⓒ executed at time $t_{k+1}$, the known $\omega(t_k)$ is employed to obtain the estimated value $\hat{\omega}(t_{k+1}) = \hat{X}(t_{k+1} - L_C)$.

As seen from FIGS. 15 and 16, the time interval T of the calculation is constant, while since the dead times $L_B$ and $L_C$ for the ends Ⓑ and Ⓒ, respectively, are different, the time difference expressing the estimated values $\hat{\omega}(t_k)$ and $\hat{\omega}(t_{k+1})$ is different from the time interval T. Accordingly, the estimated value $\omega(t_{k+1})$ is obtained from the equations (18) and (19) as follows.

(d) Discrete Equation (18) for the End Ⓑ

The calculation for the end Ⓑ shown in FIG. 15 is first considered. The known estimated value $\hat{\omega}(t_k) = \hat{X}(t_k - L_C)$ is expressed by $\hat{X}(t_o)$. The estimated value $\hat{\omega}(t_{k+1}) = \hat{X}(t_{k+1} - L_B)$ to be obtained is expressed by $\hat{X}(t_1)$. The estimated value $X(t_1)$ of state variable at time $t_1$ is estimated from the equation (18) on the basis of the known $X(t_o)$ and inputs after time $t_o$.

$$\tilde{X}(t_1) = e^{A(t_1-t_o)}\hat{X}(t_o) + \int_{t_o}^{t_1} e^{A(t_1-\tau)} Bu(\tau)d\tau \quad (48)$$

$$\cdot \, t_o = t_k - L_C, \, t_1 = t_{k+1} - L_B, \, t_1 - t_o = T - L_B + L_C$$

When a new variable $\eta = t_1 - \tau$ is introduced, the estimated value $\tilde{X}(t_1)$ is transformed as follows:

$$\tilde{X}(t_1) = e^{A(t_1-t_o)}\hat{X}(t_o) + \int_{o}^{t_1-t_o} e^{A\eta} Bu(t_1-\eta)d\tau \quad (49)$$

Since the integration of the right side of the equation (49) means that the double-line portion of FIG. 15 is integrated, the equation (49) is expressed by the following equation.

$$\tilde{X}(t_1) = e^A(T - L_B + L_C)\hat{X}(t_o) + \int_{o}^{m_B} e^{A\eta} Bd\eta(k-1) + \quad (50)$$

$$\int_{m_B}^{T - L_B + L_C} e^{A\eta} Bd\eta u(k-2)$$

$$m_B = 2T - L_B$$

where $u(k-1)$ is a heater input from time $t_{k-1}$ to $t_k$, and $u(k-2)$ is a heater input from time $t_{k-2}$ to $t_{k-1}$. If $\tilde{X}(t_1) = \tilde{\omega}(t_{k+1})$ and $\hat{X}(t_o) = \hat{\omega}(t_k)$, the equation (50) is expressed by $$\tilde{\omega}(k+1) = e^A(T - L_B - L_C)\hat{\omega}(k) + \int_{o}^{m_B} e^{A\eta} Bd\eta(k-1) + \quad (51)$$

$$\int_{m_B}^{T - L_B + L_C} e^{A\eta} Bd\eta u(k-2)$$

where the discrete value $\omega(t_k)$ is expressed by $\omega(k)$.

(e) Discrete Equation (18) for the End Ⓒ

The calculation for the end Ⓒ shown in FIG. 16 is considered. At this time, in the equation (49)

$$t_o = t_k - L_B, \, t_1 = t_{k+1} - L_C, \, t_1 - t_o = T - L_C + L_B$$

By integrating the double-line portion of FIG. 16, the following equation is obtained.

$$\tilde{X}(t_1) = e^A(T - L_C + L_B)\hat{X}(t_o) + \int_{o}^{m_B} e^{A\eta} Bd\eta u(k-1) + \quad (52)$$

$$\int_{m_C}^{T - L_C + L_B} e^{A\eta} Bd\eta u(k-2)$$

$$m_C = 2T - L_C$$

If $\tilde{X}(t_1) = \tilde{\omega}(t_{k+1})$ and $\hat{X}(t_o) = \hat{\omega}(t_k)$, the estimated value $\hat{\omega}(t_{k+1})$ is given from the equation (52) by $$\tilde{\omega}(k+1) = e^A(T - L_B - L_C)\hat{\omega}(k) + \int_{o}^{m_C} e^{A\eta} Bd\eta u(k-1) + \quad (53)$$

$$\int_{m_C}^{T - L_B + L_C} e^{A\eta} Bd\eta u(k-2)$$

(f) Discrete Equation for Equation (19)

The discrete equation for the equation (19) is given by $$y(k+1) = C\omega(k+1) \quad (54)$$

(g) Calculation of Estimated Value $\hat{\omega}(k+1)$

By designing the operational calculator in accordance with the equations (51), (53) and (54), the estimated value $\hat{\omega}(t_{k+1})$ at $t = t_{k+1}$ is obtained as follows.

The calculation equation of the estimated value $\omega(k+1)$ for the end Ⓑ is given by $$\tilde{\omega}(k+1) = \phi_B\hat{\omega}(k) + \int_{b}^{m_B} e^{A\eta} Bd\eta u(k-1) + \quad (55)$$

$$\int_{m_B}^{T - L_B + L_C} e^{A\eta} Bd\eta u(k-2)$$

$$\hat{\omega}(k+1) = \tilde{\omega}(k+1) + K_B[y(k+1) - \tilde{C\omega}(k+1)] \quad (56)$$

where
$\phi_B = e^A(T - L_B + L_C)$
$K_B$ = gain matrix of the operational calculator.

The calculation equation of the estimated value $\hat{\omega}(k+1)$ for the end Ⓒ is given by $$\tilde{\omega}(k+1) = \phi_C\hat{\omega}(k) + \int_{o}^{m_C} e^{A\eta} Bd\eta u(k-1) + \quad (57)$$

$$\int_{m_C}^{T - L_C + L_B} e^{A\eta} Bd\eta u(k-2)$$

$$\hat{\omega}(k+1) = \tilde{\omega}(k+1) + K_C[y(k+1) - \tilde{C\omega}(k+1)] \quad (58)$$

where
$\phi_C = e^A(T - L_C + L_B)$
$K_C$ = gain matrix of the operational calculator.

According to the equations (55) and (58), the state variable $\omega(k+1)$ at $t = t_{k+1}$ can be estimated by a set of thickness data $y(k+1)$ at $t = t_{k+1}$.

(h) Estimated Error $\bar{\omega}(k)$

At this time, the estimated error $\bar{\omega}(k) = \omega(k) - \hat{\omega}(k)$ is expressed by the following equation:

The estimated error $\bar{\omega}(k+1)$ for the end Ⓑ is given by $$\bar{\omega}(k+1) = [\phi_B - K_B C\phi_B]\bar{\omega}(k) \quad (59)$$

The estimated error $\bar{\omega}(k+1)$ for the end Ⓒ is given by $$\bar{\omega}(k+1) = [\phi_C - K_C C\phi_C]\bar{\omega}(k) \quad (60)$$

Accordingly, if the gain matrices $K_B$ and $K_C$ of the operational calculator are defined so that all eigen values of the matrices $[\phi_B - K_B C\phi_B]$ and $[\phi_C - K_C C\phi_C]$

(i) Summary of Calculation of Estimated Value of $\hat{\omega}$ (k+1)

From the foregoing, the estimated value of the state $X(t_{k+1}-L)$ at $t=t_{k+1}$ can be obtained in accordance with the following sequence.

(1) When $t=t_{k+1}$ is a termination time of the period T of calculation execution and it is discriminated on the basis of the arrival end identification signal produced by the thickness gauge that the thickness gauge has reached th end (B) of the film shown in FIG. 8, $\hat{\omega}$ (k+1) is calculated from the equations (55) and (56) and the estimated value $\hat{X}(t_{k+1}-L_B)=\hat{\omega}$ (k+1) of $X(T_{k+1}-L_B)$ is obtained.

(2) When $t=t_{k+1}$ is a termination time of the period T of calculation execution and it is discriminated on the basis of the arrival end identification signal produced by the thickness gauge that the thickness gauge has reached th end (C) of the film shown in FIG. 8, $\hat{\omega}$ (k+1) is calculated from the equations (57) and (58) and the estimated value $\hat{X}(t_{k+1}-L_C)=\hat{\omega}$ (k+1) is obtained. Thus, the first term of the right side of the equation (12) can be calculated.

(j) Integration of Second Term of Equation (12)

The final thing to do is to obtain the integration term of the right side of the equation (12), that is, $$I = \int_{t-L}^{t} e^{\bar{A}(t-\tau)}\bar{B}u(\tau)d\tau$$

Figure 17:
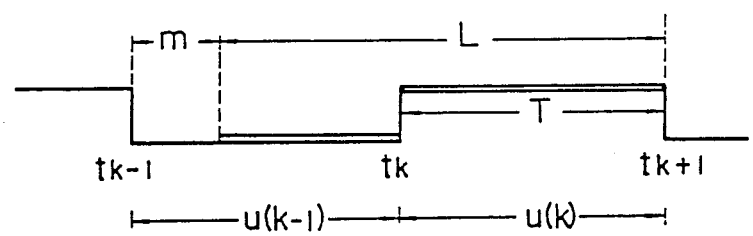

This integration term I is to predict variation of the state $$\begin{bmatrix} X_f(t) \\ X(t) \end{bmatrix}$$

by the input u(t) from time (t−L) to time t. The integration I is to integrate the double-line portion of FIG. 17.

$$I(k+1) = \int_{t_{k+1}-L}^{t_{k+1}-L+T-m} e^{A(t_{k+1}-\tau)}\bar{B}d\tau u(k-1) +$$

$$\int_{t_{k+1}-L+T-m}^{t_{k+1}} e^{A(t_{k+1}-\tau)}\bar{B}d\tau u(k)$$

$$m = 2T - L$$

If a new variable $\eta=t_{k+1}-\tau$ is introduced, the integration $I(k+1)$ is expressed by $$I(k+1) = e^{\bar{A}T}\int_0^{L-T} e^{\bar{A}\sigma}\bar{B}d\sigma u(k-1) + \qquad (61)$$

$$\int_0^T e^{\bar{A}\tau}\bar{B}d\sigma u(k)$$

Since the dead time L is different depending on the calculation for the ends (B) and (C), the equation (61) is described as follows.

The integration $I_B(k+1)$ for the end (B) is given by $$I_B(k+1) = e^{\bar{A}T}\int_0^{L_B-T} e^{\bar{A}\sigma}\bar{B}d\sigma u(k-1) + \qquad (62)$$

$$\int_0^T e^{\bar{A}\sigma}\bar{B}d\sigma u(k)$$

The integration $I_C(k+1)$ for the end (C) is given by $$I_C(k+1) = e^{\bar{A}T}\int_0^{L_C-T} e^{\bar{A}\sigma}\bar{B}d\sigma u(k-1) + \qquad (62)$$

$$\int_0^T e^{\bar{A}\sigma}\bar{B}d\sigma u(k)$$

(k) Estimated Value $[\hat{\bar{X}}_f(k+1),\hat{X}(k+1)]^T$

From the equations (12), (14), (55), (56), (57), (58), (62) and (63), the estimated value $[\hat{\bar{X}}_f(k+1),\hat{X}(k+1)]^T$ of the state value $[\bar{X}_f(t),X(t)]^T$ at the current time $t=t_{k+1}$ is obtained by the following equations.

The estimated value for the end (B) is given by $$\begin{bmatrix} \hat{X}_f(k+1) \\ \hat{X}(k+1) \end{bmatrix} = e^{\bar{A}L_B}\begin{bmatrix} X_f(k+1) \\ \omega(k+1) \end{bmatrix} + I_B(k+1) \qquad (64)$$

The estimated value for the end (C) is given by $$\begin{bmatrix} \hat{X}_f(k+1) \\ \hat{X}(k+1) \end{bmatrix} = e^{\bar{A}L_C}\begin{bmatrix} X_f(k+1) \\ \hat{\omega}(k+1) \end{bmatrix} + I_C(k+1) \qquad (64)$$

(1) Discontinuity of Estimated Value $[\hat{X}_f(k+1),\hat{X}(k+1)]^T$

Figure 18A:
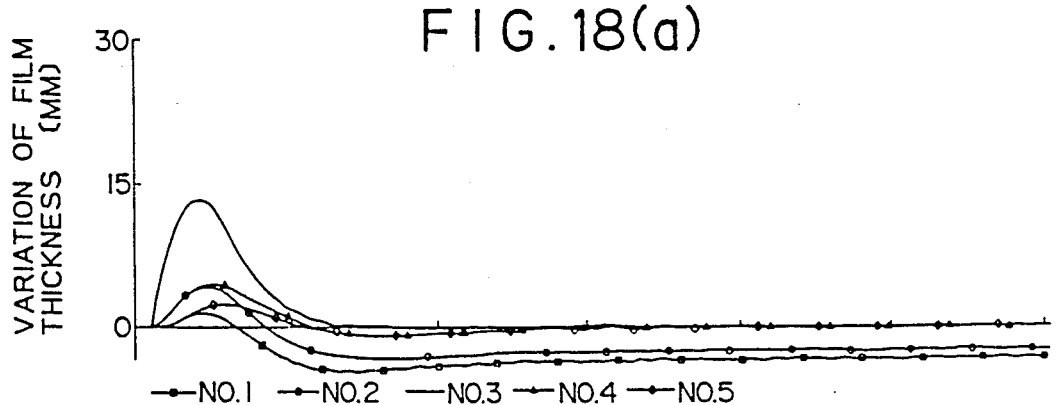
FIGS. 18a, 18b, 19a and 19b are graphs showing simulation results illustrating effects in the case where an average dead time L is used as an integration section of a state shifter and a state prediction device.
Figure 18B:
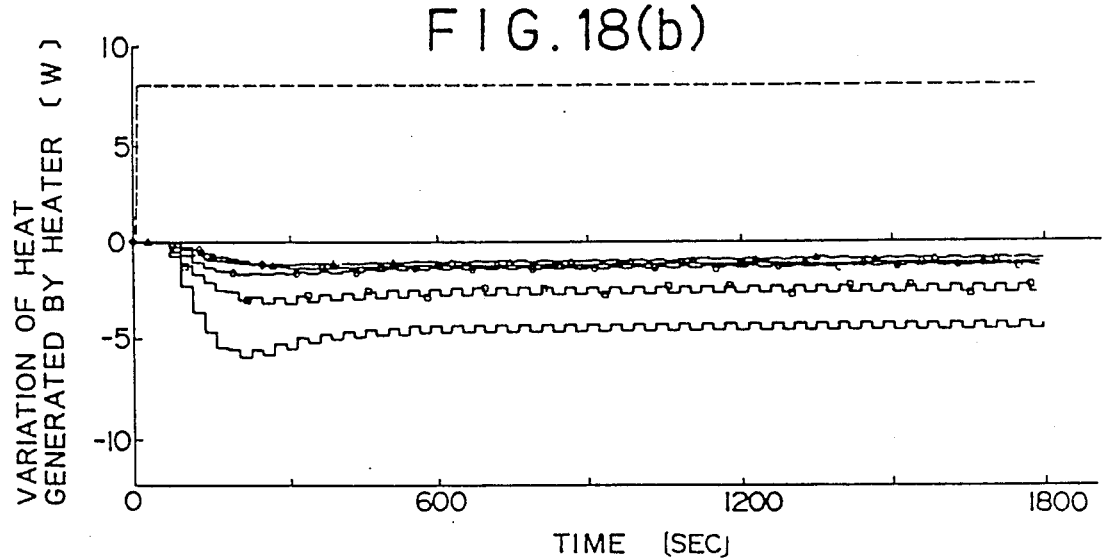

When the calculation equation for the estimated value $[\bar{X}_f(k+1),\hat{X}(k+1)]^T$ of the state value at time $t_{k+1}$ is changed depending on the end (B) or (C) as described in the equation (64) and (65), since the dead times $L_B$ and $L_C$ are different and change stepwise, the estimated value is not continuous each time the equation is changed. When the dead time $L_B$ is larger than the dead time $L_C$, the estimated value of the equation (64) is larger than that of the equation (65) and accordingly the estimated value by the equation (11) repeatedly changes in the pulse manner. FIG. 18 shows a simulation result when the estimated value is calculated using the equations (64) and (65). In FIG. 18, the time interval of calculation t=22.5 seconds, the dead time $L_B=39$ seconds and $L_C=37$ seconds. FIG. 18 shows a control result when external heat of 8W is applied to the heater $u_3$ stepwise. FIG. 18(a) shows variations of thickness values $y_1$ to $y_5$ versus time, and FIG. 18(b) shows variations of amounts $u_1$ to $u_5$ of heat generated by the heaters versus time. As shown in FIG. 18(a), the thickness $y_3$ is once increased by the external heat, although the thickness $y_3$ is returned to the original set value by changing the amounts of heat generated by the heaters $u_1$ to $u_5$. However, heat generated by the heaters is repeatedly changed in the steady state and the thickness is also slightly changed repeatedly. When the position of thickness $y_3$ approaches the end of the film, since a difference between the dead times $L_B$ and $L_C$ is increased, a width of variation of heat generated by the heater is increased and variation of thickness is also larger when the estimated equations (64) and (65) are employed.

(m) Average Value $\overline{L}$ of Dead Time

In order to improve the above drawback, an average value of $L_B$ and $L_C$, that is, $\overline{L}=(L_B+L_C)/2$ is employed as the dead time used in the equations (64) and (65). The equation of the estimated can be used in common for the ends (B) and (C).

$$\begin{bmatrix} \hat{\tilde{X}}_I(k+1) \\ \hat{\tilde{X}}(k+1) \end{bmatrix} = e^{\tilde{A}\overline{L}} \begin{bmatrix} X_I(k+1) \\ \hat{\omega}(k+1) \end{bmatrix} + \overline{I}(k+1) \quad (66)$$

$$\overline{I}(k+1) = e^{\tilde{A}T} \int_0^{\overline{L}-T} e^{\tilde{A}\sigma}\overline{B}d\sigma u(k-1) + \quad (67)$$

$$\int_0^T e^{\tilde{A}\sigma}\overline{B}d\sigma u(k)$$

$$\overline{L} = (L_B + L_C)/2 \quad (68)$$

(n) Simulation Example

Figure 19A:
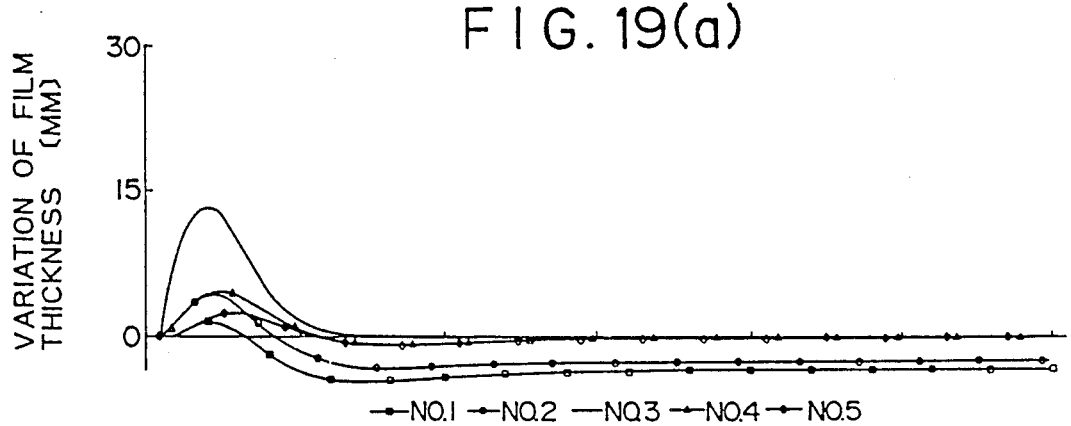
Figure 19B:
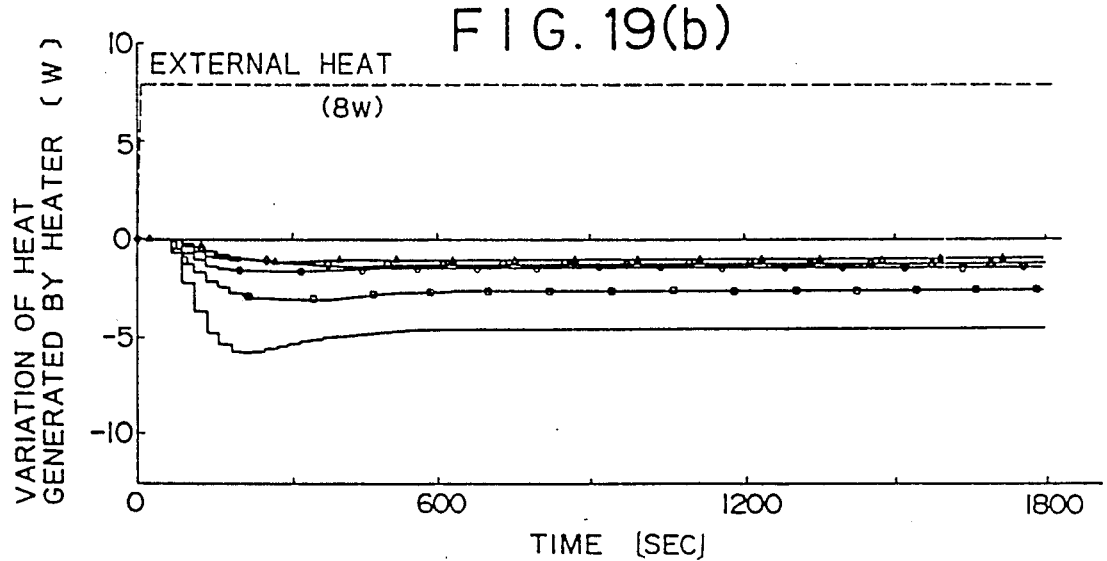

FIG. 19 shows a simulation result when the equations (66), (67) and (68) are used as the equation of the estimated value with the same condition as in FIG. 18. Variation in the steady state of heat generated by the heater is eliminated.

(o) Means for Executing Calculation

FIG. 1 is a block diagram of a controller implementing the first invention. In the second embodiment, each of blocks is operated as follows.

(1) The detected value $y(k+1)$ of film thickness (vector consisting of $y_1(k+1)$, $y_2(k+1)$, $y_3(k+1)$, $y_4(k+1)$ and $y_5(k+1)$) is obtained through the thickness gauge 10 and the sampler 100 at the calculation execution time $t=t_{k+1}$ of the time interval T. The sampler 100 closes for each calculation execution time $t=t_{k+1}$, that is, the sampler 100 closes each time the thickness gauge 10 reaches the end (B) or (C) of the film shown in FIG. 8. Further, when the thickness gauge 10 reaches the end (B) or (C) of the film, the gauge 10 produces the arrival end identification signal d which indicates the end which the gauge has reached.

(2) The detected value $y_3(k+1)$ of the detected film thickness value $y(k+1)$ is supplied to a subtracter 101 which produces thickness deviation $\epsilon(k+1)=r_3(k+1)-y_3(k+1)$ between the detected value $y_3(k+1)$ and a set value of thickness $r_3(k+1)$.

(3) The integrator 102 is supplied with the thickness deviation $\epsilon(k+1)$ from the substracter 101 and produces a time-integrated value of the thickness deviation from the following equation.

$$X_I(k+1)=X_I(k)+0.5(t_{k+1}-t_k)\{\epsilon(k)+\epsilon(k+1)\} \quad (69)$$

where $\epsilon(k)$ is thickness deviation at the last thickness detection time $(t=t_k)$ and $X_I(k)$ is an output of the integrator 102 at $t=t_k$.

The integrator 102 includes a function of an external disturbance compensator and serves to compensate external heat varying the thickness $y_3$ with heat generated by the heater so that the thickness $y_3$ is always maintained to be a set value.

(4) When the thickness gauge reaches either end of the film, the thickness gauge produces the arrival end identification signal d. $\hat{\omega}(k+1)$ is calculated from the equations (55) and (56) or (57) and (58) in response to the identification signal d. More particularly, the past time sequence data $u(k-2)$ and $u(k-1)$ of heat generated by the heater stored a memory 104 together with the detected film thickness value $y(k+1)$ are supplied to the operational calculator, which produces an estimated value $\hat{X}(t_{k+1}-L)=\hat{\omega}(k+1)$ of the state variable at time $t_{(k+1}-L)$ earlier than time $t_{k+1}$ by the dead time L determined by the arrival end identification signal d produced by the thickness gauge.

(5) In the calculation of the first term of the right side of the equation (66), the state estimated value $[X_I(k+1), \hat{\omega}(k+1)]^T$ at time $(t_{k+1}-L)$ is multiplied by a coefficient $e^{\tilde{A}\overline{L}}$ for shifting the state by the average dead time $\overline{L}$ defined by the equation (68) to obtain the state estimated value $e^{\tilde{A}\overline{L}}[X_I(k+1), \hat{\omega}(k+1)]^T$ at time $t_{k+1}$. That is, the output $X_I(k+1)$ of the integrator 102 and the output $\hat{\omega}(k+1)$ of the operational calculator 103 are supplied to state shifter 105, which multiplies them by the coefficient for shifting the state by the average dead time $\overline{L}$ to obtain the state estimated value at time $t_{k+1}$. The magnitude of the dead time $\overline{L}$ adopts the average value of the dead times for both ends of the film as described by the equation (68).

The state shift by the input $u(k)$ applied in time domain for only the average dead time $\overline{L}$ is expressed by the second term $\overline{I}(k+1)$ of the right side of the equation (66) and correction therefor is made by a state prediction device 106.

(6) The second term $\overline{I}(k+1)$ of the right side of the equation (66) expresses an amount of shift of states for time sequence input data $u(k-1)$ and $u(k)$ applied to the time domain of the average dead time from time $(t_{k+1}-\overline{L})$ to time $t_{k+1}$. $\overline{I}(k+1)$ is calculated from the equation (67) using the average dead time $\overline{L}$. More particularly, the past time sequence data of the heat generated by the heater (in this case, two data of $u(k-1)$ and $u(k)$) determined by the magnitude of the dead time $\overline{L}$ stored in the memory 104 are supplied to the state prediction device 106 and the state variation amount $\overline{I}(k+1)$ by the input $u(k)$ from time $(t_{k+1}-\overline{L})$ to time $t_{k+1}$.

(7) Output $e^{\tilde{A}\overline{L}}[X_I(k+1), \hat{\omega}(k+1)]^T$ of the state shifter 105 and output $\overline{I}(k+1)$ of the state prediction device are added in adder 107 which produces the state estimated value $[\tilde{X}_I(k+1), \overline{X}(k+1)]^T$ at time $t_{k+1}$. Thus, although the operational calculator 103 can obtain only the state estimated value at time $t_{k+1}-L$ due to the dead time L, the state estimated value at time $t_{k+1}$ can be obtained by integration in the state shifter 105 and the state prediction device 106 for the dead time L. Influence of phase delay due to the dead time L can be eliminated by this operation.

(8) An amount $u(k+1)$ of heat generated by the heater from time $t_{k+1}$ to next time $t_{k+2}$ for calculation is defined by the following equation using state feedback gain $(f_1, F_2)$.

$$u(k+1)=-f_1\tilde{X}_I(k+1)-F_2\hat{X}(k+1) \quad (41)$$

The adder 107 supplies the state estimated value $[\tilde{X}(k+1), \hat{X}(k+1)]^T$ at time $t_{k+1}$ to a commander 108 for heat generated by the heater. The commander 108 multiplies the state estimated value $[\hat{X}(k+1), \hat{X}(k+1)]^T$ by the state feedback gain to define a command value of heat generated by the heater.

(9) The above control calculation is executed after the next detected value y(k+2) of film thickness is obtained from the sampler 100 at time $t=t_{k+2}$ of calculation execution when the thickness gauge is moved along the width of the film after the time period T and reaches the opposite film end.

(p) Example of Design

As a first actual example, an example of design is described in the case where transfer functions $g_1(S)$, $g_2(S)$ and $g_3(S)$ are given by the following equations:

$$g_1(s) = \frac{0.14}{S^3 + 5.5S^2 + 12.5S + 0.25} \quad (69)$$

$$g_2(s) = \frac{0.003}{S^4 + 6.4S^3 + 13.2S^2 + 1.3S + 0.009} \quad (70)$$

$$g_3(s) = \frac{0.00005}{S^5 + 6.3S^4 + 13.8S^3 + 1.6S^2 + 0.04S + 0.0002} \quad (71)$$

$u_i(t)(i=1-5)$ is variation (watt) of heat generated by the heater, and $y_i(t)(i=1-5)$ is variation (micron) of thickness of film at the position of the thickness gauge corresponding to the position of the heater. The dead time $L_1$ due to movement of the film and times $L_1'$ and $L_2''$ required for movement of the thickness gauge from the thickness control point 3' to the film end assume the following values.

$L_1 = 26$ seconds $L_2' = 17$ seconds $L_2'' = 7.5$ seconds

Accordingly $L_B = 43$ seconds $L_C = 33.5$ seconds

It is assumed that the thickness control point 3' exists at the end Ⓒ of the film as shown in FIG. 8. The control calculation execution period T assumes the following value.

$T = 22.5$ seconds (72)

In order to design the control system, it is necessary to express the relation between the input u(t) and the output y(t) of the equation (1) and obtain the controllable and observable state equations (2) and (3). G(s) constituted of $g_1(s)$, $g_2(s)$ and $g_3(s)$ of the equations (69) to (71) can be expressed by an equation of the 77th degree, while the controllable and observable equation has been found to be an equation of the 29th degree. Accordingly, the equations (2) and (3) of the 29th degree are obtained from G(s).

(1) Decision of State Feedback Gain Matrix $\overline{F}$

The state feedback gain matrix $\overline{F}$ of the equation (11) is obtained as a solution of an optimum regulator problem for the state equation (8) extended to the equation of the 30th degree on the basis of the equation (2). Since the equation (8) is a state equation of a continuous time system, the equation is changed to a discrete state function with the sampling period T=22.5 seconds and a regulator solution is applied. A proper estimation function is employed to obtain the state feedback gain matrix $\overline{F}$ and as a result the following values are obtained as main values for determining a response of control as the eigen values of the matrix $(\overline{A} - \overline{BF})$.

0.856, 0.8119, 0.7755, 0.7618

Further, other eigen values except above are not described since the absolute value thereof is small and attenuation is fast. Since all eigen values are within a circle having a radius of 1, stable control can be attained. Since the eigen value having the slowest attenuation is 0.8560, the stabilization time Ts can be predicted as about 11 minutes from $(0876)^{30} \approx 0.01$ with definition of control error 1% as follows.

$Ts = T \times 35 = 22 \times 30$ sec. $= 675$ sec. $= 11.3$ min.

(2) Decision of Feedback Gain K of Operational Calculator

The feedback gain matrix K of the operational calculator of the equation (56) or (58) is obtained for the state equation (55) or (58) of the 29th degree and the output equation (54) of the fifth degree. The gain matrix K is obtained as a solution of the optimum regulator problem so that the matrices $\{\phi_B{}^T - (C\phi_B)^T K_B{}^T\}$ and $\{\phi_c{}^T - (C\phi_c)^T K_c{}^T\}$ have a stable eigen value. For example, the discrete time of the state equation (55) defining the gain matrix $K_B$ is $(T - L_B + L_c) = (22.5 - 43 + 33.5) = 13$ seconds. As a result of obtaining the gain matrix K using a proper estimation function, the following values are obtained as main values for determining convergence of the operational calculator as eigen values of the matrix $(\phi_B - K_B C \phi_B)$.

0.9183, 0.9183, 0.9183, 0.9183, 0.9183, 0.7654, 0.7654, 0.7654, 0.7654, 0.7654.

Other eigen values except above are not described since the absolute values are small and convergence is fast. Since all the values are within a circle having a radius of 1, the estimated error can be reduced with the lapse of time. Since the eigen value having the slowest attenuation is 0.9183, the time To required for attenuation of the estimated error to an initial 1% can be predicted from $(0.9183)^{55} \approx 0.01$ as follows.

$To = (T - L_B + L_c) \times 55 = 13 \times 55$ sec. $= 715$ sec. $= 12$ min.

The gain matrix $K_c$ having the stabilization time To of 12 minutes is obtained for the matrix $\phi_c$.

(q) Simulation Example 1

Figure 20A:
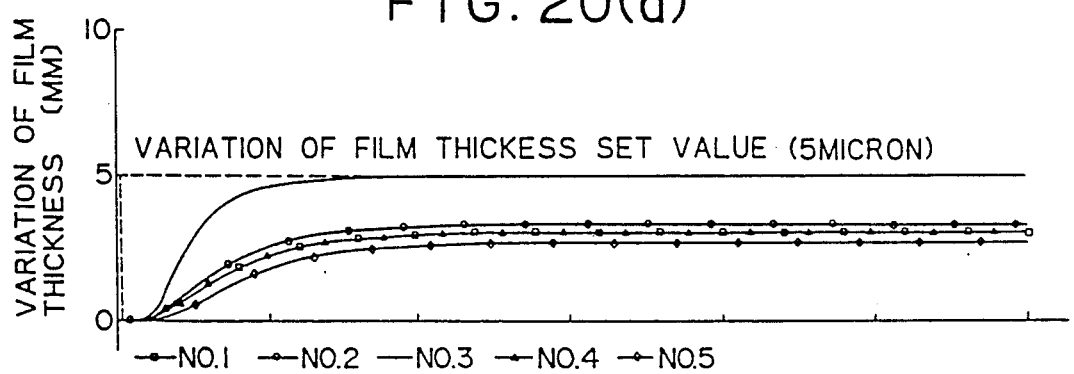
Figure 20B:
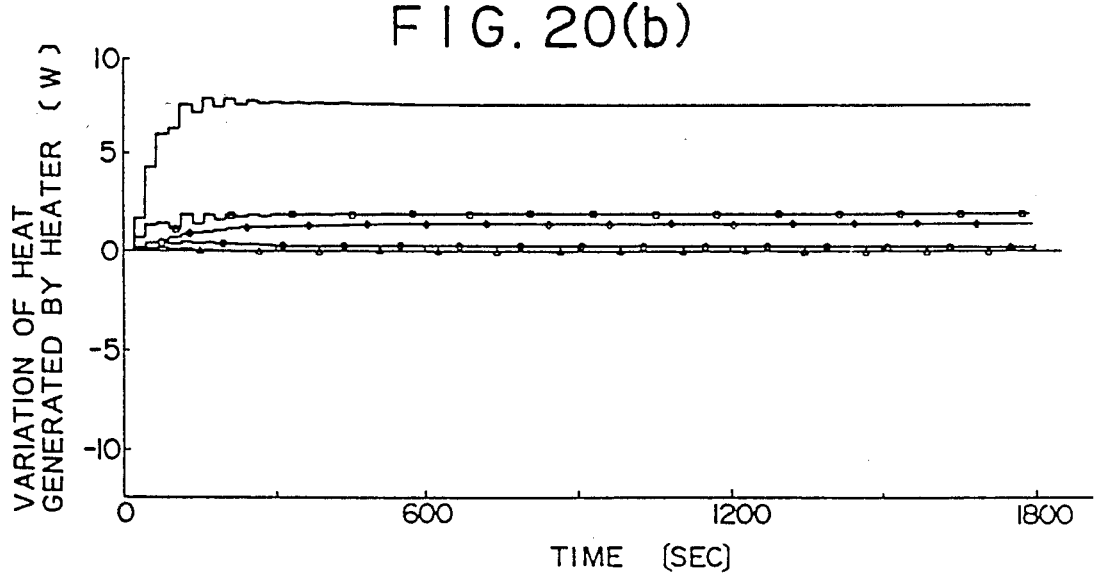

FIG. 20 shows an example of simulation result obtained by calculation using the gain matrices $\overline{F}$, $K_B$ and $K_c$ obtained above. FIG. 20(a) shows variations (variations of detected values of the thickness gauge) of five thickness values $y_1$ to $y_5$ versus time when the set value of thickness $y_3$ is changed stepwise by 5 micron. FIG. 20(b) shows variations of amounts $u_1$ to $u_5$ of heat generated by the heaters in the same condition as FIG. 13(a).

Since calculation is made after the execution period of 22.5 seconds of calculation after the set value of thickness has been changed, variation of heat generated by the heater occurs after 22.5 seconds from change of the set value of thickness. An amount of heat generated by the heater is maintained to the same value until 22.5 seconds elapse and the next calculation is made. The calculation is made on the basis of a newly detected value of thickness after 22.5 seconds to change an amount of heat generated by the heater. Accordingly, an amount of heat generated by the heater changes stepwise as shown in FIG. 20(b).

On the other hand, variation of the detected thickness value is detected after the lapse of the dead time L of 33.5 seconds after the amount of heat generated by the heater has been changed after the lapse of 22.5 seconds from the change of the set value. That is, variation of thickness is detected after the lapse of $22.5+33.5=56$ seconds after the set value of thickness has been changed. Thickness $y_3$ is exactly changed to a set value and the change is substantially symmetrical to the thickness $y_3$. Variation of heat generated by the heater $u_3$ is largest, variations by the heaters $u_1$ and $u_5$ are largest next to the heater $u_3$, and variations of the heaters $u_2$ and $u_4$ are smallest. This reason is because interference of the heaters $u_2$ and $u_4$ to thickness $y_3$ is reduced. The stabilization time which is estimated by the eigen value determined by the gain matrices $\bar{F}$, $K_B$ and $K_c$ and is 12 minutes is supported by FIG. 20. There is no variation in heat generated by the heater at the steady state, since the equation (66) is employed to compensate the dead time instead of the equations (64) and (65).

When the present control system is applied actually, the same calculation equation as that applied to the thickness $y_3$ is applied to each of thicknesses $y_1$, $y_2$, $y_4$, and $y_5$ and each command value of heat may be produced as a sum of results of the calculation equations. It will be understood that the control system considerably reduces influence of the dead time since the time required for stabilizing variation of thickness when heat generated by the heater is changed stepwise without control of heat is about 13 minutes.

(r) Simulation Example 2

Figure 21A:
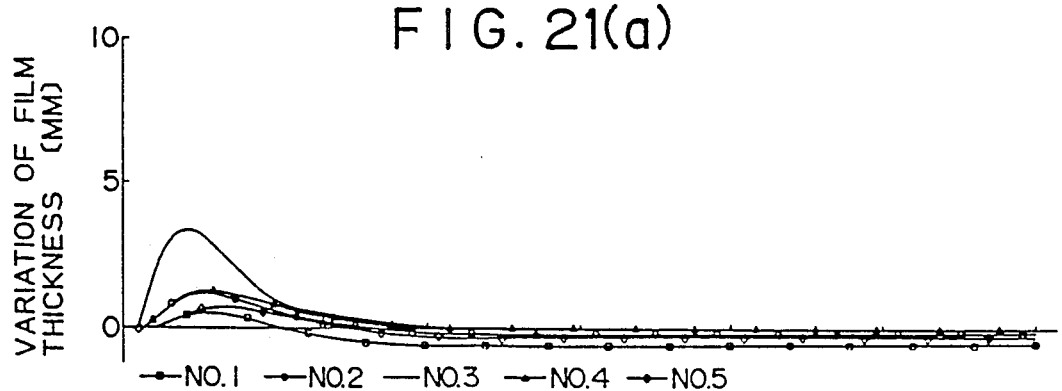
Figure 21B:
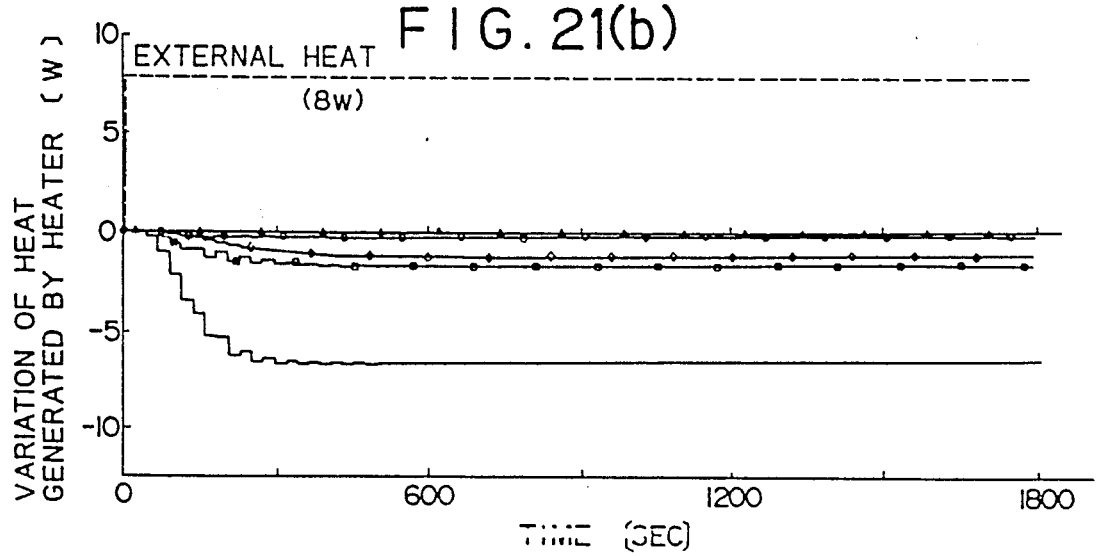

The second actual example is now described with reference to FIG. 21, which shows a control result when external heat of 8 watts is applied to the heater $u_3$. FIG. 21(a) shows variations of thickness values $y_1$ to $y_5$ versus time, and FIG. 21(b) shows variations of heat $u_1$ to $u_5$ generated by the heaters versus time. As shown in FIG. 21(a), although the thickness $y_3$ is once increased by the external heat of the heater $u_3$, the thickness $y_3$ is returned to the original set value by changing the amounts of heat generated by the heaters $u_1$ to $u_5$ and the stabilization time is about 12 minutes in the same manner as FIG. 20. It is understood that variation due to the external disturbance is exactly compensated by introducing the integrator in the present control system.

The thickness values $y_2$ and $y_4$ are once increased by influence of external heat through thermal conduction along the width of the die. The thickness values $y_1$ and $y_5$ are also influenced similarly, although the influence is small as compared with $y_2$ and $y_4$. In order to cancel the influence of such external heat, reduction of heat generated by the heater $u_3$ is largest, reduction by the heaters $u_1$ and $u_5$ is largest next to the heater $u_3$, and reduction by the heaters $u_2$ and $u_4$ is smallest. This is because the reduction in the heaters $u_2$ and $u_4$ does not influence thickness $y_3$ so much. When external heat is applied to the heater $u_3$, other thickness values $y_1$, $y_2$, $y_4$ and $y_5$ are also changed, although such interference effect can be canceled by applying the same calculation equation as that for the thickness value $y_3$ to each of the thickness values $y_1$, $y_2$, $y_4$ and $y_5$.

A3. Effects of First Invention

The present invention is configured as described above and accordingly has the following effects. The integrator which time-integrates a difference between a detected value of thickness of film at a predetermined position and a set value of thickness is introduced and an output of the integrator is fed back to compensate an amount of heat generated by the heater for external heat influencing thickness of the film so that thickness of the film can be always identical with the set value. Further, in order to avoid large phase delay due to the dead time, the state estimated value at time t-L earlier than the current time t by the dead time L is obtained by the operational calculator and the state estimated value at time t-L is time-integrated by the state shifter and the state prediction device during the dead time L so that the state estimated value at the current time t can be obtained to remove deterioration of control performance due to the dead time.

B1. First Embodiment of Second Invention

(a) Basic Configuration

The first embodiment of the second invention is described with FIGS. 22 to 27. In order to avoid duplication, detailed description for the same configuration as a conventional apparatus is omitted.

Figure 28:
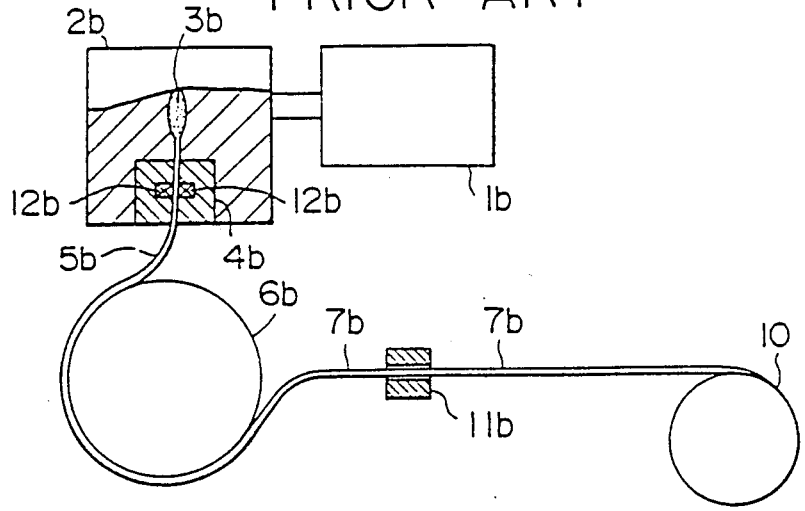
FIG. 28 schematically illustrates a configuration of a conventional film manufacturing plant.
Figure 29:
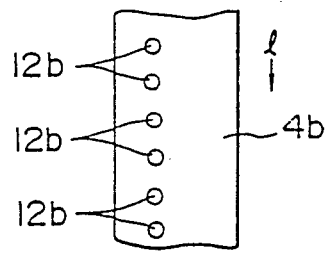
FIG. 29 illustrates an arrangement of operating terminal devices embedded in a die of FIG. 28.
Figure 30:
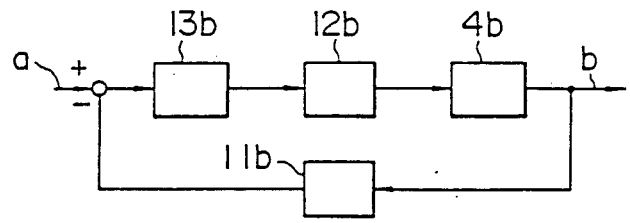
FIG. 30 is a block diagram showing a configuration of the conventional film thickness controller.

FIG. 22 is a block diagram of a film thickness controller for controlling heater and corresponding to a conventional adjusting mechanism 12b (FIG. 28). An output of a thickness gauge 11b is connected to a thickness data memory 110. An arrival end identification output signal d from the thickness gauge 11b is connected to a distributor 111 and a basic control system 112-$i$ ($i=1-N$). A plurality of outputs of the distributor 111 are connected to their corresponding basic control systems 112-$i$, respectively. Each of outputs of the basic control system 112-$i$ is connected to each of their corresponding command memories 113-$i$ for heat generated by the heaters. Each of outputs of the command memories 113-$i$ is connected to superposition adder 114. An output of the adder 114 is connected to an operation value memory 115. An output of the memory 115 is connected back to the basic control systems 112-$i$.

(b) Basic Control System

Operation of one operating terminal device of the adjusting mechanism for die lips changes thickness of a portion of film corresponding to an adjacent operating terminal device thereto. However, since the interference range thereof is limited, there is considered the basic control system including operating terminal devices disposed around a certain operating terminal device and disposed corresponding to portions of film of which thickness is changed by operation of the certain operating terminal device. The basic control system can control only thickness of a portion of film corresponding to the operating terminal device selected as a center to a predetermined value of thickness. More particularly, the basic control system can maintain the thickness of a portion of film corresponding to the certain operating terminal device to the predetermined value of thickness by varying operation values of not only the certain operating terminal device but also adjacent operating terminal devices. The basic control system takes small number of the operating terminal devices and interference to thickness of film between operating terminal devices into consideration. A control system having small number of operating terminal devices and having the following merits is hereinafter referred to as a basic control system.

(i) Stability of the control system can be ensured because of small number of operating terminal devices, and the control system having a high-speed response can be designed.

(ii) The control system which can control thickness of a portion of film corresponding to a central operating terminal device to the predetermined value to compensate external disturbance even if external disturbance is applied to the central operating terminal device as well as the adjacent operating terminal device can be designed.

(iii) Since interference to thickness of film between operating terminal devices is considered, the control system which can effectively distribute operation values to operating terminal devices including adjacent operating terminal devices to change thickness of a portion of film corresponding to the central operating terminal device can be designed. That is, variation of the operation value of the central operating terminal device is large, while variation of the operation value of the adjacent operating terminal device is smaller as influence thereof to thickness of film is smaller.

(c) Variation of Operation Value in Adjacent Operating Terminal Device as External Disturbance In order to control thickness of the film over the whole width thereof stably with a high-speed response, the above basic control system is applied to each of operating terminal devices of the adjusting mechanism. Thus, the stability of thickness control of the whole film is ensured as follows.

(i) In a basic control system i' for a certain operating terminal device i, thickness of a portion of film corresponding to the operating terminal device is ensured to be controlled to the predetermined value even if external disturbance is added to the adjacent operating terminal device. When a basic control system $(i+1)'$ is applied to an operation unit $i+1$ adjacent to the operation unit i, thickness of a portion of film corresponding to the operating terminal device $i+1$ is ensured to be controlled to the predetermined value stably.

(ii) The basic control system i' applied to the operating terminal device i can consider the operation value command in the basic control system $(i+1)'$ applied to the operating terminal device $i+1$ as an external disturbance applied to the operating terminal device of the basic control system i'.

As described in the above item (b), the basic control system can stably control thickness of a portion of film corresponding to the operating terminal device i to which the basic control system i' is applied to compensate external disturbance even if external disturbance is added to the operating terminal device in the basic control system. Accordingly, thickness of a portion of film corresponding to the operating terminal device i can be controlled stably even if another basic control system is applied to the operating terminal device $i+1$.

(d) Dead Time

In order to minimize interference effect to film thickness due to mutual interference of the operating terminal devices of the adjusting mechanism $12b$ to control thickness of film over the whole width thereof, there is considered a control system which updates operation value commands for a multiplicity of operating terminal devices simultaneously. To this end, it is necessary to move a thickness gauge in reciprocating manner along width of film to obtain all data of thickness along the width of film and perform calculation each time the thickness gauge reaches an end of film. In this case, the thickness gauge requires time to reach an end of film after measured thickness of a certain portion of film. This time is a dead time until the calculation is actually started after thickness data has been obtained. Accordingly, the dead time from after an operation value in the operating terminal device has been changed until thickness of film influenced by the change of the operation value has been detected as a thickness data and the detected thickness data is employed to perform calculation is a sum of a dead time $L_1$ due to movement of film from the die lips to the thickness gauge and the above mentioned dead time $L_2$. That is, the dead time L of the equation (3b) is expressed by $$L = L_1 + L_2 \tag{4b}$$

Figure 27:
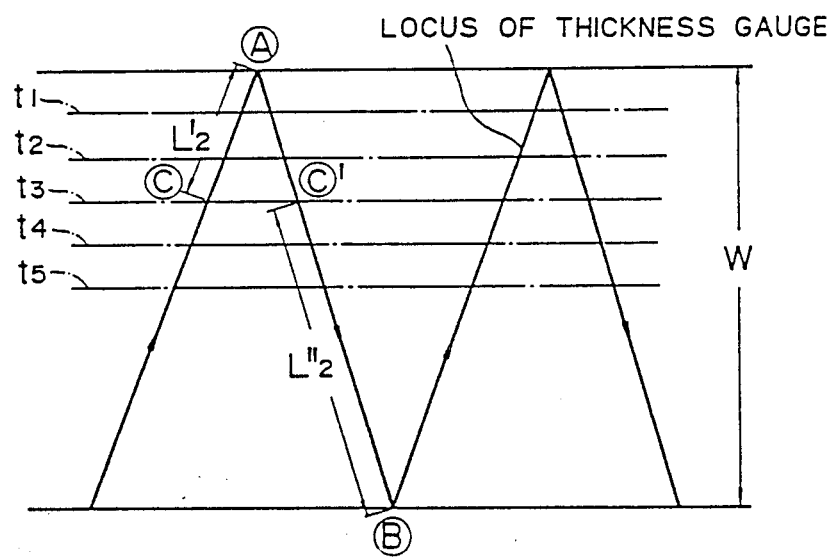
FIG. 27 illustrates a locus of a thickness gauge which is reciprocated to detect thickness of film in the embodiment.

The thickness gauge measures thickness of film while being moved in reciprocating manner along the width of film. Since the film is moved at a certain speed, the thickness gauge measures thickness of film along a locus as shown in FIG. 27. If a position of a portion of film having thickness t3 is indicated by a point Ⓒ in FIG. 27, the dead time $L_2$ due to movement of the thickness gauge in the case where calculation is made at an end Ⓐ of film is expressed by a time $L_2'$ of movement of the thickness gauge between the points Ⓐ and Ⓒ in FIG. 27.

On the other hand, when calculation is made at an end Ⓑ of film, the dead time $L_2$ due to movement of the thickness gauge is expressed by a time $L_2''$ of movement of the thickness gauge between the points Ⓒ' and Ⓑ in FIG. 27. As seen from FIG. 27, since the dead times $L_2'$ and $L_2''$ are generally different from each other, the control system for controlling thickness t3 to a predetermined value is characterized in that the dead time L is different depending on whether the calculation is made at the end Ⓐ or Ⓑ. Accordingly, the thickness gauge produces an arrival end identification signal for identifying whether the thickness gauge reaches the end Ⓐ or Ⓑ.

(e) Transfer Function Matrix

A basic control system is considered and this basic control system has five heaters h1 to h5 as operating terminal devices which are controlled by the basic control system, the five heaters being disposed in a longitudinal direction of a slot formed between the die lips. The basic control system 112-i can control thickness of a portion of film corresponding to a central heater h3 to a predetermined value even if external disturbance is added to the heaters h1 to h5. The reason that adjacent heaters h1, h2 and h4, h5 are taken into consideration in addition of the central heater h3 is because there is interference that heat generated by the heater h3 changes thicknesses t1, t2 and t4, t5 of film corresponding to the heaters h1, h2 and h4, h5 and influence to the heaters disposed outside of the heaters h1 and h5 by heat generated by the heater h3 is negligible. Accordingly, control object for designing the basic control system is expressed by the transfer function matrix G(s) of the following equation (1b):

$$\begin{bmatrix} Y_1(s) \\ Y_2(s) \\ Y_3(s) \\ Y_4(s) \\ Y_5(s) \end{bmatrix} = \underbrace{\begin{bmatrix} g_1(s) & g_2(s) & g_3(s) & 0 & 0 \\ g_2(s) & g_1(s) & g_2(s) & g_3(s) & 0 \\ g_3(s) & g_2(s) & g_1(s) & g_2(s) & g_3(s) \\ 0 & g_3(s) & g_2(s) & g_1(s) & g_2(s) \\ 0 & 0 & g_3(s) & g_2(s) & g_1(s) \end{bmatrix}}_{G(s)} \begin{bmatrix} U_1(s) \\ U_2(s) \\ U_3(s) \\ U_4(s) \\ U_5(s) \end{bmatrix} \quad (1b)$$

where $U_1(s)$ to $U_5(s)$ are Laplace transformed values of heat $U_1(t)$ to $U_5(t)$ generated by the heaters h1 to h5, $Y_1(s)$ to $Y_5(s)$ are Laplace transformed values of thicknesses $y_1(t)$ to $y_5(t)$ of portions corresponding to the heaters h1 to h5, and $g_1(s)$ to $g_3(s)$ are transfer functions corresponding to respective inputs and outputs. For example, $g_1'(s)$ is a transfer function which produces temporal variation of thickness t3 when only the heater t3 is changed. In the transfer function matrix G(s) of the equation (1b), non-diagonal terms express mutual interference to thickness between heaters.

(e) State Equation

In order to express the relation between the inputs $U_i(s)$ and the outputs $Y_i(s)$ (i=1-5) of the equation (1b), the following equation convenient for design of the control system is employed.

$$X(t) = Ax(t) + Bu(t) \quad (2b)$$

$$y(t) = Cx(t - L) \quad (3b)$$

where X is a state vector, u is an input vector in which $u(t) = [u_1(t), u_2(t), u_3(t), u_4(t), u_5(t)]^T$ (where T expresses transposition), y is an output vector in which $y(t) = [y_1(t), y_2(t), y_3(t), y_4(t), y_5(t)]^T$, L of the equation (3b) is the dead time.

The equations (2b) and (3b) are controllable and observable. The relation of the input u(t) and the output y(t) is expressed as in FIG. 23 from the equations (2b) and (3b). Double line of FIG. 23 indicates a vector value.

(f) Basic Control System as Solution of State Equation

In the first embodiment of the second invention, the basic control system as a solution of the state equation is the control system described in detail in the first embodiment of the first invention.

Description is made to the basic control system in which operation amounts of the five heaters h1 to h5 around the heater h3 influence the output y3 of the thickness gauge corresponding to the heater h3.

The basic control system satisfies the following conditions.

(1) Thickness y3 (hereinafter yi(t) is described as yi) is controlled to a predetermined value with good response even if external disturbance is added to the heaters h1 to h5.

(2) In order to control thickness y3, operation amounts are assigned to the heaters so that variation of operation amount in the heater h3 is largest, variation in the heaters h2 and h4 is largest next to the heater h3, and variation in the heaters h1 and h5 is smallest.

Figure 24:
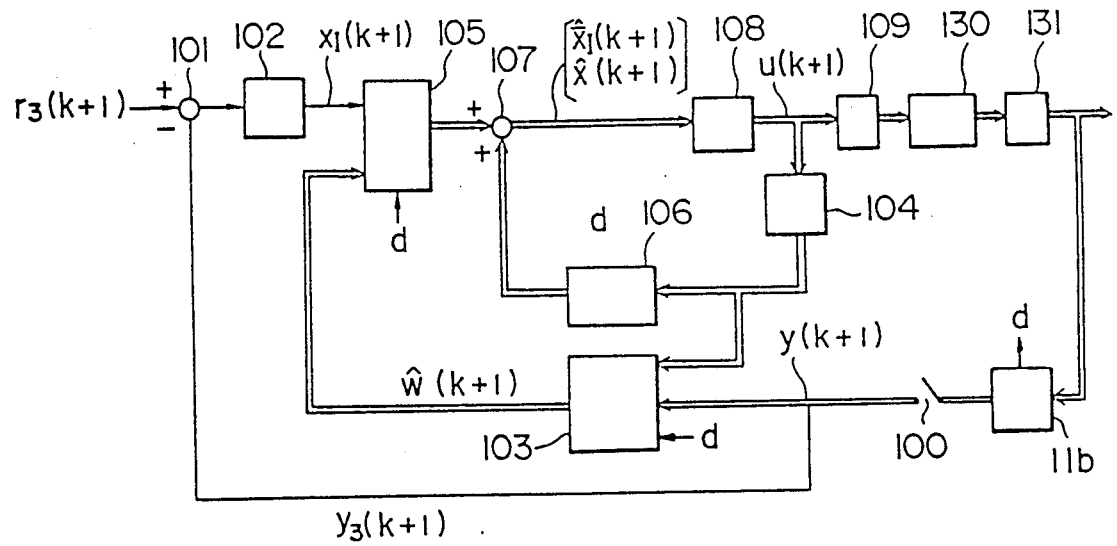
FIG. 24 is a block diagram showing a configuration of a basic control system of the embodiment.

The basic control system satisfying the above conditions can be realized by the control system having the configuration shown in FIG. 24.

Operation of the basic control system of FIG. 24 is described. The thickness gauge detects thickness while being moved in reciprocating manner along the width of film. When the gauge reaches the end Ⓐ or Ⓑ of film, measurement of thickness of film along the width thereof is completed. At this time the calculation is performed and accordingly the execution period T of the calculation is substantially equal to a time required for movement of the thickness gauge along the width and is considered to be constant. Accordingly, the basic control system is a discrete time control system.

(g) Operation of Basic Control System

Operational procedure of the basic control system of FIG. 27 is as follows:

(1) It is assumed that the thickness gauge 11b reaches the end Ⓐ or Ⓑ of film at the discrete time $t = t_{k+1}$. At this time, a vector consisting of detected values of thickness $y(t_{k+1}) = y(k+1)$ ($y_1(k+1) \sim y_5(k+1)$) is obtained through the thickness gauge 11b and sampler 100. At the same time, the thickness gauge produces the arrival end identification signal d indicative of the end which the gauge has reached.

(2) Only thickness $y_3(k+1)$ of a portion of film corresponding to the heater h3, of the film thickness detection vector y(k+1) is supplied to a subtracter 101 which produces thickness deviation $\epsilon(k+1) = r_3(k+1) - y_3(k+1)$ between the thickness $y_3(k+1)$ and a set value $r_3(k+1)$.

(3) An integrator 102 is supplied with the thickness deviation $\epsilon(k+1)$ from the subtracter 101 and produces a time-integrated value $X_I(k+1)$ of the thickness deviation. The integrator 102 serves as an external disturbance compensator to compensate the external disturbance varying thickness y3 by heat generated by the heater and to control thickness y3 to be identical with a set value.

(4) The operational calculator 103 is supplied with a past time sequence data (herein u(k)) of heat generated by the heater stored in a memory 104 and the film thickness detection value y(k+1) and produces an estimated value $X(t_{k+1} - L) = \omega(k+1)$ of state variable at time $(t_{k+1} - L)$ before time $t_{k+1}$ by the dead time L defined by the arrival end identification signal d produced from the thickness gauge.

(5) A state shifter 105 is supplied with the output $X_I(k+1)$ of the integrator 102 and the output $\omega(k+1)$ of the operational calculator 103 and multiplies them by a coefficient for shifting the state by the dead time L defined by the arrival end identification signal d produced by the thickness gauge to obtain a state estimated value at time $t_{k+1}$.

(6) A state prediction device 106 produces state variations for the inputs u(k) from time $(t_{k+1} - L)$ to time $t_{t+1}$ which are supplied from the memory 104 which stores the past time sequence data of heat generated by the heater by the dead time defined by the arrival end identification signal d produced by the thickness gauge.

(7) An adder 107 is supplied with an output of the state shifter 105 and an output of the stage prediction device 106 and produces as the addition result thereof a state estimated value at time $t_{k+1}$. Although the operational calculator 103 can not obtain only the state estimated value at time $(t_{k+1} - L)$ due to the dead time L, the state shifter 105 and the state prediction device 106 effect integration operation during the dead time L to obtain the state estimated value at time $t_{k+1}$. Since the above operation (5), (6) and (7) can remove influence of the phase delay due to the dead time L, thickness control with good response can be effected while maintaining the stability of the control system.

(8) A heat commander 108 multiplies the state estimated value from the adder 107 by the feedback gain to produce a heat command value to the operating terminal device 109. If the operation amount of the operating terminal device 109 is changed, thickness of the film is changed through thickness process 130

(9) The above calculation is made each time a new film thickness detection value y(k+2) is obtained by the sampler 100 when the thickness gauge 11b reaches the opposite end of film at time $t_{k+2}$ and thickness data along the whole width of the film is newly obtained through the dead time 131.

(h) Thickness Control by Combined Basic Control Systems

The application procedure obtained as described above is shown in FIG. 25.

FIG. 25(a) illustrates the application of the basic control system (1) in order to control thickness $y_3$ to a predetermined value. The basic control system (1) detects thicknesses $y_1$ to $y_5$ and defines command values $u_1^{(1)}$ to $u_5^{(1)}$ of heat generated by the heaters corresponding to the thicknesses $y_1$ to $y_5$.

FIG. 25(b) illustrates the application of the basic control system (2) in order to control thickness $y_4$ to a predetermined value. The basic control system (2) detects thicknesses $y_2$ to $y_6$ and defines command values $u_2^{(2)}$ to $u_6^{(2)}$ of heat generated by the heaters corresponding to the thicknesses $y_2$ to $y_6$.

FIG. 25(c) illustrates the application of the basic control system (3) in order to control thickness $y_5$ to a predetermined value. The basic control system (3) detects thicknesses $y_3$ to $y_7$ and defines command values $u_3^{(3)}$ to $u_7^{(3)}$ of heat generated by the heaters corresponding to the thicknesses $y_3$ to $y_7$.

FIG. 25(d) illustrates the application of the basic control system (4) in order to control thickness $y_6$ to a predetermined value. The basic control system (4) detects thicknesses $y_4$ to $y_8$ and defines command values $u_4^{(4)}$ to $u_8^{(4)}$ of heat generated by the heaters corresponding to the thicknesses $y_4$ to $y_8$.

FIG. 25(e) illustrates the application of the basic control system (5) in order to control thickness $y_7$ to a predetermined value. The basic control system (5) detects thicknesses $y_5$ to $y_9$ and defines command values $u_5^{(5)}$ to $u_9^{(5)}$ of heat generated by the heaters corresponding to the thicknesses $y_5$ to $y_9$.

The final command value $u_5$ for the heater h5, for example, is given by the following equation from the above basic control systems (1) to (5).

$$u_5 = (u_5^{(1)} + u_5^{(2)} + u_5^{(3)} + u_5^{(4)} + u_5^{(5)}) \times 1/5 \quad (4b)$$

As described above, the command value of heat generated by one heater h5 is defined by application of five basic control systems.

(i) Stability of Thickness Control by Combined Basic Control Systems

Figure 25:
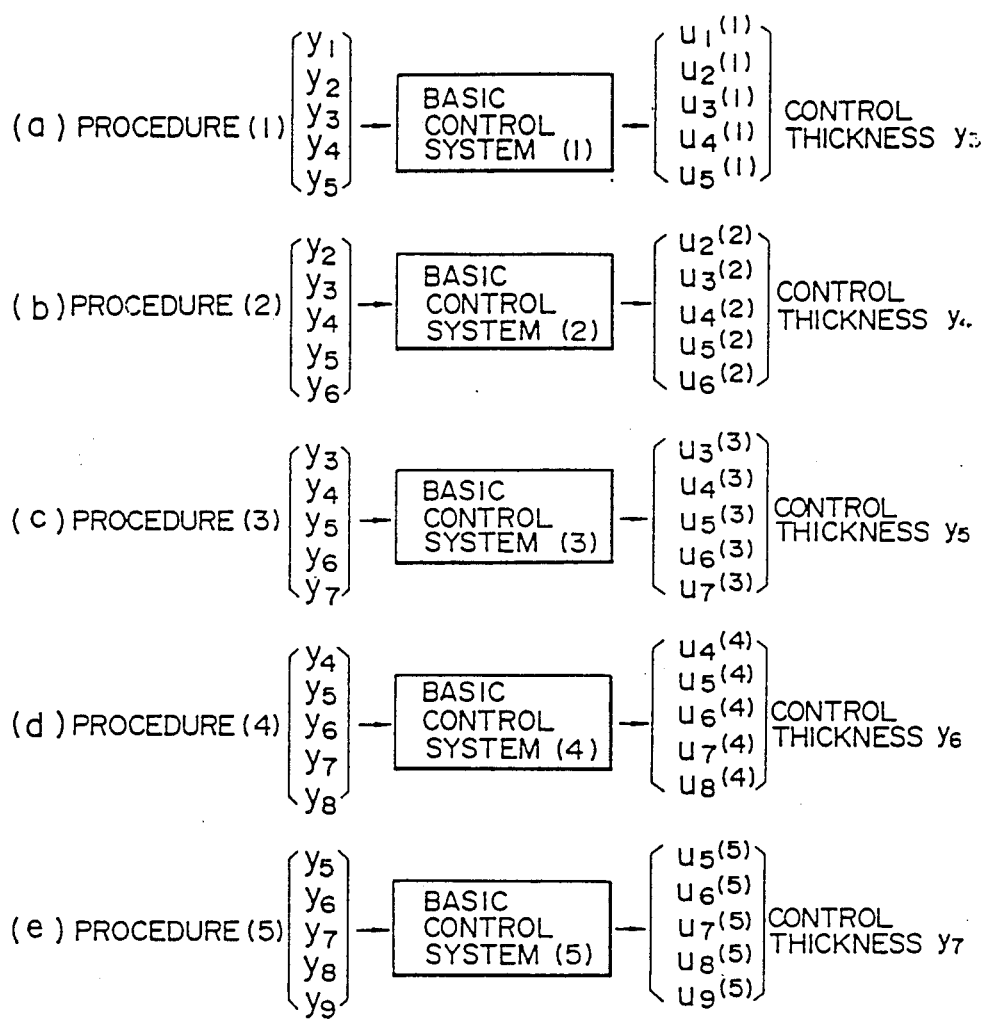
FIG. 25 illustrates an application procedure of the basic control system of FIG. 24 to thickness control points.
Figure 26:
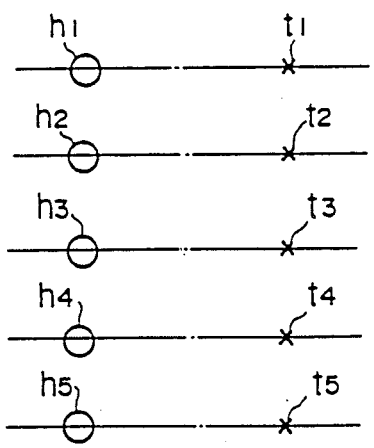
FIG. 26 illustrates a correspondence of positions of five arbitrary operating terminal devices and five thickness detection positions of the embodiment.

Referring to FIG. 25, description is now made to operation that the basic control systems are successively applied to control thickness of a portion of film corresponding to each of the operating terminal devices, that is, the heaters to the predetermined value so that thickness control of the whole film is made stably with good response.

The basic control system (3) which controls thickness $y_5$ of a portion of film corresponding to the heater $u_5$ to a predetermined value is taken as an example. Since the command value of heat generated by the heater h(3) is given by an averaged addition value $(u_3^{(3)} + u_3^{(1)} + u_3^{(2)}) \times \frac{1}{3}$ of the command values $u_3^{(3)}$, $u_3^{(1)}$ and $u_3^{(2)}$ of the basic control systems (3), (1) and (2), respectively, it is considered that the heater h3 is influenced by a kind of external heat of $(u_3^{(1)} + u_3^{(2)}) \times \frac{1}{3}$. Then, since the command value of heat generated by the heater h4 is given by an averaged addition value $(u_4^{(3)} + u_4^{(1)} + u_4^{(2)} + u_4^{(4)}) \times \frac{1}{4}$ of the command values $u_4^{(3)}$, $u_4^{(1)}$, $u_4^{(2)}$ and $u_4^{(4)}$ of the basic control systems (3), (1), (2) and (4), respectively, it is considered that the heater h4 is influenced by external heat of $(u_4^{(1)} + u_4^{(2)} + u_4^{(4)}) \times \frac{1}{4}$. Since the command value of heat generated by the heater h5 is given by an averaged addition value $(u_5^{(3)} + u_5^{(1)} + u_5^{(2)} + u_5^{(4)} + u_5^{(5)}) \times 1/5$ of the command values $u_5^{(3)}$, $u_5^{(1)}$, $u_5^{(2)}$, $u_5^{(4)}$, $u_5^{(5)}$ of the basic control systems (3), (1), (2), (4) and (5), respectively, it is considered that the heater h5 is influenced by external heat of $(u_5^{(1)} + u_5^{(2)} + u_5^{(4)} + u_5^{(5)}) \times 1/5$. The command value of heat generated by the heater h6 is considered to be influenced by external heat having an averaged addition value $(u_6^{(3)} + u_6^{(2)} + u_6^{(4)} + u_6^{(5)}) \times \frac{1}{4}$ of the command values $u_6^{(3)}$, $u_6^{(2)}$, $u_6^{(4)}$ and $u_6^{(5)}$ of the basic control systems (3), (2), (4) and (5), respectively. Finally, since the command value of heat generated by the heater h7 is given by an averaged addition value $(u_7^{(3)} + u_7^{(4)} + u_7^{(5)}) \times \frac{1}{3}$ of the command values $u_7^{(3)}$, $u_7^{(4)}$ and $u_7^{(5)}$ of the basic control systems (3), (4) and (5), respectively, it is considered that the heater h7 is influenced by external heat of $(u_7^{(4)} + u_7^{(5)}) \times \frac{1}{3}$.

As described above, it is considered that all of the heaters of the basic control system (3) are influenced by external heat from the adjacent control systems. However, since the basic control systems (3) can control thickness $y_5$ to the predetermined value as described above even if external heat is added to the heaters 3 to 7, it is understood that control by the control basic device (3) to thickness $y_5$ is made stably. This can be applied to the other basic control systems which control thickness of other portions and accordingly it is understood that thickness control is stably made over the whole film.

(j) Configuration and Operation of Second Invention

Configuration of the second invention is described with reference to FIG. 22.

Since the thickness gauge 11b is moved in reciprocating manner along the width of film to detect thickness of film, thickness data over the width of film is obtained each time the thickness gauge reaches the end of film. The thickness data over the width of film is supplied to the thickness data memory 110.

On the other hand, the thickness gauge 11b supplies the arrival end identification signal indicative of the end which the thickness gauge has reaches to the distributor 111 and the basic control systems 112-i (i=1-N) each time the thickness gauge has reached the end of film. When the distributor 111 is supplied with the arrival end identification signal from the thickness gauge 11b, the distributor 111 reads out a set of thickness data necessary for the basic control systems 112-i from the thickness data memory 110 and supplies the set of thickness data to the predetermined basic control systems 112-*i*. Accordingly, the set of thickness data is simultaneously distributed to the basic control systems which control thickness of portions of film corresponding to the heaters in synchronism with the arrival end identification signal. The basic control systems 112-*i* is supplied with the set of thickness data from the distributor 111 and data of the operation value memory and identifies the end of film which the thickness gauge has reached on the basis of the arrival end identification signal to select the correct dead time L and execute calculation so that a predetermined number of command values of heat are stored in the command value memories 113-2 to 113-N. When the command value memories 113-1 to 113-N are supplied with the command values of heat from all of the basic control systems 112-1 to 112-N, the superposition adder 114 adds outputs of the command value memories 113-1 to 113-N for each heater and calculates an average value thereof to define a final command value S of heat for each heater.

The command value S of the superposition adder 114 is stored in the operation value memory 115. Then, when the thickness gauge 11*b* has been moved and reached the opposite end of film so that a new arrival end identification signal has been produced, the distributor 111, the basic control systems 112-*i* (i=1−N) and the superpositon adder 114 are all operated as described above so that all command values of heat are updated.

As described above, the basic control systems can control thickness of portions of film corresponding to the heaters to a predetermined value over the width of film stably.

(k) Example of Design

An example of design is described in the case where transfer functions $g_1(s)$, $g_2(s)$ and $g_3(s)$ are given by the following equations:

$$g_1(s) = \frac{0.044}{S^3 + 2.1S^2 + 2.6S + 0.05} \quad (5b)$$

$$g_2(s) = \frac{0.0009}{S^4 + 2.4S^3 + 2.7S^2 + 0.25S + 0.0015} \quad (6b)$$

$$g_3(s) = \frac{0.00002}{S^5 + 2.4S^4 + 2.8S^3 + 0.31S^2 + 0.0084S + 0.0004} \quad (7b)$$

The basic control systems (1) to (6) as shown in FIG. 25, ten heaters h1 to h10, and ten points t1 to t10 of thickness corresponding to positions of the heaters are assumed and it is considered that thicknesses $y_3$ to $y_8$ are controlled to a predetermined value. $u_i(t)(i=1-10)$ is variation (Kcal/s) of heat generated by the heater, and $y_i(t)(i=1-10)$ is variation (cm) of thickness of film at the position of the thickness gauge corresponding to the position of the heater. The dead time $L_1$ due to movement of the film and times $L_2'$ and $L_2''$ (referred to FIG. 27) required for movement of the thickness gauge from the thickness control point 3 to 8 to the film end assume a value of the following equation and values shown in Table 1.

$L_1 = 30$ seconds

TABLE 1

| Dead Time L at Thickness Control Points | | | | | | |
|---|---|---|---|---|---|---|
| | Thickness Control Point | | | | | |
| | 3 | 4 | 5 | 6 | 7 | 8 |
| Dead Time $L_2''$ (sec) | 1.5 | 2.25 | 3.0 | 3.75 | 4.5 | 5.25 |
| Dead Time $L_2''$ (sec) | 15 | 14.25 | 13.5 | 12.75 | 12 | 11.25 |
| Whole Dead Time L of End (A) (sec) ($L_1 + L_2$) | 31.5 | 32.5 | 33.0 | 33.7 | 34.5 | 35.25 |
| The same of End (B) | 45.0 | 44.25 | 43.5 | 42.75 | 42.0 | 41.25 |

It is assumed that the thickness control point 3 exists at the end Ⓐ of the film as shown in FIG. 27. The control calculation execution period T assumes the following value.

$T = 16.5$ seconds

In order to design the control system, it is necessary to express the relation between the input u(t) and the output y(t) of the equation (1b) and obtain the controllable and observable state equations (2b) and (3b). G(s) constituted of $g_1(s)$, $g_2(s)$ and $g_3(s)$ of the equations (5b) to (7b) can be expressed by an equation of the 77th degree, while the controllable and observable equation has been found to be an equation of the 39th degree. Accordingly, the equations (2b) and (3b) of the 39th degree are obtained from G(s).

(1) Decision of State Feedback Gain Matrix

The state feedback gain matrix of the basic control system is obtained as a solution of an optimum regulator problem for the state equation extended to the equation of the 40th degree by introducing the integrator for compensation of external disturbance on the basis of the equation (2b). Since the calculation is made every $T = 16.5$ seconds, the state equation of the continuous time system is changed to a discrete state function with the sampling period $T = 16.5$ seconds and a regulator solution is applied. A proper estimation function is employed to obtain the state feedback gain matrix and as a result the following values are obtained as the eigen values of the control system.

$0.876 \pm 0.02i$, $0.79$, $0.50 \pm 0.07i$, $0.60 \pm 0.09i$, $0.60 \pm 0.06i$, $0.51$

Further, 30 eigen values other than above are not described since the absolute value thereof is less than 0.1 and attenuation is fast. Since all eigen values are within a circle having a radius of 1, stable control can be attained. Since the eigen value having the slowest attenuation is $0.88 \pm 0.02i$, the stabilization time Ts can be predicted as about 10 minutes from $(0876)^{35} \approx 0.01$ with definition of control error 1% as follows.

$Ts = T \times 35 = 16.5 \times 35$ sec. $= 577.5$ sec. $= 9.6$ min.

(2) Decision of Feedback Gain of Operational Calculator

The feedback gain matrix of the operational calculator which estimates the state before time $t_{k+1}$ for calculation execution by the dead time L is obtained for the state equation of the 39th degree and the output equation of the fifth degree. The gain matrix K is obtained as a solution of the optimum regulator problem using a proper estimation function. The following values are obtained as eigen values of the operational calculator for the obtained gain matrix.

0.9077±0.0002i, 0.9076, 0.9075, 0.9075, 0.772±0.0001i, 0.722, 0.722, 0.722, 0.576±1×10⁻⁵i, 0.576±1×10⁻⁵i, 0.232, 0.232, 0.232, 0.232, 0.232

20 eigen values other than above concentrate to the origin. Since all the values are within a circle having a radius of 1, the estimated error can be reduced with the lapse of time. Since the eigen value having the slowest attenuation is 0.9077, the time To required for attenuation of the estimated error to an initial 1% can be predicted from $(0.9077)^{45} \approx 0.01$ as follows.

$$T_o = T \times 45 = 16.5 \times 45 \text{ sec.} = 742.5 \text{ sec.} = 12.4 \text{ min.}$$

(1) Simulation Example 1

FIGS. 31 and 32 show an example of simulation result obtained by calculation using the state feedback and the gain of the operational calculation obtained above.

Figure 31A:
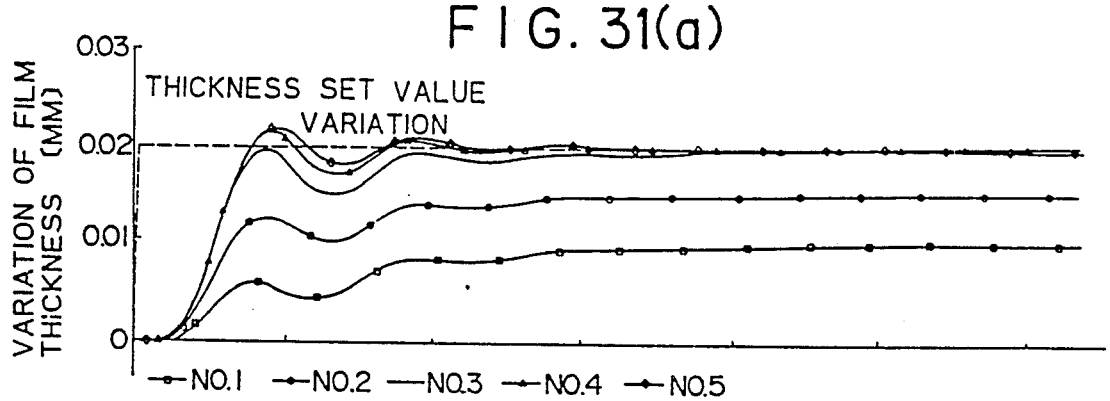
Figure 31B:
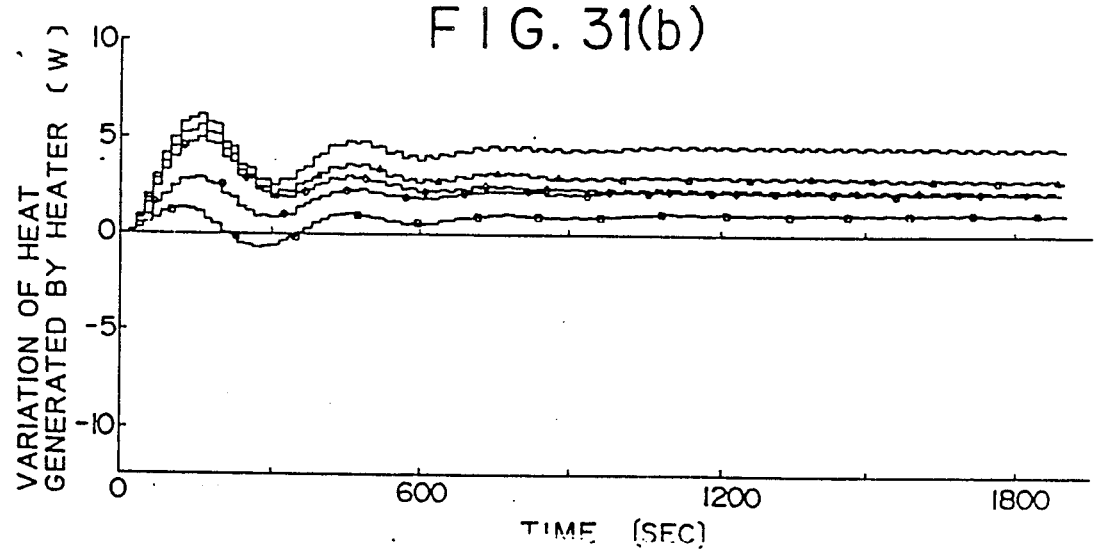
Figure 32A:
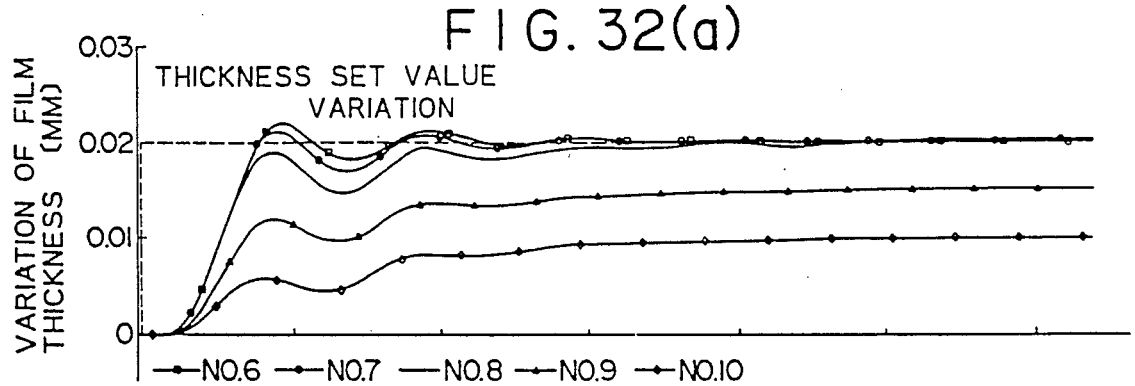
Figure 32B:
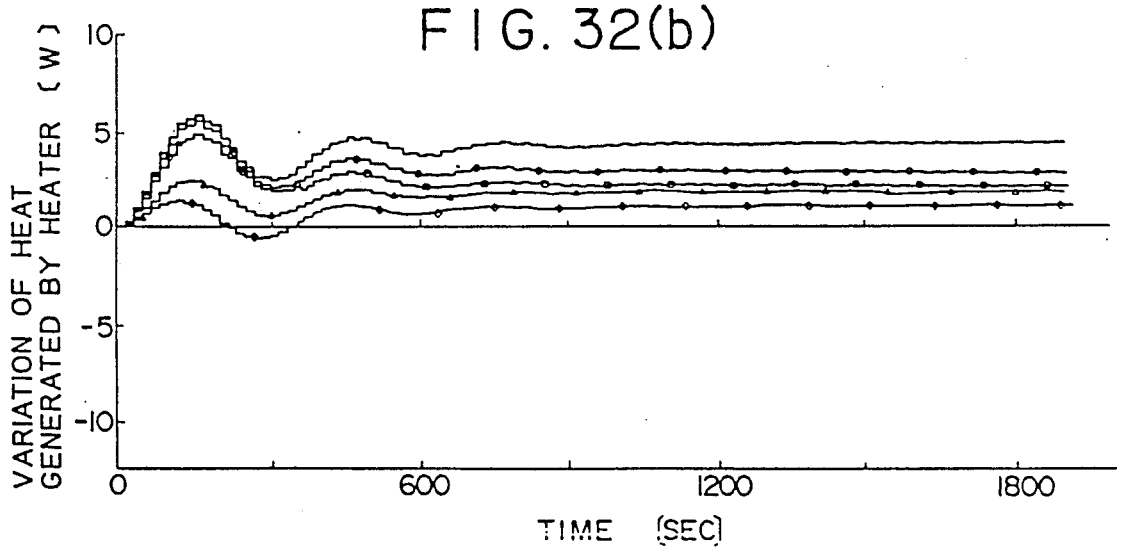

FIGS. 31 and 32 show variations of thickness and variation of heat generated by the heaters when the set values of thickness $y_3$ to $y_8$ are changed stepwise by 0.02 mm. FIG. 31(a) shows variations of five amounts $y_1$ to $y_5$ of thickness (variation of the detected value of the thickness gauge) versus time. FIG. 31(b) shows variations of heat $u_1$ to $u_5$ generated by the heaters at this time in the same manner as FIG. 31(a). FIG. 32(a) shows variations of thickness $y_6$ to $y_{10}$ and FIG. 32(b) shows variations of heat $u_6$ to $u_{10}$ generated by the heater.

Since calculation is made after the execution period of 16.5 seconds of calculation after the set value of thickness has been changed, variation of heat generated by the heater occurs after 16.5 seconds from change of the set value of thickness. An amount of heat generated by the heater is maintained to the same value until 16.5 seconds elapse and the next calculation is made. The calculation is made on the basis of a newly detected value of thickness after 16.5 seconds to change an amount of heat generated by the heater. Accordingly, an amount of heat generated by the heater changes stepwise as shown in FIG. 31 and 32(b).

On the other hand, variation of the detected thickness value is detected after the lapse of the dead time L after the amount of heat generated by the heater has been changed after the lapse of 16.5 seconds from the change of the set value. For example, when calculation is made with thickness $y_3$ for the end Ⓐ shown in FIG. 27, the dead time L is 31.5 seconds from Table 1. That is, variation of thickness is detected after the lapse of 16.5+31.5=48 seconds after the set value of thickness has been changed. Thickness $y_3$ is exactly changed to a set value as can be seen from FIGS. 31 and 32. The heaters h1, h2, h9 and h10 are introduced in consideration of mutual interference to thicknesses $y_3$ and $y_8$ and the thicknesses $y_1$, $y_2$, $y_9$ and $y_{10}$ corresponding to the heaters h1, h2, h9 and h10 are not controlled to the set value. On the other hand, variations of heat generated by the heaters $u_3$ and $u_8$ at the end in the thickness control region are largest, variations by the heaters $u_4$ to $u_7$ located in the center are largest next to the heaters $u_3$ to $u_8$, and variations of the heaters $u_1$, $u_2$, $u_9$ and $u_{10}$ located outside of the control region are smallest.

The stabilization time is about 18.5 minutes which is considerably large as compared with the stabilization time of 12.4 minutes calculated by the eigen value of the operational calculator (the stabilization time by the eigen value of the regulator is still shorter). This is based on the following reason.

In order to prevent the command value of heat generated by the heater from being changed largely for each calculation, the command value is defined with weight added as follows.

$$u_{d.k} = W u_{d.k-1} + (1-W) u_k \tag{8b}$$

where $u_{d.k}$: command value of heat defined by the calculation time $t = t_k$, $u_{d.k-1}$: command value of heat defined by the last calculation time $t = t_{k-1}$, $u_k$: command value of heat calculated at the calculation time $t = t_k$, and W: weight coefficient.

In this simulation, W=0.8. This means that when the calculation period T=16.5 seconds is considered, a time delay corresponding to a delay of first order having a time constant of 74.65 seconds is added to the heat commander. Accordingly, it is considered that the stabilization time of thickness control of FIGS. 31, 32 is larger than the stabilization time estimated by the eigen value of the operational calculator. Then, even if the thickness control is in the stabilization state, the command value of heat changes for each calculation. The reason is because the magnitude of the dead time L in the calculation in the state shifter of the basic control system is different in one end Ⓐ and the other end Ⓑ of the film for calculation.

(m) Simulation 2

Figure 33A:
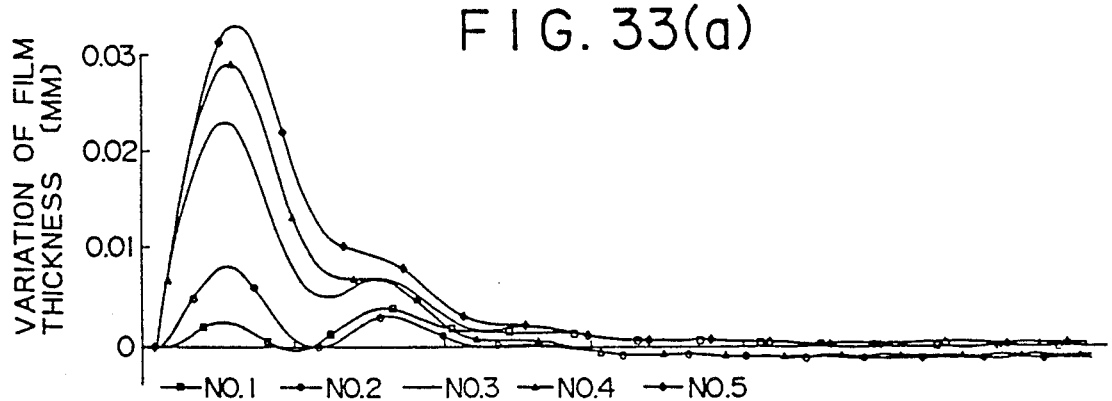
Figure 33B:
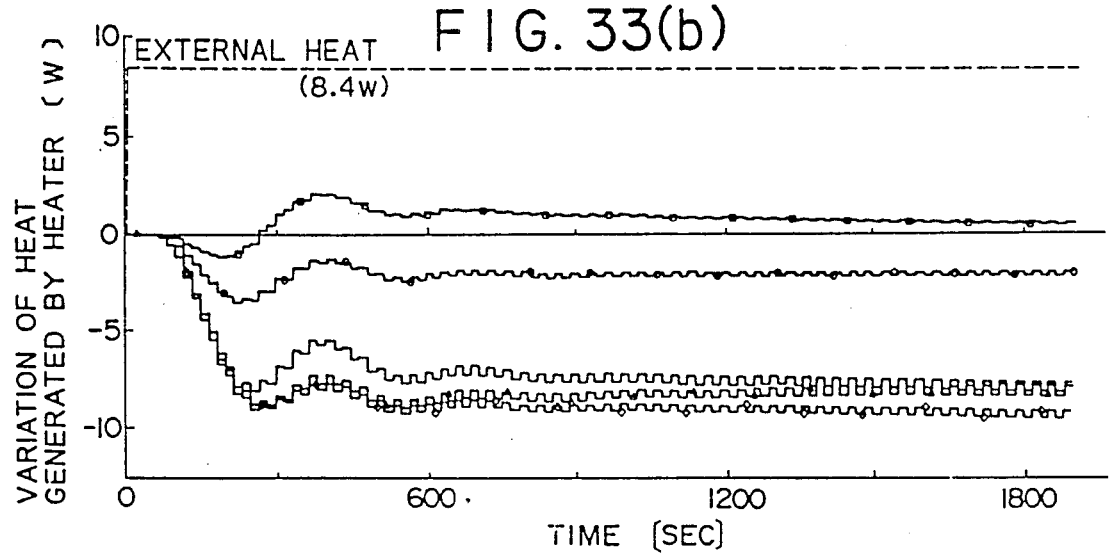
Figure 34A:
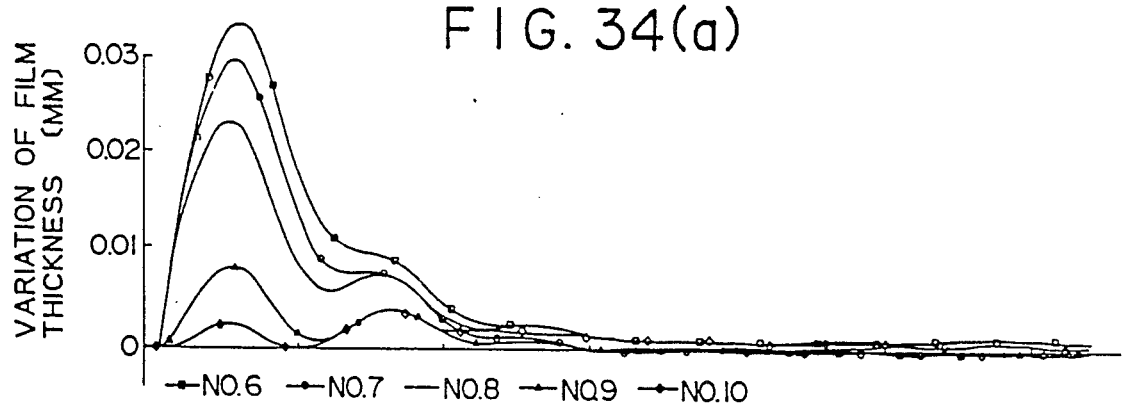
Figure 34B:
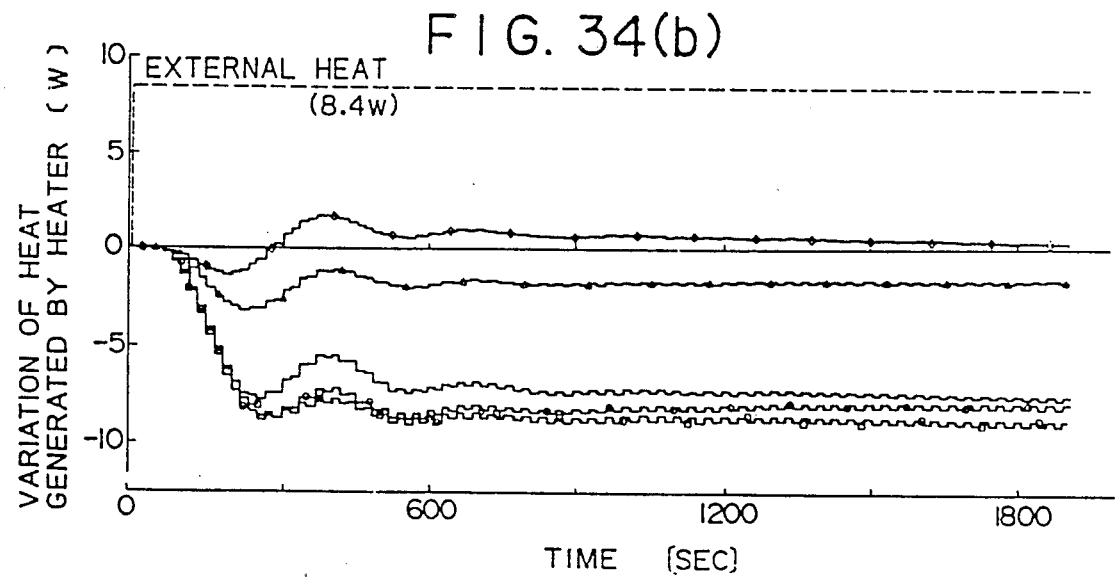

FIGS. 33 and 34 shows a control result when external heat of 8.4 wattage is applied to the heater $u_3$ to $u_8$. FIG. 33(a) shows variations of thickness values $y_1$ to $y_5$ versus time, and FIG. 33(b) shows variations of heat $u_1$ to $u_5$ generated by the heaters versus time. FIG. 34(a) shows variations of thickness values $y_6$ to $y_{10}$ versus time and FIG. 34(b) shows variations of heat $u_6$ to $u_{10}$ generated by the heaters versus time.

As seen in FIGS. 33 and 34(a), although the thickness values $y_3$ to $y_8$ are once increased by the external heat of the heater $u_3$ to $u_8$, the thickness values $y_3$ to $y_8$ are returned to the original set value by changing the amounts of heat generated by the heaters $u_1$ to $u_{10}$ and the stabilization time is about 18.5 minutes in the same manner as FIGS. 31 and 33. It is understood that variation due to the external disturbance is exactly compensated by introducing the integrator in the present control system. The thickness values $y_1$, $y_2$, $y_9$ and $y_{10}$ are once increased by influence of external heat through thermal conduction along the width of the die. In order to cancel the influence of such external heat, reductions of amounts $u_3$ to $u_8$ of heat generated by the heater located outside of the control region are largest, and reductions of amounts $u_1$, $u_2$, $u_9$ and $u_{10}$ generated by the heaters located outside of the control region is smallest.

B2. Second Embodiment of Second Invention (a) Relation to First Embodiment of Second Invention The first embodiment of the second invention employs the control systems of the first embodiment of the first invention as the basic control systems, while the second embodiment of the second invention employs the control systems of the second embodiment of the first invention as basic control systems.

(b) Dead Time

The thickness gauge measures thickness of film along a locus as shown in FIG. 27. If a position of thickness $t_3$ is indicated by the point $\text{C}$ in FIG. 27, the dead time $L_2$ due to movement of the thickness gauge in the case where calculation is made at the end $\text{A}$ of film is expressed by a time $L_2'$ corresponding to movement between the points $\text{C}$ and $\text{A}$ of FIG. 27.

On the other hand, when calculation is made at the end $\text{B}$ of film, the dead time $L_2$ due to movement of the thickness gauge is expressed by a time $L_2''$ corresponding to movement between the points $\text{C}'$ and $\text{B}$ in FIG. 27. As can be seen from FIG. 27, since the dead time $L_2'$ is generally different from the dead time $L_2''$, the control system which controls thickness $t_3$ to a predetermined value is characterized in that the dead time 1 of the equation (3b) is different depending on whether calculation is made at the end $\text{A}$ or $\text{B}$ of film. That is: the dead time $L_A$ for the end $\text{A}$ is given by $$L_A = L_1 + L_2' \tag{9b}$$

the dead time $L_B$ for the end $\text{B}$ is given by $$L_B = L_1 + L_2'' \tag{10b}$$

Accordingly, the thickness gauge produces an arrival end identification signal for identifying the end $\text{A}$ or $\text{B}$ which the thickness gauge has reached.

The thickness gauge is moved in reciprocating manner along the width of film as shown in FIG. 27 to detect thickness of film and finishes measurement of thickness over the width of film when the thickness gauge has reached the end $\text{A}$ or $\text{B}$ of film. At this time, the calculation is executed and accordingly the execution period of calculation is substantially equal to a time required for movement of the thickness gauge over the width of film and the period is considered to be constant. Thus, the basic control system is a discrete time control system.

(c) Basic Control System

Figure 23:
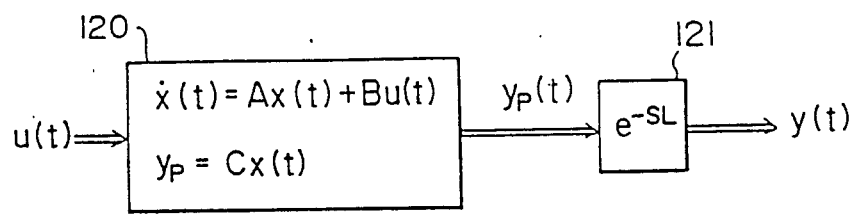
FIG. 23 is a block diagram expressing a dynamic mathematical model of a film thickness manufacturing process of the first embodiment of the second invention.

The state equations (2b) and (3b) are controllable and observable. The relation of the input u(t) and the output y(t) is shown in FIG. 23 from the equations (2b) and (3b). Double line in FIG. 23 indicates vector value. A configuration of the basic control system of the second embodiment is also the same as that of FIG. 24. Double line of FIG. 24 indicates vector value. The configuration of the basic control system shown in FIG. 24 is as follows:

(1) It is assumed that the thickness gauge 11b reaches the end $\text{A}$ or $\text{B}$ of film at the discrete time $t = t_{k+1}$. At this time, a vector consisting of detected values of thickness $y(t_{k+1}) = y(k+1)(y_1(k+1) \sim y_5(k+1))$ is obtained through the thickness gauge 11b and sampler 100. At the same time, the thickness gauge produces the arrival end identification signal d indicative of the end which the gauge has reached.

(2) Only thickness $y_3(k+1)$ of a portion of film corresponding to the heater h3, of the film thickness detection vector $y(k+1)$ is supplied to a subtracter 101 which produces thickness deviation $\epsilon$ $(k+1) = r_3(k+1) - y_3(k+1)$ between the thickness $y_3(k+1)$ and a set value $r_3(k+1)$.

(3) An integrator 102 is supplied with the thickness deviation $\epsilon$ (k+1) from the subtractor 101 and produces a time-integrated value $X_I(k+1)$ of the thickness deviation. The integrator 102 serves as an external disturbance compensator to compensate the external disturbance varying thickness $y_3$ by heat generated by the heater and to control thickness $y_3$ to be identical with a set value.

(4) The operational calculator 103 is supplied with a past time sequence data (herein u(k)) of heat generated by the heater stored in a memory 104 and the film thickness detection value $y(k+1)$ and produces an estimated value $\hat{X}(t_{k+1} - L) = \hat{\omega}$ $(k+1)$ of state variable at time $(t_{k+1} - L)$ before time $t_{k+1}$ by the dead time L defined by the arrival end identification signal d produced from the thickness gauge.

(5) A state shifter 105 is supplied with the output $X_I(k+1)$ of the integrator 102 and the output $\omega$ (k+1) of the operational calculator 103 and multiplies them by a coefficient for shifting the state by the average dead time $\overline{L}$ which is an average value of the dead time $L_A$ (refer to the equation (9b)) in the case where the thickness gauge has reached the end $\text{A}$ and the dead time $L_B$ (refer to the equation (19b)) in the case where the thickness gauge has reached the end $\text{B}$ to obtain a state estimated value at time $t_{k+1}$.

$$\overline{L} = (L_A + L_B)/2 \tag{11b}$$

From the equations (9b), (10b) and (11b), the dead time $\overline{L}$ is given by $$\overline{L} = L_1 + (L_2' + L_2'')/2 \tag{12b}$$

$(L_2' + L_2'')$ is substantially equal to a time required for movement of the thickness gauge over the width of film and accordingly is equal to the execution period t of calculation. Thus, from the equation (12b), the average dead time $\overline{L}$ is given by $$\overline{L} = L_1 + T/2 \tag{13b}$$

As seen from the equation (13b), the average dead time L is constant irrespective of the end of film which the thickness gauge reaches.

(6) A state prediction device 106 produces state variations for the inputs u(k) from time $(t_{k+1} - \overline{L})$ to time $t_{t+1}$ which are supplied from the memory 104 which stores the past time sequence data of heat generated by the heater by the average dead time in the same manner as the state shifter 105.

(7) An adder 107 is supplied with an output of the state shifter 105 and an output of the stage prediction device 106 and produces as the addition result thereof a state estimated value at time $t_{k+1}$. Although the operational calculator 103 can not obtain only the state estimated value at time $(t_{k+1} - L)$ due to the dead time L, the state shifter 105 and the state prediction device 106 effect integration operation during the average dead time $\overline{L}$ to obtain the state estimated value at time $t_{k+1}$. Since the above operation (5), (6) and (7) can remove influence the phase delay due to the average dead time L, thickness control with good response can be effected while maintaining the stability of the control system.

(8) A heat commander 108 multiplies the state estimated value from the adder 107 by the feedback gain to produce a heat command value to the operating terminal device 109. If the operation amount of the operating terminal device 109 is changed, thickness of the film is changed through thickness process 130.

(9) The above calculation is made each time a new film thickness detection value y(k+2) is obtained by the sampler 100 when the thickness gauge 11b reaches the opposite end of film at time $t_{k+2}$ and thickness data along the whole width of the film is newly obtained through the dead time 131.

(d) Average Dead Time

The reason that the average dead time L is used as the integration time in the state shifter 105 and the state prediction device 106 instead of the dead times $L_A$ and $L_B$ is now described.

If the integration section corresponding to the dead time $L_A$ or $L_B$ different from each other by the calculation for the end (A) or (B) is assumed, the state estimated value at time $t_{k+1}$ is not continuous for each calculation and changes stepwise. When the dead time $L_A$ is larger than the dead time $L_B$, the state estimated value at the end (A) is larger than the state estimated value at the end (B) and the operation value of the heater defined by multiplying the state estimated value by the feedback gain is also repeatedly varied unevenly. There is a drawback that variation of the operation value is maintained even in the steady state. On the other hand, if the average dead time L is used for the calculation at the ends (A) and (B) in common, there is no state in which the state estimated value is incontinuous at the ends (A) and (B) because of the identical integration section and uneven variation of the operation value in the steady state is removed.

(e) Thickness Control by Combined Basic Control Systems

The first embodiment of the second invention is identical with the second embodiment thereof with the exception that only the basic control systems are different. Combination of the basic control systems is the same. Accordingly, description for thickness control by the combined basic control systems in the first embodiment of the second invention can be all applied to the second embodiment. That is, description in B1(h) to (j) is all applied to B2.

(f) Design Example

An actual example is now described. As a first actual example, an example of design is described in the case where transfer functions $g_1(s)$, $g_2(s)$ and $g_3(s)$ are given by the following equations:

$$g_1(s) = \frac{0.14}{S^3 + 5.5S^2 + 12.5S + 0.25} \quad (14b)$$

$$g_2(s) = \frac{0.003}{S^4 + 6.4S^3 + 13.2S^2 + 1.3S + 0.009} \quad (15b)$$

$$g_3(s) = \frac{0.00005}{S^5 + 6.3S^4 + 13.8S^3 + 1.6S^2 + 0.04S + 0.002} \quad (16b)$$

The basic control systems (1) to (6) as shown in FIG. 25, ten heaters h1 to h10, and ten points t1 to t10 of thickness corresponding to positions of the heaters are assumed and it is considered that thicknesses $y_3$ to $y_8$ are controlled to a predetermined value. $u_i(t)(i=1-10)$ is variation (watt) of heat generated by the heater, and $y_i(t)(i=1-10)$ is variation (micron) of thickness of film at the position of the thickness gauge corresponding to the position of the heater. The dead time $L_1$ due to movement of the film and times $L_2'$ and $L_2''$ (referred to FIG. 27) required for movement of the thickness gauge from the thickness control point 3 to 8 to the film end assume a value of the following equation and values shown in Table 2.

$L_1 = 26$ seconds

TABLE 2

| | Dead Time L at Thickness Control Points | | | | | |
|---|---|---|---|---|---|---|
| | Thickness Control Point | | | | | |
| | 3 | 4 | 5 | 6 | 7 | 8 |
| Dead Time $L_2'$ (sec) | 2.8 | 3.75 | 4.7 | 5.6 | 6.6 | 7.5 |
| Dead Time $L_2''$ (sec) | 19.7 | 18.75 | 17.8 | 16.9 | 15.9 | 15.0 |
| Whole Dead Time L of End (A) (sec) ($L_1 + L_2$) | 28.8 | 29.75 | 30.7 | 31.6 | 32.6 | 33.5 |
| The same of End (B) | 45.7 | 44.75 | 43.8 | 42.9 | 41.9 | 41.0 |

It is assumed that the thickness control point 3 exists at the end (A) of the film as shown in FIG. 27. The control calculation execution period T assumes the following value.

$T = 22.5$ seconds

In order to design the control system, it is necessary to express the relation between the input u(t) and the output y(t) of the equation (1b) and obtain the controllable and observable state equations (2b) and (3b). G(s) constituted of $g_1(s)$, $g_2(s)$ and $g_3(s)$ of the equations (14b) to (16b) can be expressed by an equation of the 77th degree, while the controllable and observable equation has been found to be an equation of the 29th degree. Accordingly, the equations (2b) and (3b) of the 29th degree are obtained from G(s).

(1) Decision of State Feedback Gain Matrix

The state feedback gain matrix of the basic control system is obtained as a solution of an optimum regulator problem for the state equation extended to the equation of the 30th degree by introducing the integrator for compensation of external distrurbance on the basis of the equation (2b). Since the calculation is made every $T = 22.5$ seconds, the state equation of the continuous time system is changed to a discrete state function with the sampling period $T = 22.5$ seconds and a regulator solution is applied. A proper estimation function is employed to obtain the state feedback gain matrix and as a result the following values are obtained as main values for determining the response of the control system as the eigen values of the control system.

0.856, 0.8119, 0.7755, 0.7618

Further, eigen values other than above are not described since the absolute value thereof is small and attenuation is fast. Since all eigen values are within a circle having a radius of 1, stable control can be attained. Since the eigen value having the slowest attenuation is 0.856, the stabilization time Ts can be predicted as about 12 minutes from $(0.856)^{30} \approx 0.01$ with definition of control error 1% as follows.

$Ts = T \times 30 = 22.5 \times 30 \text{ sec.} = 675 \text{ sec.} = 11.3 \text{ min.}$

(2) Decision of Feedback Gain of Operational Calculator

Figure 35:
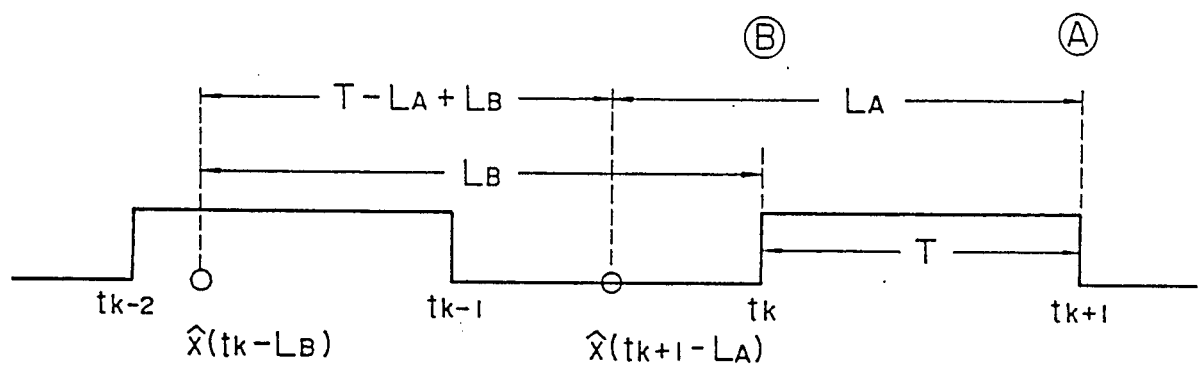
FIG. 35 illustrates a discrete time for determining a gain matrix of an operational calculator of the second embodiment.

The feedback gain matrix of the operational calculator which estimates the state before time $t_{k+1}$ for calculation execution by the dead time L is obtained for the state equation of the 29th degree and the output equation of the fifth degree. FIG. 35 is a diagram illustrating the discrete time used to transforms the state equation (2b) to the discrete equation in order to obtain the gain matrix of the operational calculation. In FIG. 35, it is assumed that the estimated value $\hat{X}(t_k - L_B)$ of the state variable at the past time by the dead time $L_B$ has been already obtained in the calculation at the end (B) performed at time $t_k$. In order to obtain the estimated value $X(t_{k+1} - L_A)$ of the state variable at the past time by the dead time $L_A$ in the calculation at the end (A) performed at time $t_{k+1}$, the state equation (2b) must be transformed to a discrete form with a time difference $(t_{k+1} - L_A) - (t_k - L_B) = t_{k+1} - t_k - L_A + L_B$. The discrete time is $(T - L_A + L_B)$ because of $t_{k+1} - t_k = T$. The discrete time $(T - L_A + L_B)$ for the thickness control point 3 is calculated from $L_A = 28.8$ seconds and $L_B = 45.7$ seconds in Table 2 as follows:

$T - L_A + L_B = 39.4$ seconds

For the state equation transformed to the discrete form with 39.4 seconds, a proper evaluation function is employed to obtain the gain matrix of the operational calculation as a solution of an optimum regulator problem. The following values are obtained as main values for determining convergence of the operational calculation as eigen values of the operational calculator for the obtained gain matrix.

0.7743, 0.7743, 0.7743, 0.7743, 0.7743, 0.4484, 0.4484, 0.4484, 0.4484, 0.4484

Since eigen values other than above are small and convergence is fast, they are not described. Since all the values are within a circle having a radius of 1, the estimated error can be reduced with lapse of time. Since the eigen value having the slowest attenuation is 0.7743, the time To required for attenuation of the estimated error to an initial 1% can be predicted from $(0.7743)^{18} \approx 0.01$ as follows.

$$To = (T - L_A + L_B) \times 18 = 39.4 \times 18 \text{ sec.} = 709 \text{ sec.}$$
$$= 11.8 \text{ min.}$$

For other thickness control points, the gain matrix of the operational calculation having the stabilization time To of 12 minutes was obtained in the same manner.

(g) Simulation 1

FIGS. 36 and 37 show an example of simulation result obtained by calculation using the state feedback and the gain of the operational calculation obtained above.

Figure 36A:
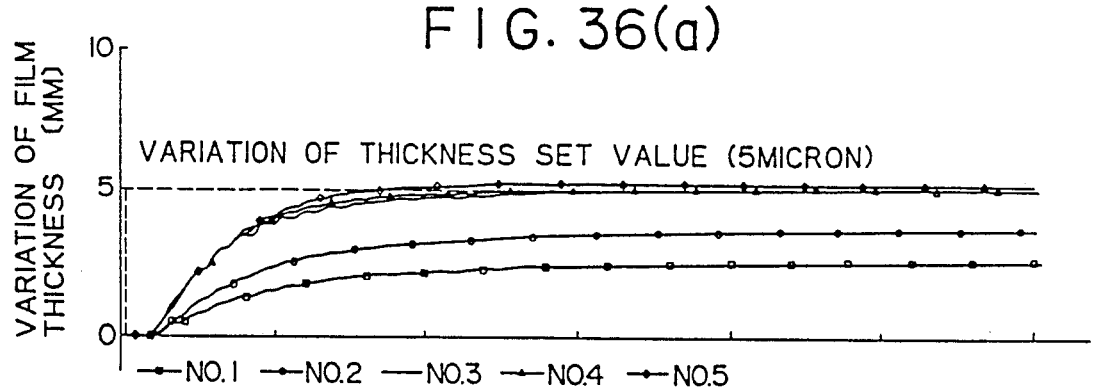
Figure 36B:
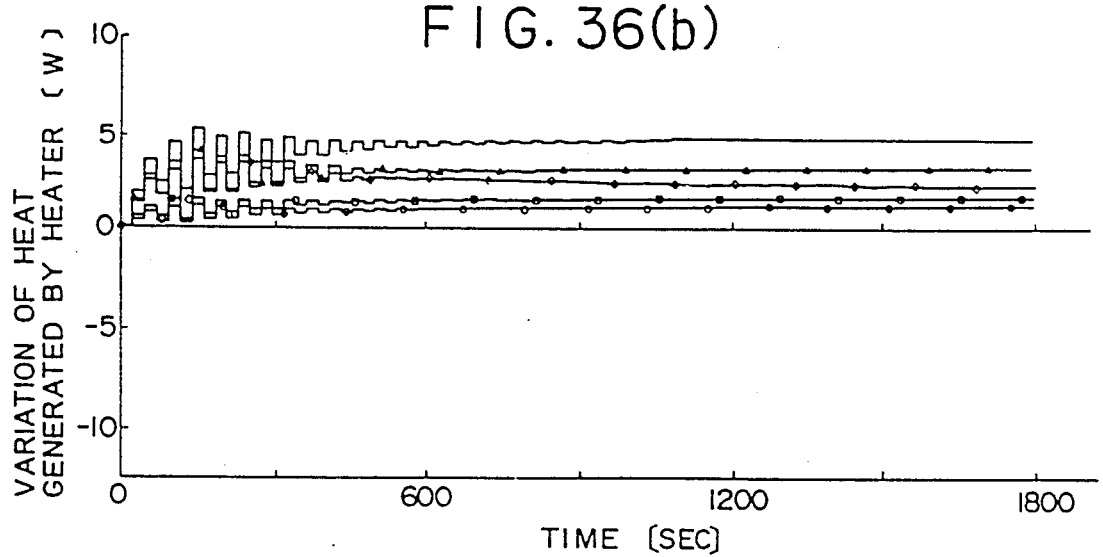
Figure 37A:
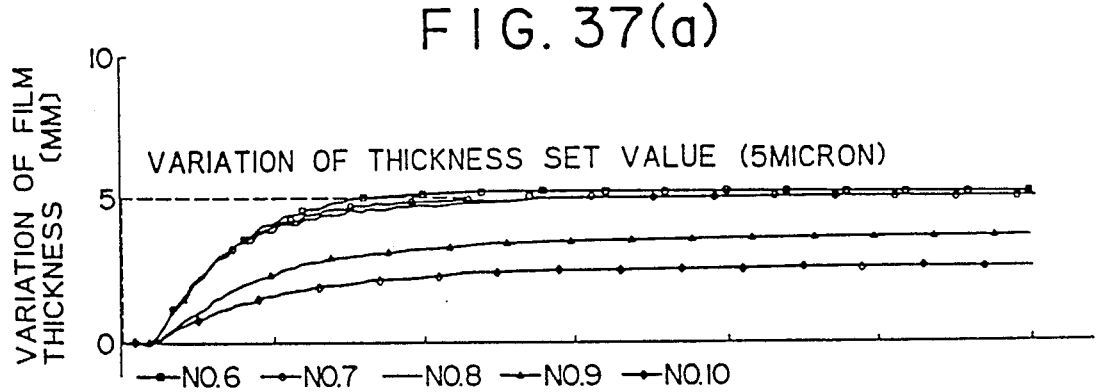
Figure 37B:
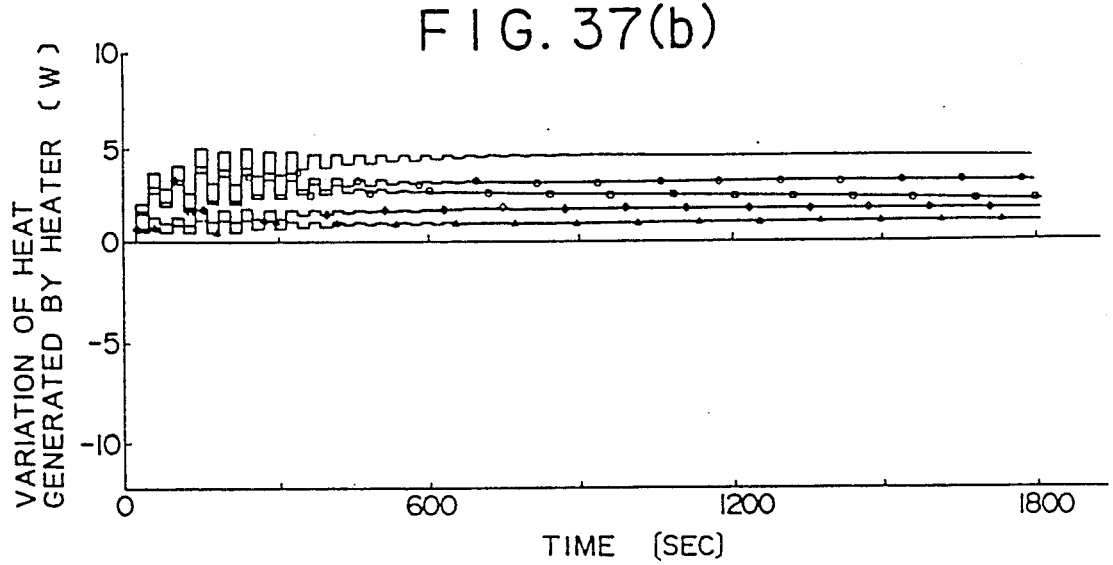

FIGS. 36 and 37 show variations of thickness and variation of heat generated by the heaters when the set values of thickness $y_3$ to $y_8$ are changed stepwise by 5 micron. FIG. 36(a) shows variations of five amounts $y_1$ to $y_5$ of thickness (variation of the detected value of the thickness gauge) versus time. FIG. 36(b) shows variations of heat $u_1$ to $u_5$ generated by the heaters at this time in the same manner as FIG. 36(a). FIG. 37(a) shows variations of thickness $y_6$ to $y_{10}$ and FIG. 37(b) shows variations of heat $u_6$ to $u_{10}$ generated by the heater.

Since calculation is made after the execution period of 22.5 seconds of calculation after the set value of thickness has been changed, variation of heat generated by the heater occurs after 22.5 seconds from change of the set value of thickness. An amount of heat generated by the heater is maintained to the same value until 22.5 seconds elapse and the next calculation is made. The calculation is made on the basis of a newly detected value of thickness after 22.5 seconds to change an amount of heat generated by the heater. Accordingly, an amount of heat generated by the heater changes stepwise as shown in FIGS. 36 and 37(b).

On the other hand, variation of the detected thickness value is detected after the lapse of the dead time L after the amount of heat generated by the heater has been changed after the lapse of 22.5 seconds from the change of the set value. For example, when calculation is made with thickness $y_3$ for the end (A) shown in FIG. 37, the dead time L is 28.8 seconds from Table 2. That is, variation of thickness is detected after the lapse of $22.5 + 28.8 = 51.3$ seconds after the set value of thickness has been changed. Thickness $y_3$ is exactly changed to a set value as can be seen from FIGS. 36 and 37. The heaters h1, h2, h9 and h10 are introduced in consideration of mutual interference to thicknesses $y_3$ and $y_8$ and the thicknesses $y_1$, $y_2$, $y_9$ and $y_{10}$ corresponding to the heaters h1, h2, h9 and h10 are not controlled to the set value. On the other hand, variations of heat generated by the heaters $u_3$ and $u_8$ at the end in the thickness control region are largest, variations by the heaters $u_4$ to $u_7$ located in the center are largest next to the heaters $u_3$ and $u_8$, and variations of the heaters $u_1$, $u_2$, $u_9$ and $u_{10}$ located outside of the control region are smallest.

As can be seen from FIGS. 36 and 37, thickness is controlled to the predetermined value in about 12 minutes after a set value of thickness has been changed, that is, the stabilization time 12 minutes supports a result estimated from the above mentioned eigen value.

(h) Simulation 2

A second actual example is now described with reference to FIGS. 38 and 39.

Figure 38A:
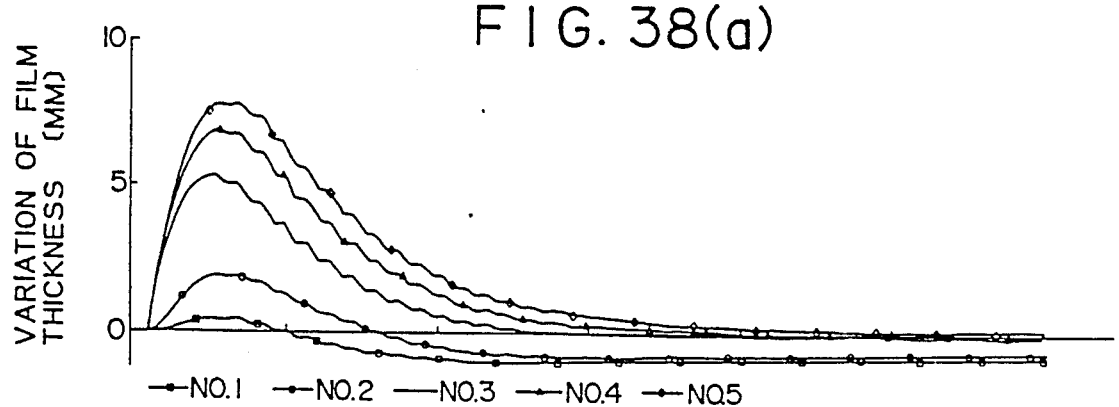
Figure 38B:
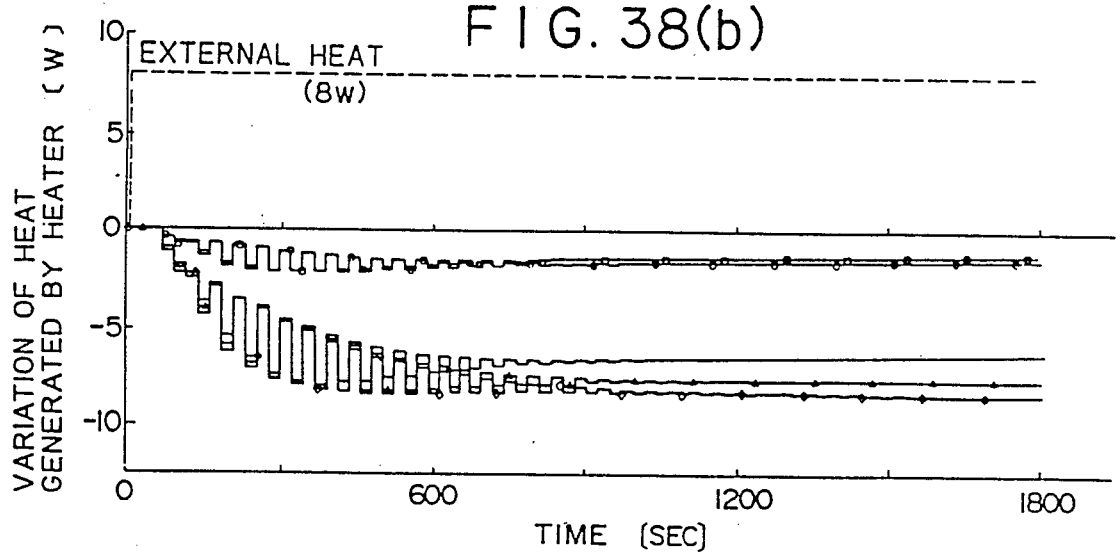
Figure 39A:
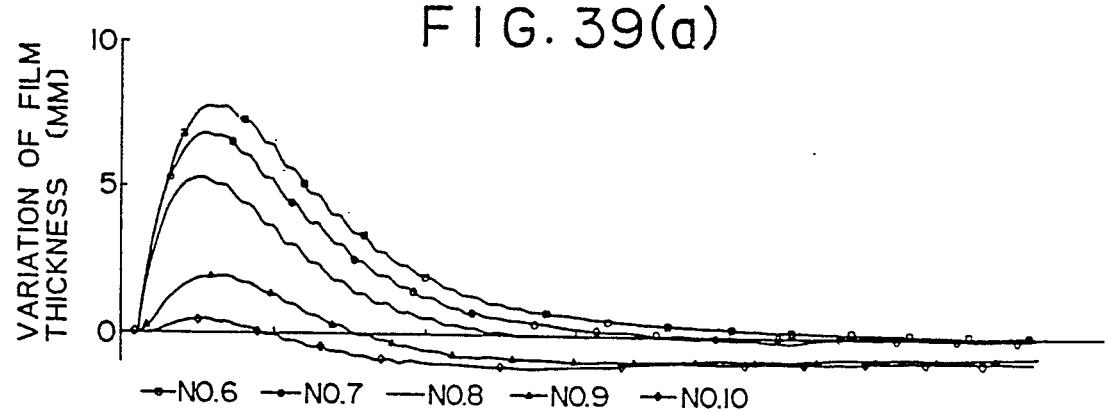
Figure 39B:
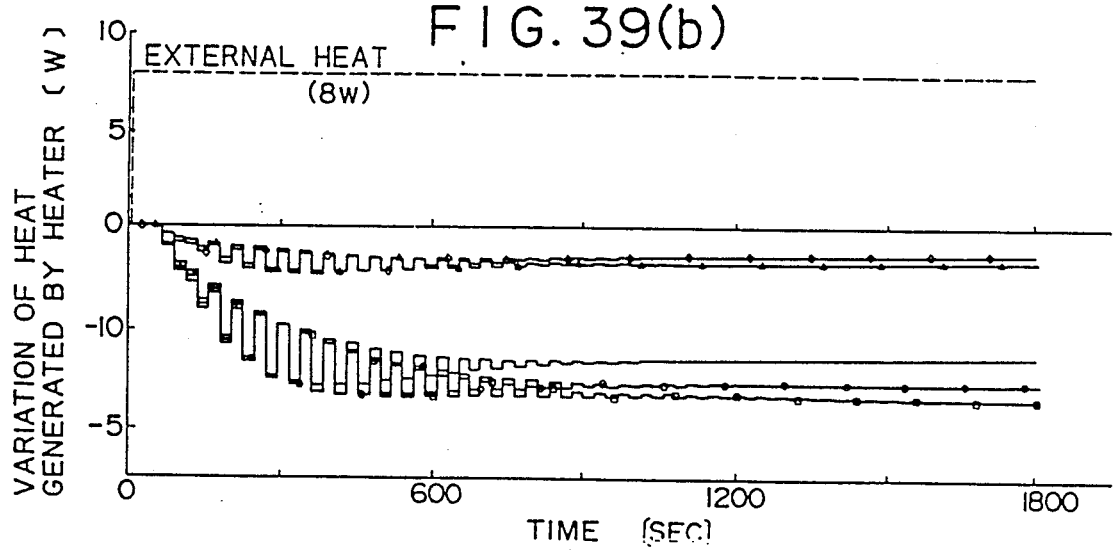

FIGS. 38 and 39 shows a control result when external heat of 8 wattage is applied to the heater $u_3$ to $u_8$. FIG. 38(a) shows variations of thickness values $y_1$ to $y_5$ versus time, and FIG. 38(b) shows variations of heat $u_1$ to $u_5$ generated by the heaters versus time. FIG. 39(a) shows variations of thickness values $y_6$ to $y_{10}$ versus time and FIG. 39(b) shows variations of heat $u_6$ to $u_{10}$ generated by the heaters versus time.

As seen in FIGS. 38 and 39(a), although the thickness values $y_3$ to $y_8$ are once increased by the external heat of the heater $u_3$ to $u_8$, the thickness values $y_3$ to $y_8$ are returned to the original set value by changing the amounts of heat generated by the heaters $u_1$ to $u_{10}$ and the stabilization time is about 12 minutes in the same manner as FIGS. 36 and 37. It is understood that variation due to the external disturbance is exactly compensated by introducing the integrator in the present control system. The thickness values $y_1$, $y_2$, $y_9$ and $y_{10}$ are once increased by influence of external heat through thermal conduction along the width of the die. In order to cancel the influence of such external heat, reductions of amounts $u_3$ to $u_8$ of heat generated by the heater located outside of the control region are largest, and reductions of amounts $u_1$, $u_2$, $u_9$ and $u_{10}$ generated by the heaters located outside of the control region is smallest.

B3. Effects of Second Invention

As described above, according to the second invention, the adjusting mechanism for controlling thickness of film includes the die provided with a multiplicity of operating terminal devices disposed along the width of film so that thickness control of a portion of film corresponding to one operating terminal device is effected to compensate external disturbance added to the operating terminal device and its adjacent terminal devices, and there is provided the state prediction function to remove influence due to the dead time for thickness detection so that the basic control systems with good response can be applied to control thickness of film to the predetermined value. Further, the basic control system is applied for each control of thickness of a portion of film corresponding to the operating terminal device so that thickness control over the whole width of film is performed stably.

I claim:

1. A film thickness controller which employs state equations to control an extrusion molding apparatus and a flowing type molding apparatus of film including a die having a control mechanism which controls a discharge amount of molten plastic along the width of the film and a thickness gauge for detecting variation of thickness of the film after the lapse of a dead time $L_1$ corresponding to a time required for movement of the film between the die and the thickness gauge, comprising:
   a subtracter for producing a difference between a thickness value detected by the thickness gauge in a predetermined position along the width of the film and a set value of thickness in the predetermined position,
   an integrator for time-integrating the difference of thickness produced by said subtracter,
   a memory for storing past time sequence data of operation amounts of the control mechanism during a time equal to a sum of the dead time $L_1$ and a time $L_2$ until the thickness gauge reaches an end of the film after detection of thickness in the predetermined position,
   an operational calculator for producing the past time sequence data of operation amounts of the control mechanism stored in said memory and an estimated value of state variable at a time earlier than a time when the set value of the detected thickness value of a film has been inputted by a dead time L,
   a state shifter for receiving an output of said integrator and an output of said operational calculator and multiplying a coefficient for shifting the state by the dead time L to produce a state estimated value at a predetermined time,
   a state prediction device for receiving the past time sequence data of operation amounts of the control mechanism stored in said memory to produce state variation based on establishment of input from a certain time to a time after the lapse of the dead time L,
   an adder for adding an output of said state shifter and an output of said state prediction device to produce the state estimated value at the predetermined time, and
   an operation amount commander for multiplying a state estimated value at a certain time produced from said adder by a state feedback gain to produce an operation amount command value for the control mechanism.

2. A controller according to claim 1, wherein said state equations are given by $$x(t) = Ax(t) + Bu(t) \quad (2)$$

$$y(t) = Cx(t-L) \quad (4)$$

where x is a state vector, u is an input vector in which $u(t) = [u_1(t), u_2(t), u_3(t), u_4(t), u_5(t)]^T$ (where T represents transposition), y is an output vector in which $y(t) = [y_1(t), y_2(t), y_3(t), y_4(t), y_5(t)]^T$, and the state equations (2) and (3) are controllable and observable.

3. A controller according to claim 2, wherein said integrator performs the following calculation:

$$\hat{X}_I(t) = - \int_0^{t-L} C_i X(\tau) d\tau - \int_{t-L}^t C_i X(\tau) d\tau \quad (6)$$

where $C_i$ is the i-th row of C matrix.

4. A controller according to claim 3, wherein when $\omega(t) = x(t-L)$, said operational calculator calculates and estimated value $X(t-L)$ for $x(t-L)$ on the basis of the following equations for $\omega(t)$:

$$\hat{\omega}(t) = A\omega(t) + Bu(t-L) \quad (18)$$

$$y(t) = C\omega(t) \quad (19)$$

5. A controller according to claim 4, wherein said equation (18) is the following discrete equation:

$$\omega(t_{k+1}) = e^{A(t_{k+1} - t_k)}\omega(t_k) + \int_{t_k}^{t_{k+1}} e^{A(t_{k+1} - \tau)}Bu(\tau - L)d\tau$$

6. A controller according to claim 5, wherein when $\eta = t_{k+1} - \tau$, an estimated value $\omega(k+1)$ for $\omega(t_{k+1})$ is calculated by the following equations: in the case of $2 \leq L < T$, $$\tilde{\omega}(k+1) = \phi \hat{\omega}(k) + \Gamma_1 u(k-3) + \Gamma_2 u(k-2) \quad (29)$$

$$\hat{\omega}(k+1) = \tilde{\omega}(k+1) + K[y(k+1) - C\tilde{\omega}(k+1)] \quad (30)$$

where K is a feedback gain matrix of said operational calculator, and in the case of $T < L < 2T$, $$\tilde{\omega}(k+1) = \phi \hat{\omega}(k) + \Gamma_1 u(k-2) + \Gamma_2 u(k-1) \quad (33)$$

$$\hat{\omega}(k+1) = \tilde{\omega}(k+1) + K[y(k+1) - C\tilde{\omega}(k+1)] \quad (34)$$

where $$\phi = e^{AT} \quad (23)$$

$$\Gamma_1 = \int_m^T e^{A\eta} B d\eta \quad (24)$$

$$\Gamma_2 = \int_0^m e^{A\eta} B d\eta \quad (25)$$

$$m = 3T - L. \quad (26)$$

7. A controller according to claim 1, wherein said controller further comprises:
   (1) a detector for detecting a value y(k+1) of film thickness, the value having a vector composed of $y_1(k+1)$, $y_2(k+1)$, $y_3(k+1)$, $y_4(k+1)$ and $y_5(k+1)$, at a calculation execution time $t=t_{k+1}$ of a time interval for each calculation execution time $t=t_{k+1}$ each time the thickness gauge reaches an edge of the film and for producing an end identification signal d which indicates the end which the thickness gauge has reached;
   (2) said detector being arranged for supplying the value $y_3(k+1)$ of the detected film thickness value y(k+1) to said subtracter for producing thickness deviation $\epsilon$ $(k+1)=r_3(k+1)-y_3(k+1)$ between the detected value $y_3(k+1)$ and a set value of thickness $r_3(k+1)$;
   (3) said subtractor being arranged for supplying the integrator 102 with the thickness deviation (k+1) from the subtracter 101 and producing a time-integrated value of the thickness deviation from the following equation;

$$X_I(k+1)=X_I(k)+0.5(t_{K+1}-t_K)\{\epsilon (k)+\epsilon (k+1)\} \qquad (40)$$

where $\epsilon$ (k) is thickness deviation at the last thickness detection time ($t=t_k$) and $X_I(k)$ is an output of the integrator at $t=t_k$;
said control mechanism including a heater, the integrator includes an external disturbance compensator to compensate external heat varying the thickness $y_3$ with heat generated by the heater so that the thickness $y_3$ is always maintained at a set value;
   (4) said operational calculator being arranged to calculate, when the thickness gauge reaches either end of the film and the thickness gauge produces the arrival end identification signal d, a value $\omega$ (k+1) from the past time sequence data of heat generated by the heater stored in said memory and produce an estimated value $\hat{X}(t_{k+1}-L)=\hat{\omega}$ (k+1) of the state variable at time $t_{(k+1)}-L)$ earlier than time $t_{k+1}$ by the dead time L determined by the arrival end identification signal d produced by the thickness gauge;
   (5) said state shifter being arranged to multiply the state estimated value $\{X_I(k+1), \hat{\omega} (k+1)\}^T$ at time $(t_{k+1}-L)$ by a coefficient $e^{\bar{A}L}$ for shifting the state by the dead time L to obtain the state estimated value $e^{AL}$ $\{X_I(k+1), \hat{\omega} (k+1)\}^T$ at time $t_{k+1}$ in response to the output $X_I(k+1)$ of the integrator and the output $\hat{\omega}$ (k+1) of the operational calculator determined by the arrival end identification signal d of the thickness gauge to obtain the state estimated value at time $t_{k+1}$; wherein the magnitude of the dead time L depends on the end of the film which the thickness gauge reaches and the coefficient $e^{\bar{A}L}$ is different depends on the arrival end identification signal d of the thickness gauge;
said state prediction device being arranged to respond to the state shift for the dead time L to produce a value I(k+1), said memory being arranged to store an amount of shift of states in the form of time sequence input data expressed as u(k−2), u(k−1) and u(k) applied to the time domain from time $t_{(k+1)}-L)$ to time $t_{k+1}$;
   (6) said memory being arranged to store an amount of shift of states in the form of time sequence input data expressed as u(k−2), u(k−1) and u(k) applied to the time domain from time $t_{(k+1)-L)}$ to time $t_{k+1}$;
said state prediction device being arranged to calculate I(k+1) depending on the end of the film which the thickness gauge reaches, that is, depending on the arrival end identification signal produced by the thickness gauge; the past time-sequential data u(K−2), u(k−1) and u(k) being generated by the heater and determined by the magnitude of the dead time L stored in the memory and being supplied to the state prediction device from time $(t_{k+1}-L)$ to time $t_{k+1}$;
   (7) said adder being arranged for adding the output $e^{\bar{A}L}$ $\{X_I(k+1), \hat{\omega} (k+1)\}^T$ of the state shifter and output I(k+1) of the state prediction device to produce the state estimated value $\{\bar{X}_I(k+1), \hat{X}(k+1)\}^T$ at time $t_{k+1}$;
   (8) said operation amount commander being arranged to generate an amount u(k+1) of heat generated by the heater from time $t_{k+1}$ to next calculation time $t_{k+2}$ defined by the following equation using state feedback gain ($f_1$, $F_2$);

$$u(k+1)=-f_1\hat{X}_I(k+1)-F_2\hat{X}(k+1) \qquad (41)$$

the adder being arranged to supply the state estimated value $\{\bar{X}(k+1), \hat{X}(k+1)\}^T$ at time $t_{k+1}$ to said operation amount commander for heat generated by the heater; said operation amount commander being arranged to multiply the state estimated value $\{\bar{X}(k+1), X(k+1)\}^T$ by the state feedback gain to determine a command value of heat generated by the heater; and
   (9) said commander being arranged for executing the calculation of $u=k+1$ after the next detected value y(k+2) of film thickness is obtained from the sampler at time $t=t_{k+2}$ when the thickness gauge is moved along the width of the film after the time period T and reaches the opposite film end.

8. A controller according to claim 7, wherein said operation amount commander has a feedback matrix for keeping all eigen values of matrix $(\bar{A}-\bar{B}F)$ in a stable region.

9. A controller according to claim 4, wherein said operational calculator calculates estimated value $\hat{\omega}$ (k+1) for $\omega$ ($t_{k+1}$) from the following equations:
the calculation equation of the estimated value $\hat{\omega}$ (k+1) for the end $\text{\textcircled{B}}$ is given by $$\tilde{\omega}(k + 1) = \phi_B\hat{\omega}(k) + \int_0^{m_B} e^{A\eta}Bd\eta u(k - 1) + \int_{m_D}^{T - L_B + L_c} e^{A\eta}Bd\eta u(k - 2) \qquad (55)$$

$$\hat{\omega}(k + 1) = \tilde{\omega}(k + 1) + K_B[y(k + 1) - C\tilde{\omega}(k + 1)] \qquad (56)$$

where
$\phi_B=e^A(T-L_B+L_C)$
$K_B$=gain matrix of the operational calculator, the calculation equation of the estimated value $\omega$ (k+1) for the other end $\text{\textcircled{C}}$ is given by $$\tilde{\omega}(k + 1) = \phi_c\hat{\omega}(k) + \int_0^{m_c} e^{A\eta}Bd\eta u(k - 1) + \qquad (57)$$

-continued
$$\int_{m_c}^{T-L_c+L_B} e^{A\eta}Bd\eta u(k-2)$$

$$\hat{\omega}(k+1) = \tilde{\omega}(k+1) + K_c[y(k+1) - C\tilde{\omega}(k+1)] \quad (58)$$

where
$\phi_C = e^A(T - L_C + L_B)$
$K_C$ = gain matrix of the operational calculator.

10. A controller according to claim 1, wherein:
(1) the thickness gauge is arranged to produce the detected value $y(k+1)$ of film thickness vector including $y_1(k+1)$, $y_2(k+1)$, $y_3(k+1)$, $y_4(k+1)$ and $y_5(k+1)$ at the calculation execution time $t = t_{k+1}$ of the time interval T for each calculation execution time $t = t_{k+1}$ each time the thickness gauge 10 reaches an end B or C of the film width and produces the arrival end identification signal d which indicates the end which the gauge has reached;
(2) said subtractor is arranged to receive a value $y_3(k+1)$ of the detected film thickness value $y(k+1)$ and produces thickness deviation $(k+1) = r_3(k+1) - y_3(k+1)$ between the detected value $y_3(k+1)$ and a set value of a thickness $r_3(k+1)$;
(3) the integrator receives the thickness deviation $(k+1)$ from the subtracter 101 and produces a time-integrated value of the thickness deviation from the following equation;

$$X_I(k+1) = X_I(k) + 0.5(t_{k+1} - t_k)\epsilon \{(k) + \epsilon(k+1)\}$$

where $(k)$ is thickness deviation at the last thickness detection time $(t + t_k)$ and $X_I(k)$ is an output of the integrator 102 at $t = t_k$;
said control mechanism includes a heater;
the integrator includes means for forming a function of an external disturbance compensator and serves to compensate external heat varying the thickness $y_3$ with heat generated by the heater so that the thickness $y_3$ is always maintained at a set value;
(4) the thickness gauge is arranged to produce an arrival end identification signal d when the thickness gauge reaches either end of the film the operational calculator is arranged to calculate $\hat{\omega}(k+1)$ in response to the identification signal and in response to the past time sequence data, the past time sequence data having the form $u(k-2)$ and $u(k-1)$, of heat generated by the heater stored in said memory together with the film thickness value $y(k+1)$ for producing an estimated value $\hat{X}(t_{k+1} - L) = \hat{\omega}(k+1)$ of the state variable at time $t_{(k+1)} - L$ earlier than time $t_{k+1}$ by the dead time L determined by the arrival end identification signal d produced by the thickness gauge;
(5) said state prediction device being arranged for multiplying the state estimated value $\{X_I(k+1), \hat{\omega}(k+1)\}^T$ at time $(t_{k+1} - L)$ by a coefficient $e^{AL}$ for shifting the state by the average dead time $\overline{L}$ to obtain the state estimated value $e^{\overline{AL}}\{X_I(k+1), \hat{\omega}(k+1)\}^T$ at time $t_{k+1}$; said phase shifter being arranged for multiplying the output $X_I(k+1)$ of the integrator and the output $\omega(k+1)$ of the operational calculator by the coefficient for shifting the state by the average dead time $\overline{L}$ to obtain the state estimated value at time $t_{k+1}$; the magnitude of the dead time $\overline{L}$ including the average value of dead times for both ends of the film;
said state prediction device being arranged for correcting the state shift by the input $u(k)$ in time domain for only the average dead time $\overline{L}$ by $\overline{I}(k+1)$;
(6) said state prediction device being arranged for expressing with the $\overline{I}(k+1)$ an amount of shift of states for time sequence input data $u(k-1)$ and $u(k)$ applied to the time domain of the average dead time $\overline{L}$ from time $(t_{k+1} - L)$ to time $t_{k+1}$; and for calculating $\overline{I}(k+1)$ using the average dead time $\overline{L}$; said state prediction device being arranged for receiving the past time sequence data of the heat generated by the heater determined by the magnitude of the dead time $\overline{L}$ stored in the memory and the state variation amount $I(k+1)$ by the input $u(k)$ from time $(t_{k+1} - \overline{L})$ to time $t_{k+1}$;
(7) said adder being arranged for adding the output $e^{\overline{AL}}\{X_I(k+1), \hat{\omega}(k+1)\}^T$ of the state shifter and output $I(k+1)$ of the state prediction device for producing the state estimated value $\{\overline{X}_I(k+1), \hat{X}(k+1)\}^T$ at time $t_{k+1}$; the operational calculator being arranged for obtaining only the state estimated value at time $t_{k+1} - L$ due to the dead time $\overline{L}$; said state shifter and said state prediction device being arranged for obtaining the state estimated value at time $t_{k+1}$ and for reducing the influence of phase delay due to the dead time L by integration for the dead time $\overline{L}$;
(8) said heater being arranged to generate an amount $u(k+1)$ of heat from time $t_{k+1}$ to next calculation time $t_{k+2}$ defined by the following equation using state feedback gain $(f_1, F_2)$;

$$u(k+1) = -f_1\hat{X}_I(k+1) - F_2\hat{X}(k+1); \quad (41)$$

the adder being arranged to supply the state estimated value $\{\overline{X}_I(k+1), \hat{X}(k+1)\}^T$ at time $t_{k+1}$ to said commander for heat generated by the heater; the commander being arranged to multiply the state estimated value $\{\overline{X}_I(k+1), \hat{X}(k+1)\}^T$ by the state feedback gain to define a command value of heat generated by the heater; and
(9) said commander having means to execute the above calculation after the next detected value $y(k+2)$ of film thickness is obtained from the sampler at time $t = t_{k+2}$ of calculation execution when the thickness gauge is moved along the width of the film after the time period T and reaches the opposite film end.

* * * * *